US010576627B1

(12) United States Patent
Frei et al.

(10) Patent No.: US 10,576,627 B1
(45) Date of Patent: *Mar. 3, 2020

(54) SYSTEM AND METHOD FOR INSPECTION AND MAINTENANCE OF HAZARDOUS SPACES WITH TRACK AND ROLLER

(71) Applicant: Kurion, Inc., Irvine, CA (US)

(72) Inventors: Jascha Frei, Fort Collins, CO (US); Robert R. Heim, Brighton, CO (US); Paul Damon Linnebur, Johnstown, CO (US)

(73) Assignee: Kurion, Inc., Irvine, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 16/027,025

(22) Filed: Jul. 3, 2018

Related U.S. Application Data

(63) Continuation of application No. 15/341,985, filed on Nov. 2, 2016, now Pat. No. 10,035,263.

(60) Provisional application No. 62/250,417, filed on Nov. 3, 2015.

(51) Int. Cl.
*E02F 9/16* (2006.01)
*B25J 9/16* (2006.01)
*B25J 18/00* (2006.01)
*B25J 9/06* (2006.01)

(52) U.S. Cl.
CPC ............... *B25J 9/162* (2013.01); *B25J 9/06* (2013.01); *B25J 18/00* (2013.01); *G05B 2219/40056* (2013.01); *G05B 2219/40234* (2013.01); *G05B 2219/40495* (2013.01); *Y10S 901/01* (2013.01); *Y10S 901/44* (2013.01)

(58) Field of Classification Search
CPC ................................. B25J 9/162; B25J 9/08
See application file for complete search history.

(56) References Cited

U.S. PATENT DOCUMENTS

| | | | | |
|---|---|---|---|---|
| 3,464,169 A | * | 9/1969 | Potain | E04H 12/182 52/115 |
| 3,841,441 A | * | 10/1974 | Klinkhammer | E02B 17/0836 187/272 |
| 3,998,029 A | | 12/1976 | James et al. | |
| 4,496,277 A | * | 1/1985 | Jungman | B66C 23/20 212/179 |
| 4,637,494 A | | 1/1987 | Iida et al. | |

(Continued)

*Primary Examiner* — Gerald McClain
(74) *Attorney, Agent, or Firm* — Michael Best & Friedrich LLP

(57) ABSTRACT

Disclosed herein are systems and methods for a robotic system capable of carrying out operations in a hazardous or confined space. The system comprises a manipulator arm, a plinth, a trolley, an end effector, and a control system. The plinth and trolley each comprise one or more locking pawls for securing the system to mounting points. The system is capable of maneuvering between mounting points in an inch-worm-like fashion. Motion starts from a fixed position where both the trolley and plinth locking pawls are secured to a first mounting point. The trolley locking pawls are then released and the trolley runs along the manipulator and secures locking pawls to a second mounting point. The plinth locking pawls are then released and the plinth is drawn to the second mounting point where it is secured via locking pawls. When both the plinth and trolley are secured, operations can be carried out.

19 Claims, 45 Drawing Sheets

(56) References Cited

U.S. PATENT DOCUMENTS

| | | | |
|---|---|---|---|
| 4,793,439 A * | 12/1988 | Crawford | A63B 27/00 182/136 |
| 7,422,041 B2 | 9/2008 | Smith et al. | |
| 8,882,165 B2 | 11/2014 | Lipson et al. | |
| 2016/0176044 A1 | 6/2016 | Cole et al. | |

* cited by examiner

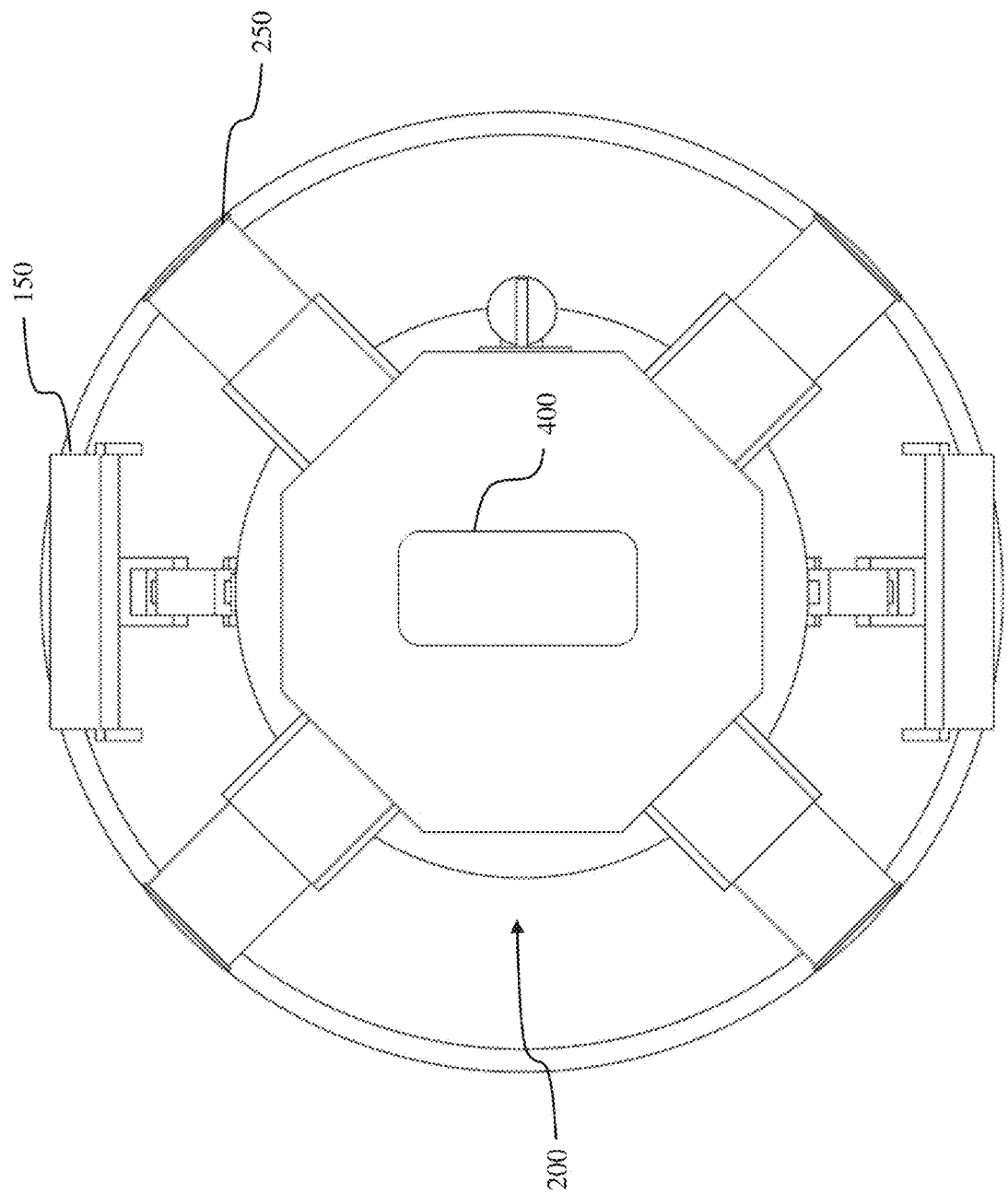

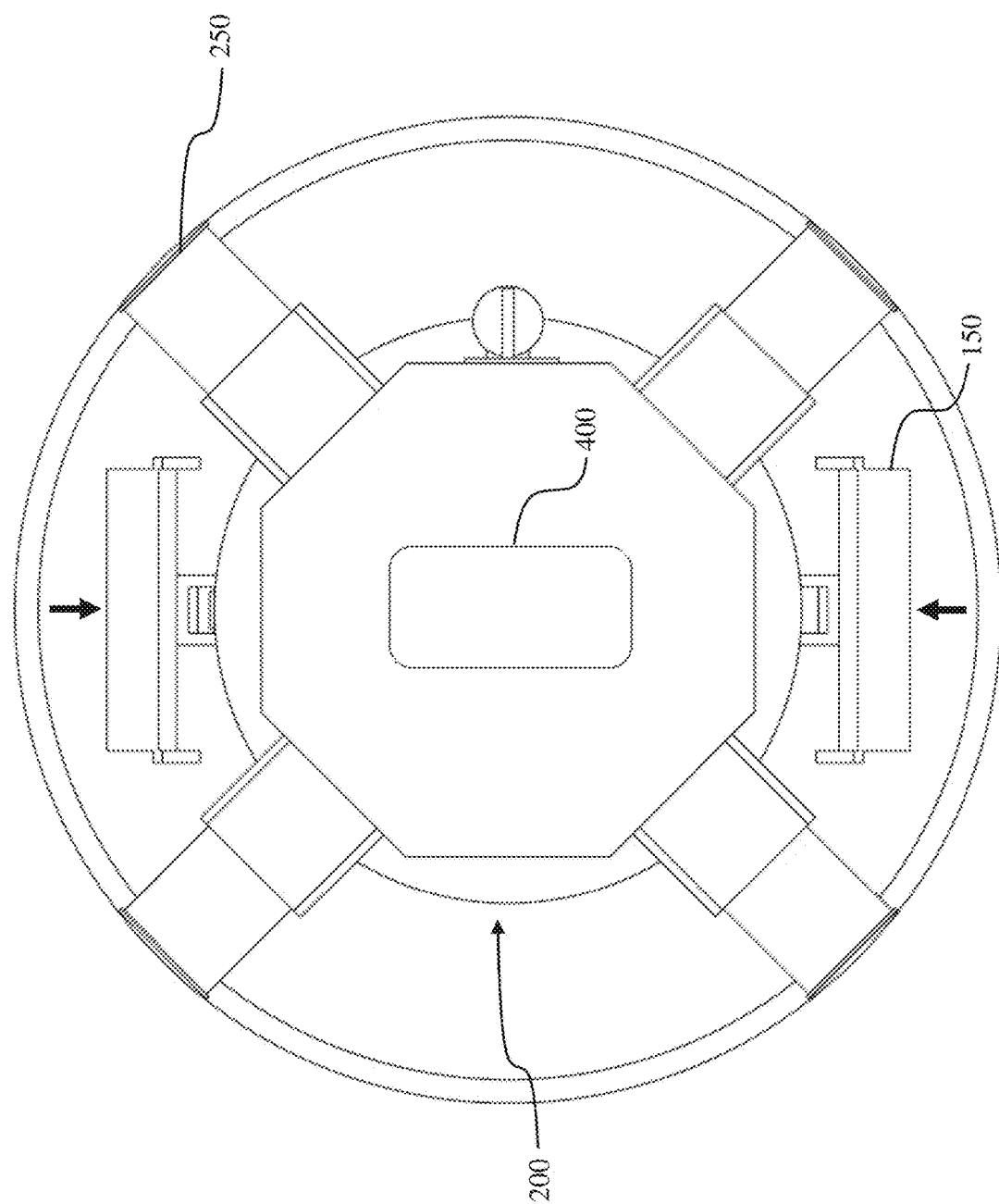

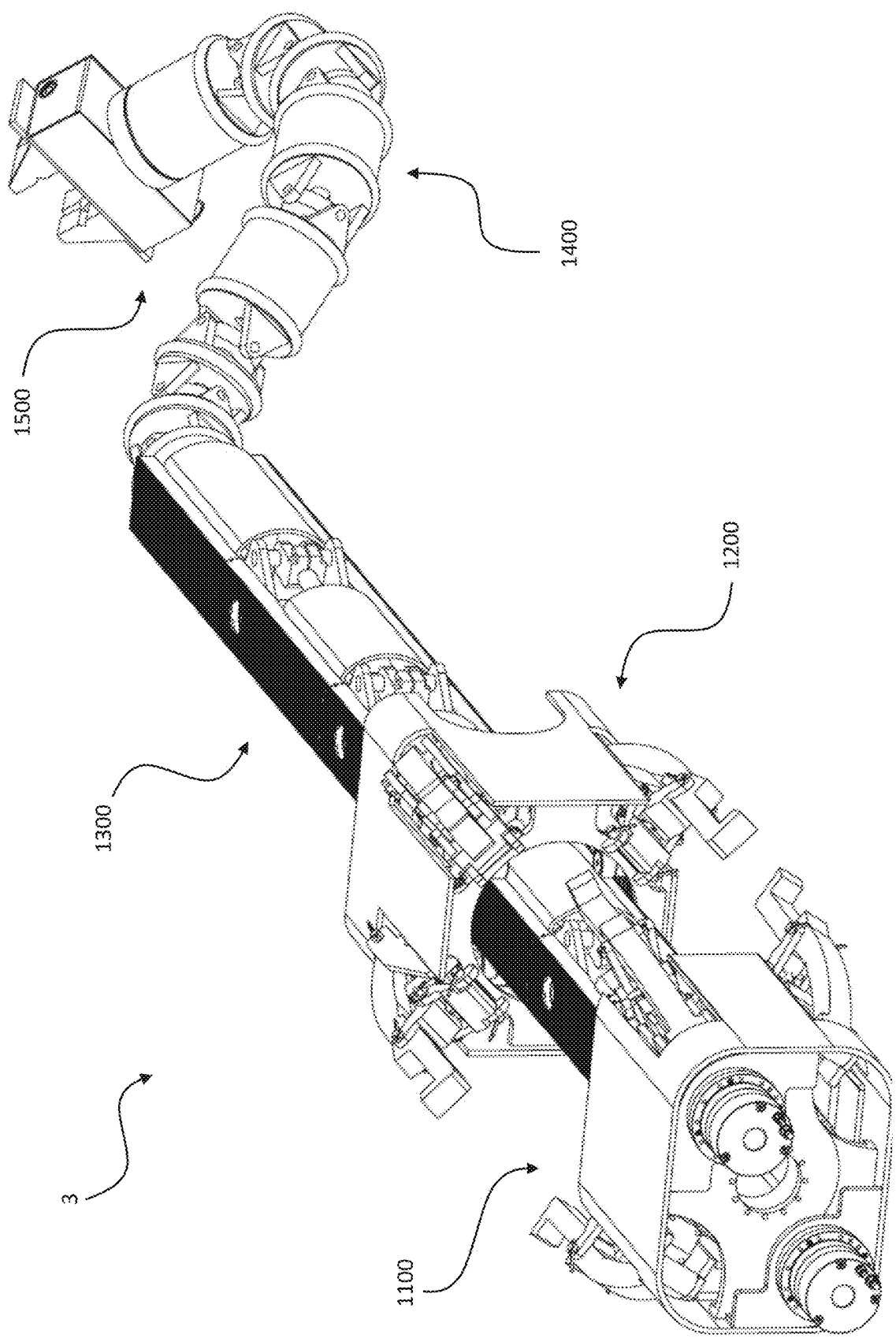

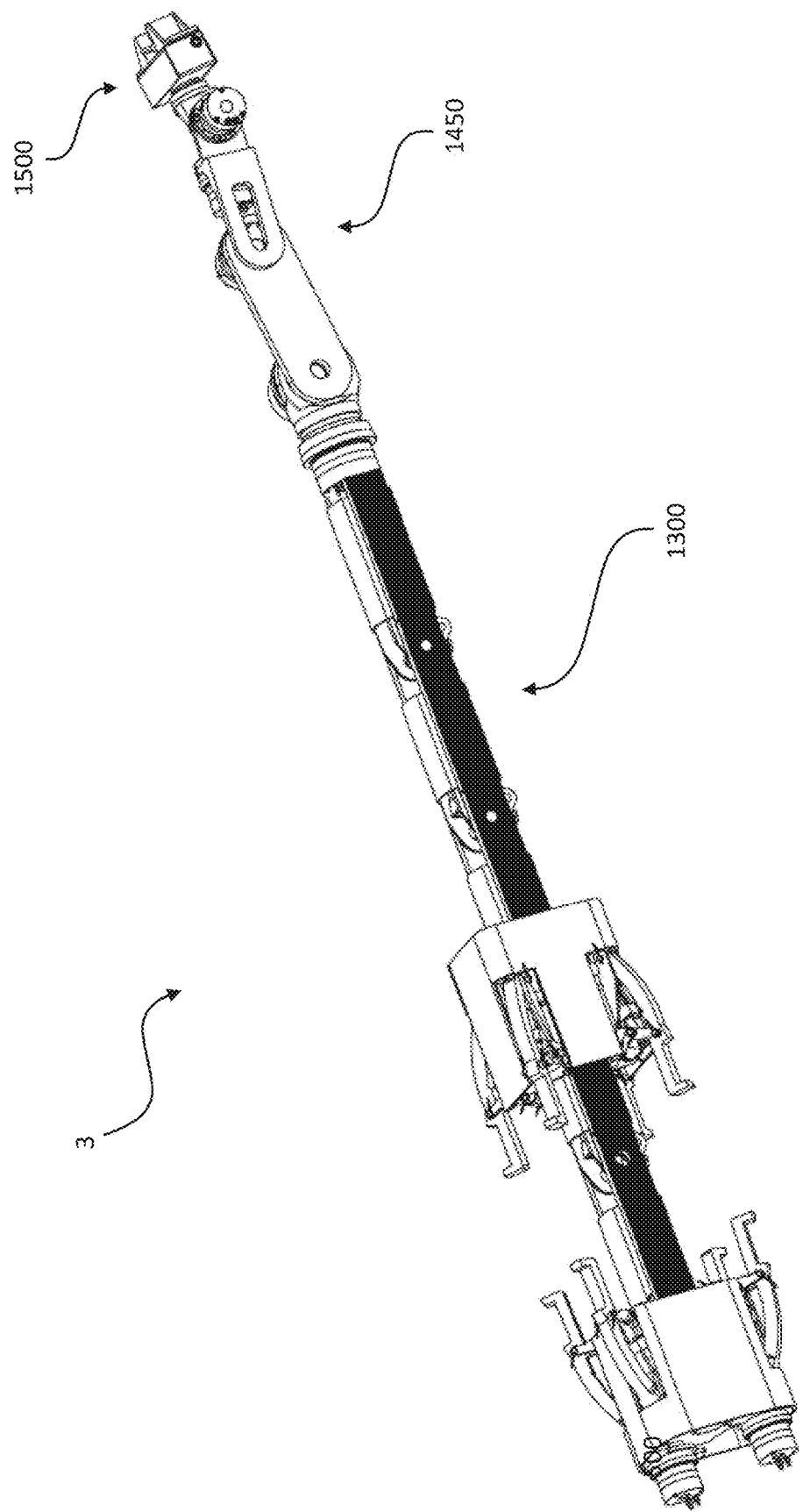

SYSTEM AND METHOD FOR INSPECTION AND MAINTENANCE OF HAZARDOUS SPACES WITH TRACK AND ROLLER

CROSS-REFERENCE TO RELATED APPLICATIONS

This application is a continuation application of U.S. application Ser. No. 15/341,985, filed Nov. 2, 2016, which claims priority to U.S. Provisional Application 62/250,417, filed Nov. 3, 2015 entitled SYSTEM AND METHOD FOR INSPECTION AND MAINTENANCE OF CONFINED SPACES all of which are herein incorporated by reference in their entireties.

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software, screenshots and data as described below and in the drawings hereto and All Rights Reserved.

TECHNICAL FIELD

This disclosure relates generally to robotic systems designed to perform operations in hazardous or confined spaces. More particularly, this disclosure relates to robotic systems for cleaning, refurbishing, decontaminating, inspecting, and other maintenance operations within hazardous or confined spaces.

BACKGROUND

There are many confined or hazardous spaces which require regular inspection and maintenance. Currently, much of this inspection and maintenance is carried out by human personnel despite many of these confined spaces containing hazardous materials, noxious gases, and/or other contaminants and conditions that are detrimental to humans. As an example, many oceangoing vessels are constructed with a honeycomb of compartments between the outer hull and the lowest internal deck surface. The structure is typically comprised of longitudinal and transverse bulkheads that provide strength for the hull. These compartments are occasionally used for storage of liquids including water and fuel. Currently, the refurbishment of hazardous or confined spaces is carried out by workers who perform operations such as cleaning surfaces, removing coatings, inspection, repair, and painting.

Refurbishing these spaces is difficult as they are often not designed for routine human occupancy. The compartments may be limited in height (a couple of feet) requiring that tasks are performed on hands and knees or standing bent over with temporary task lighting. The compartments may also be limited in width, forcing workers to function in uncomfortable and potentially dangerous positions. In some examples, the compartments are typically connected by small manways that make movement of equipment and personnel in the space difficult. During the refurbishment process workers are exposed to various health hazards (VOCs, particulates, and others) requiring use of supplied air respirators and other personal protective equipment with potential for catastrophic failure causing injury or death to the user. Refurbishment of these spaces also presents the potential for flammable and depleted oxygen atmospheres, thereby creating additional risks for human maintenance workers.

Systems and methods are provided for performing inspection, maintenance, and refurbishment operations within hazardous or confined spaces using a remotely operated robotic manipulator.

So as to reduce the complexity and length of the Detailed Specification, Applicant(s) herein expressly incorporate(s) by reference all of the following materials identified in each paragraph below. The incorporated materials are not necessarily "prior art" and Applicant(s) expressly reserve(s) the right to swear behind any of the incorporated materials.

System and Method for Inspection and Maintenance of Confined Spaces, Ser. No. 62/250,417 filed Nov. 3, 2015, which is hereby incorporated by reference in its entirety.

Systems and Methods for Chain Joint Cable Routing, Ser. No. 14/975,544 filed Dec. 18, 2015, with a priority date of Dec. 19, 2014, which is hereby incorporated by reference in its entirety.

System and Method for a Robotic Manipulator Arm, Ser. No. 62/337,066 filed May 16, 2016, which is hereby incorporated by reference in its entirety.

Applicant(s) believe(s) that the material incorporated above is "non-essential" in accordance with 37 CFR 1.57, because it is referred to for purposes of indicating the background or illustrating the state of the art. However, if the Examiner believes that any of the above-incorporated material constitutes "essential material" within the meaning of 37 CFR 1.57(c)(1)-(3), applicant(s) will amend the specification to expressly recite the essential material that is incorporated by reference as allowed by the applicable rules.

Aspects and applications presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112, ¶6. Thus, the use of the words "function," "means" or "step" in the Detailed Description or Description of the Drawings or claims is not intended to somehow indicate a desire to invoke the special provisions of 35 U.S.C. § 112, ¶6, to define the systems, methods, processes, and/or apparatuses disclosed herein. To the contrary, if the provisions of 35 U.S.C. § 112, ¶6 are sought to be invoked to define the embodiments, the claims will specifically and expressly state the exact phrases "means for" or "step for, and will also recite the word "function" (i.e., will state "means for performing the function of . . . "), without also reciting in such phrases any structure, material or act in support of the function. Thus, even when the claims recite a "means for performing the function of . . . " or "step for performing the function of . . . ", if the claims also recite any structure, material or acts in support of that means or step, or that perform the recited function, then it is the clear intention of the inventors not to invoke the provisions of 35 U.S.C. § 112, ¶6. Moreover, even if the provisions of 35 U.S.C. § 112, ¶6 are invoked to define the claimed embodiments, it is intended that the embodiments not be limited only to the specific structure, material or acts that are described in the preferred embodiments, but in addition, include any and all structures, materials or acts that perform the claimed function as described in alternative embodiments or forms, or that are well known present or later-developed, equivalent structures, material or acts for performing the claimed function.

BRIEF DESCRIPTION OF THE DRAWINGS

A more complete understanding of the systems, methods, processes, and/or apparatuses disclosed herein may be derived by referring to the detailed description when considered in connection with the following illustrative figures. In the figures, like-reference numbers refer to like-elements or acts throughout the figures. The presently preferred embodiments are illustrated in the accompanying drawings, in which:

FIG. 10B depicts a TRM fully seated and centered in the manway viewed along the central axis of the TRM.

FIG. 14B depicts a TRM when the plinth is retracted and the trolley is fully seated in the new manway viewed along the central axis of the TRM.

FIG. 18C depicts an isometric rear view of the TRM embodiment of FIG. 18A.

FIG. 27 depicts the assembly with the harmonic driven short arm embodiment of FIG. 26.

Elements and acts in the figures are illustrated for simplicity and have not necessarily been rendered according to any particular sequence or embodiment.

DETAILED DESCRIPTION

In the following description, and for the purposes of explanation, numerous specific details, process durations, and/or specific formula values are set forth in order to provide a thorough understanding of the various aspects of exemplary embodiments. It will be understood, however, by those skilled in the relevant arts, that the apparatus, systems, and methods herein may be practiced without these specific details, process durations, and/or specific formula values. It is to be understood that other embodiments may be utilized and structural and functional changes may be made without departing from the scope of the apparatus, systems, and methods herein. In other instances, known structures and devices are shown or discussed more generally in order to avoid obscuring the exemplary embodiments. In many cases, a description of the operation is sufficient to enable one to implement the various forms, particularly when the operation is to be implemented in software. It should be noted that there are many different and alternative configurations, devices, and technologies to which the disclosed embodiments may be applied. The full scope of the embodiments is not limited to the examples that are described below.

In the following examples of the illustrated embodiments, references are made to the accompanying drawings which form a part hereof, and in which is shown by way of illustration various embodiments in which the systems, methods, processes, and/or apparatuses disclosed herein may be practiced. It is to be understood that other embodiments may be utilized and structural and functional changes may be made without departing from the scope.

Introduction

In an effort to prevent workers from needing to enter environments that are hazardous or within confined or difficult to reach spaces, a remotely operated Tank Refurbishment System (TRS) is disclosed. The TRS comprises a Tank Refurbishment Manipulator (TRM), a Deployment and Retrieval Tool (DRT), control system, and one or more tools that may be remotely deployed by the TRM. The TRS may be used to remotely inspect, maintain, and clean confined spaces with little to no human interaction required.

Figure 1:
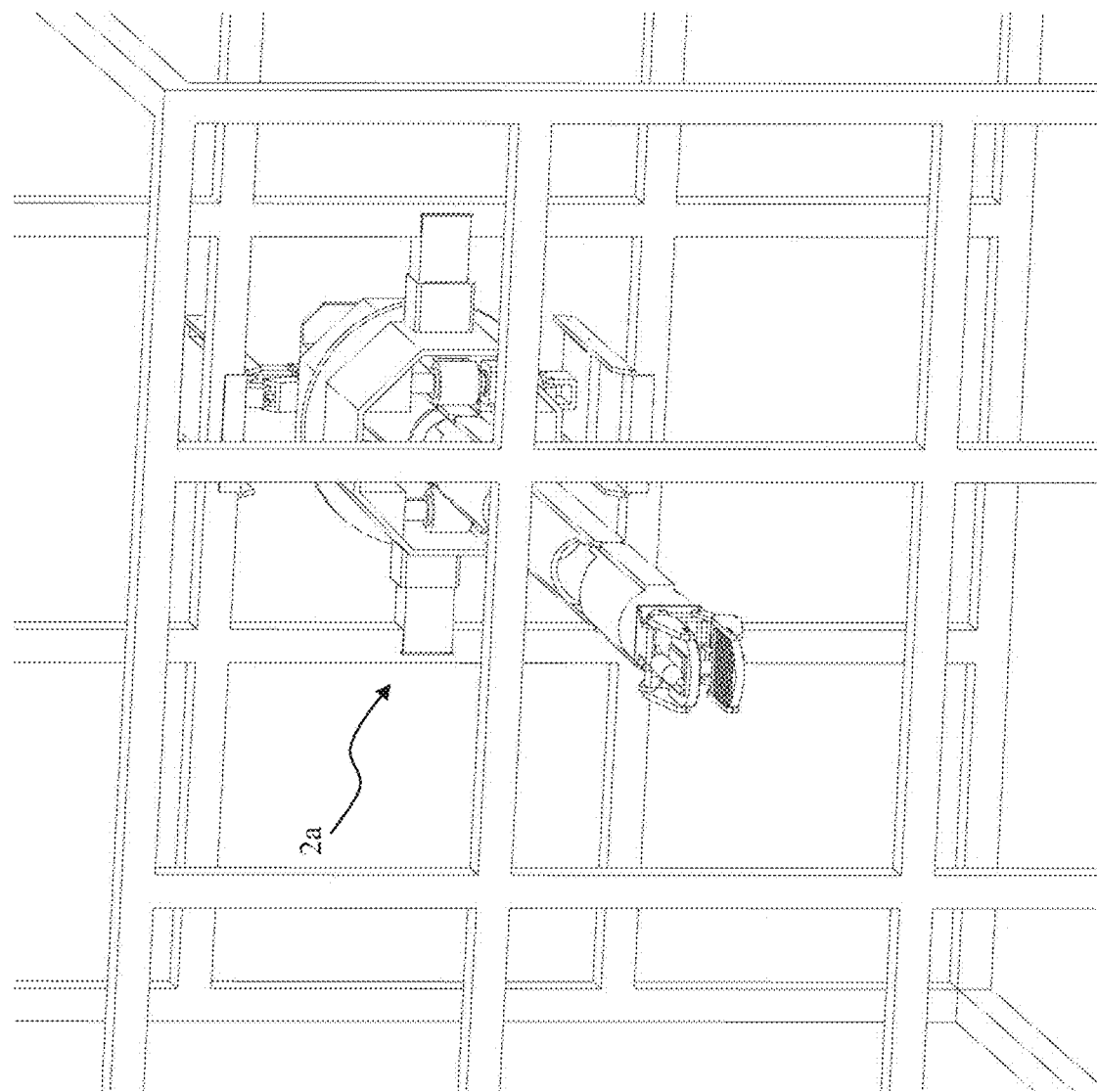
FIG. 1 depicts an embodiment of a tank refurbishment manipulator (TRM) operating in an open frame environment.

The terms "tank", "compartment", "hazardous space", "workspace", "confined space", and other references to the space or area in which the TRM operates, as used herein, are merely used to reference a space within which the TRS may perform operations and are not intended as limitations. The TRS may perform operations in any space having mounting points which the TRM can anchor to, or gain sufficient anchoring friction from; additional anchoring embodiments are provided herein. Similarly, the terms "manway", "opening" and the like are merely used to indicate any space or infrastructure to which the TRM may mount and move through and are not intended as limitations. More specifically, the term "manway" is used to describe a passageway, area connector, or any space within which the TRM is capable of operating along a pre-defined path. The TRM 2a is capable of operating in an open frame environment, i.e. a space having no compartments, tanks, manways, or openings, as depicted in FIG. 1. Compartments, open frame environments, and manways may vary in geometry. Details of the TRM 2a are described in later figure descriptions.

In embodiments where the operating space is a tunnel, passageway, or open frame environment where the TRM operates along a pre-defined path, the TRM may be anchored with attachments that are installed along the pre-defined path. In some embodiments, friction, and/or pressure anchor-point mechanisms may be used, whereby the TRM may be fitted with expandable and retractable poles, rods, or other anchoring mechanisms (hereinafter referred to as a pole or poles for clarity, and not being limited to singular or plural poles) that extend out to the closest wall or other opposing surface until making contact, with the contact point of the pole providing sufficient friction and/or pressure against the opposing surface to enable the TRM to be secured as required. In embodiments utilizing friction the portion of the pole that comes in contact with the surface may comprise at least one of large surface area and material having high coefficient of friction. Some embodiments may utilize magnetism to secure the TRM as required.

Figure 2A:
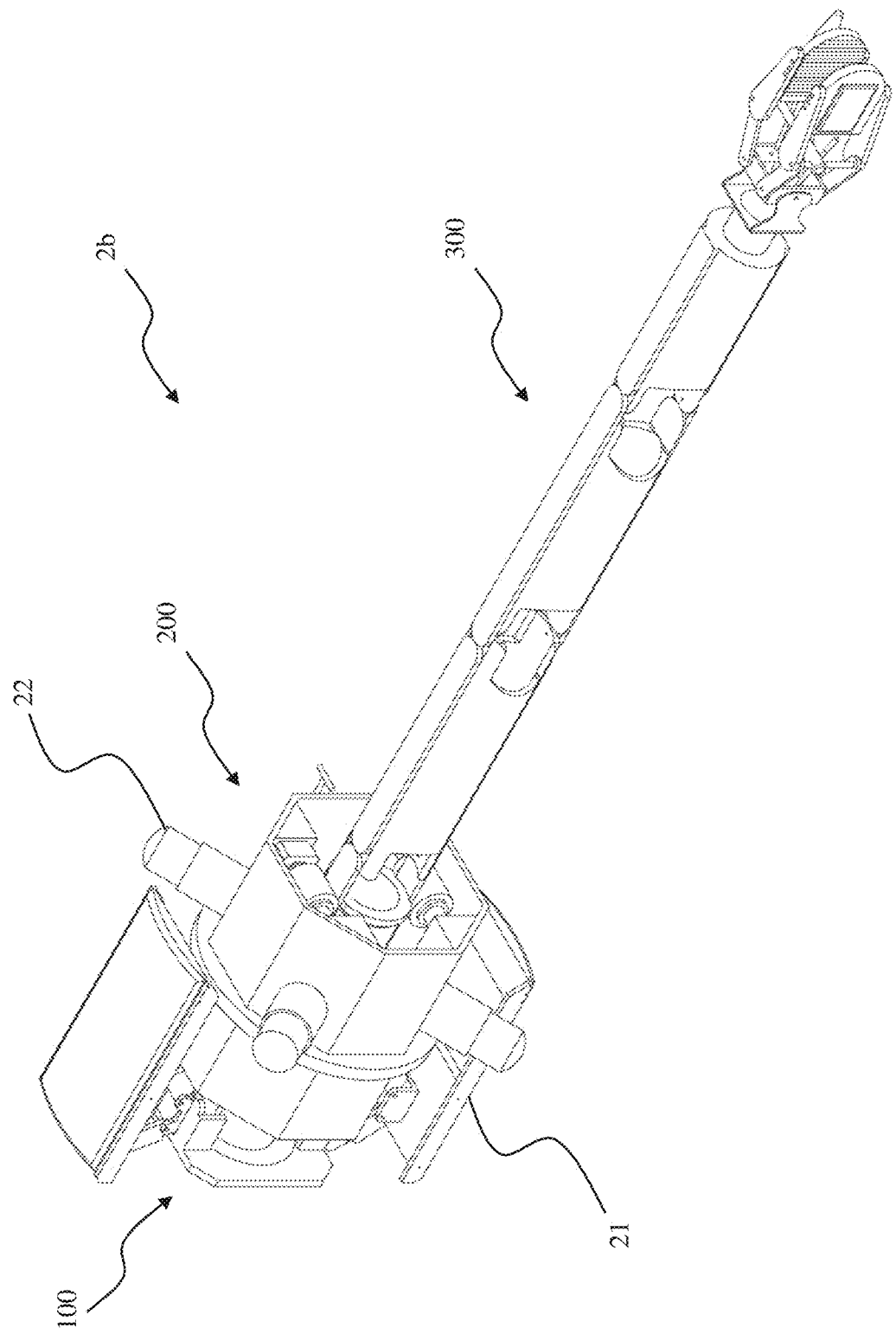
FIG. 2A depicts an isometric view of an embodiment of a TRM designed to operate in a tunnel.
Figure 2B:
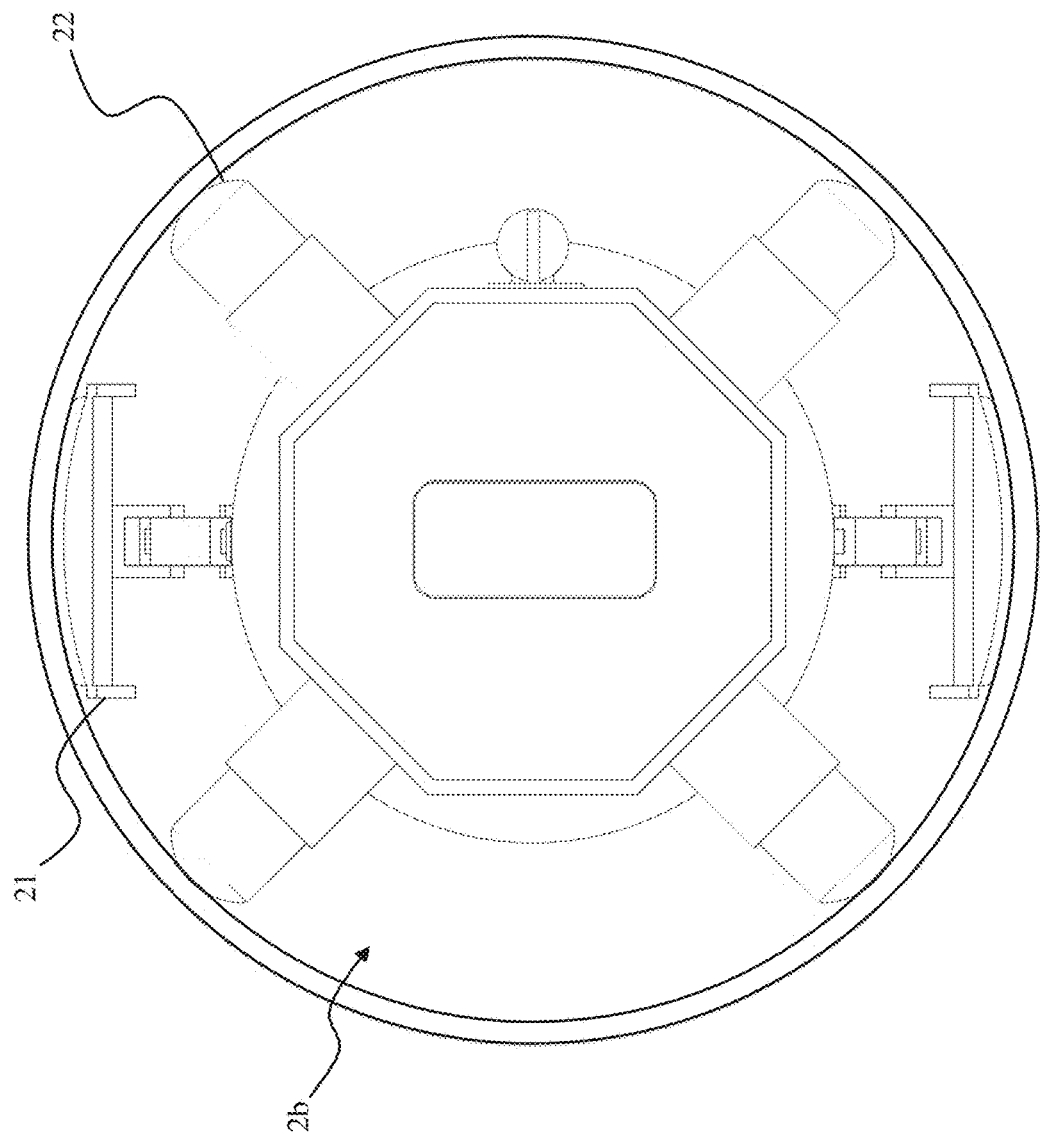
FIG. 2B depicts a front view of the TRM embodiment of FIG. 2A operating in a tunnel.

The TRM typically moves in an inch-worm like fashion regardless of the space it is operating in or the securing mechanisms used. FIGS. 2A and 2B depict a TRM 2b embodiment utilizing poles, as previously described. Both the plinth poles 21 and the trolley poles 22 are extended and the TRM 2b is fully anchored in position. In order to initiate movement, the trolley poles 22 are retracted, temporarily eliminating the friction and/or pressure so that the trolley 200 can move to a new position along the manipulator 300. While the trolley 200 is moving, the plinth poles 21 remain engaged with enough friction and/or pressure to secure the plinth 100 and manipulator 300 in place. When the trolley 200 reaches the desired location, the trolley poles 22 extend until the opposing surface is reached and the required friction and/or pressure for secure mounting of the TRM 2b is established. Then the plinth poles 21 may retract to allow the plinth 100 and manipulator 300 to move forward in the previously described inch-worm-like fashion. Once the plinth 100 has reached the desired position, the plinth poles 21 are extended until making contact with the opposing surface and attaining the required friction and/or pressure, thereby securely anchoring the TRM 2b in place until the next repositioning is required. The inch-worm movement described above applies to the TRM in other embodiments, regardless of the anchoring mechanism used.

System Overview

Figure 3:
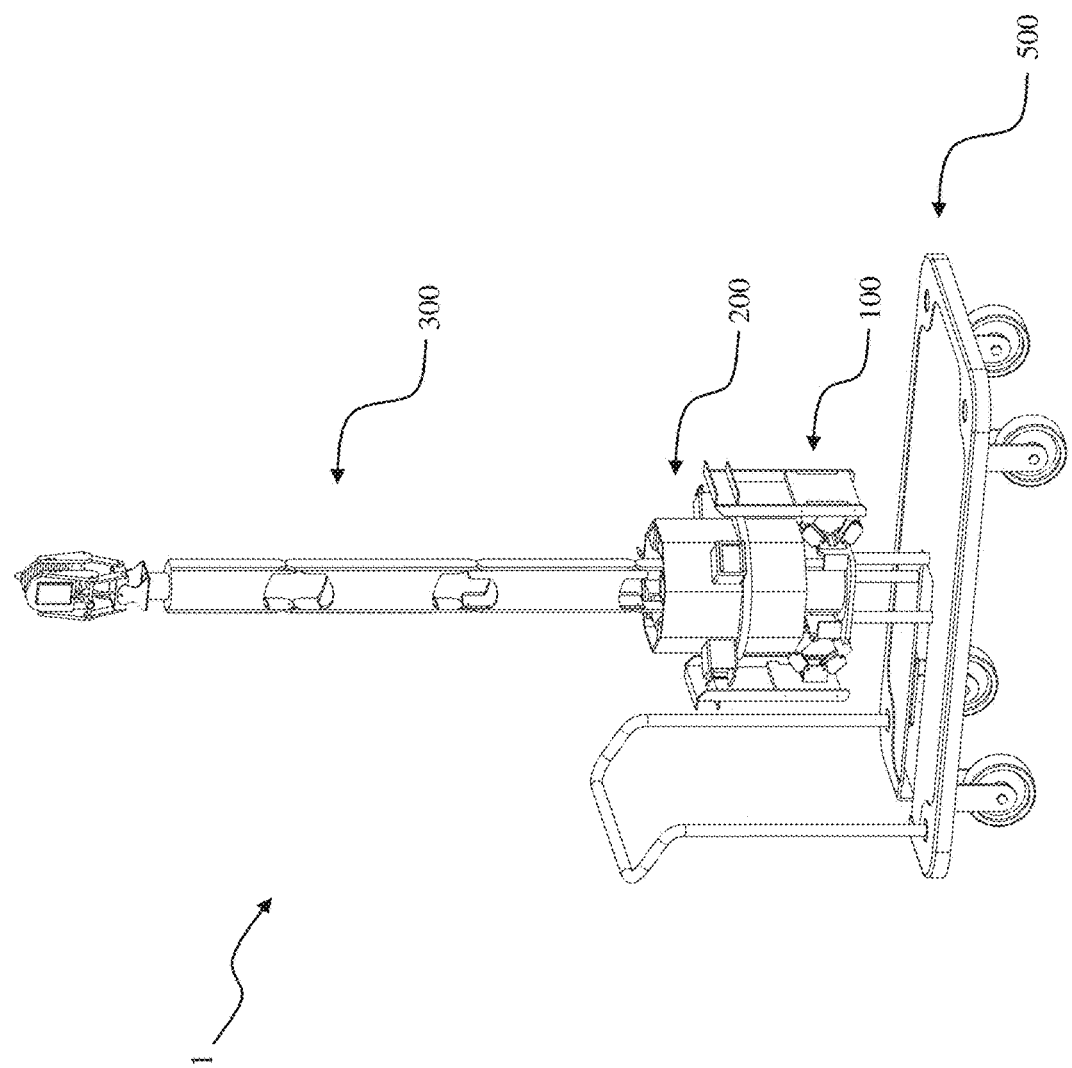
FIG. 3 is a perspective view of an embodiment of a TRM on a deployment cart.

FIG. 3 is a perspective view of an embodiment of a tank refurbishment manipulator (TRM) 1 on a deployment cart 500. The deployment cart 500 allows the TRM 1 to be transported between locations. The deployment cart 500 may vary to correspond to the size, shape, deployment methods, and other variables as required for different TRM embodiments. The TRM 1 may be mounted to the cart 500 such that it can enter a compartment from an access manway on the top or the bottom of a compartment. The TRM 1 comprises a plinth 100, a trolley 200, and a manipulator 300.

Figure 4:
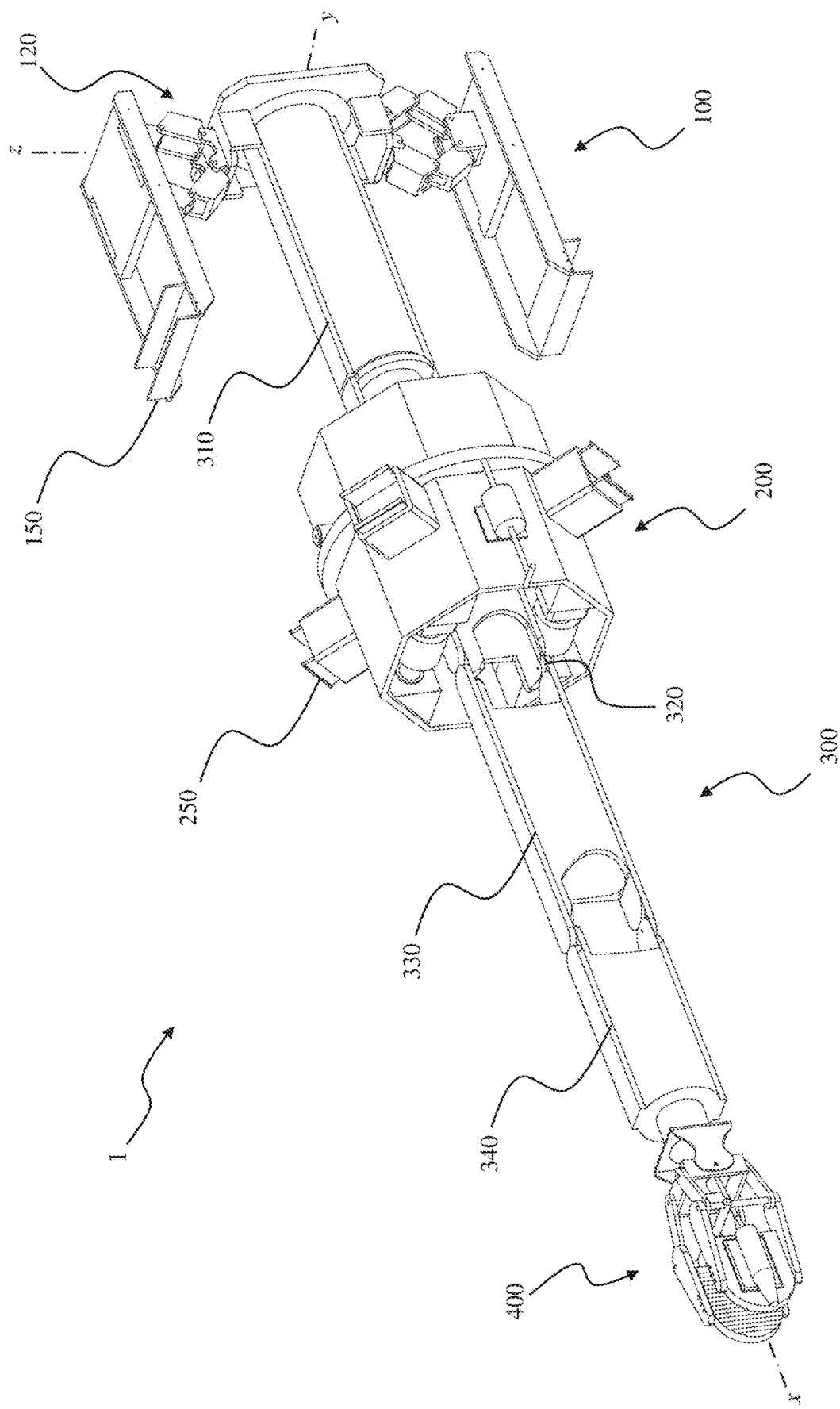
FIG. 4 is an isometric view of the TRM embodiment of FIG. 3.

FIG. 4 depicts an embodiment of a TRM 1. The depicted embodiment is used as an example in the following figures and disclosure; however the depicted embodiment is not necessarily the preferred embodiment. Embodiment preference is dependent upon the specific application and site requirements. It should be clear that while each embodiment is discussed as a separate whole from the other embodiments that various aspects from any one or more embodiments may be combined to form other embodiments not explicitly disclosed herein.

The TRM 1 is a remotely operated device that is capable of moving in an inchworm-like fashion through confined or hazardous spaces to perform inspection, maintenance, and refurbishment operations. The inchworm-like fashion refers to controlled on-line motion which provides the TRM 1 the ability to move flexibly in three-dimensional spaces. The TRM 1 comprises a plinth 100, a trolley 200, and a manipulator 300. The plinth 100 comprises shoes 150 and actuators 120 operable to secure and position the TRM 1 within a manway. The trolley 200 comprises shoes 250 operable to secure the TRM 1 within a manway. The manipulator 300 comprises a sectioned arm and an end effector 400. In the depicted embodiment the sectioned arm comprises four sections 310, 320, 330, and 340. In the depicted embodiment the end effector 400 is a gripper. The manipulator 300 is used to carry out operations within the space.

Plinth

Figure 5:
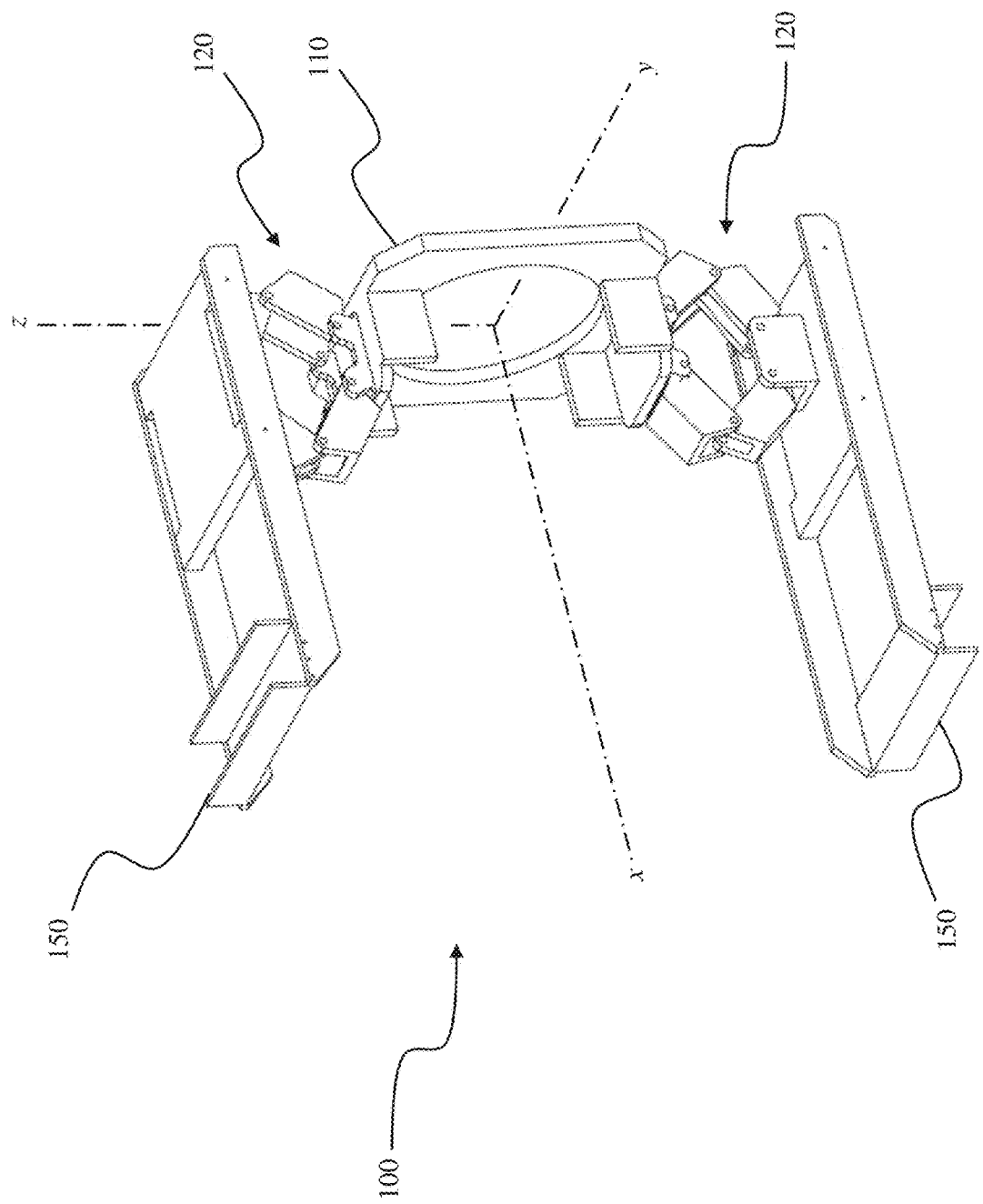
FIG. 5 is an isometric view of a plinth of the TRM embodiment of FIG. 3.

FIG. 5 depicts an embodiment of a plinth 100. The plinth 100 is one of two devices on the TRM capable of anchoring it to a manway. This anchorage facilitates movement of the TRM through the required space and provides support during operations. To anchor to a manway, the actuators 120 expand, causing the shoes 150 to engage the manway.

The upper and lower actuators 120 may be controlled independently or together allowing the TRM to be centered in offset manways. In some embodiments the plinth 100 may be adjustable such that it may anchor between floor and ceiling, or wall to wall, in areas where manways are located too distant for standard travel or other situations where the plinth 100 is unable to engage with a manway. In some embodiments the plinth 100 may comprise additional shoes 150. In some embodiments the plinth shoes 150 may be operable to clamp to the edge of the manways. In some embodiments the plinth shoes 150 may comprise a high friction material to prevent or reduce slippage when the plinth 100 is anchored. In some embodiments, a constant force is applied to the plinth shoes 150 via the actuators 120 when the plinth 100 is anchored to a manway in order to provide greater support to the TRM. The force may be applied any time the plinth 100 is anchored in a manway but is particularly useful when the trolley is not anchored to a manway, i.e. during positioning of the TRM.

The plinth 100 comprises a central support plate 110 to which a manipulator may be coupled. In some embodiments the central support plate 110 interfaces with the manipulator via a slewing ring, thus allowing the manipulator to rotate about its central axis.

Trolley

Figure 6:
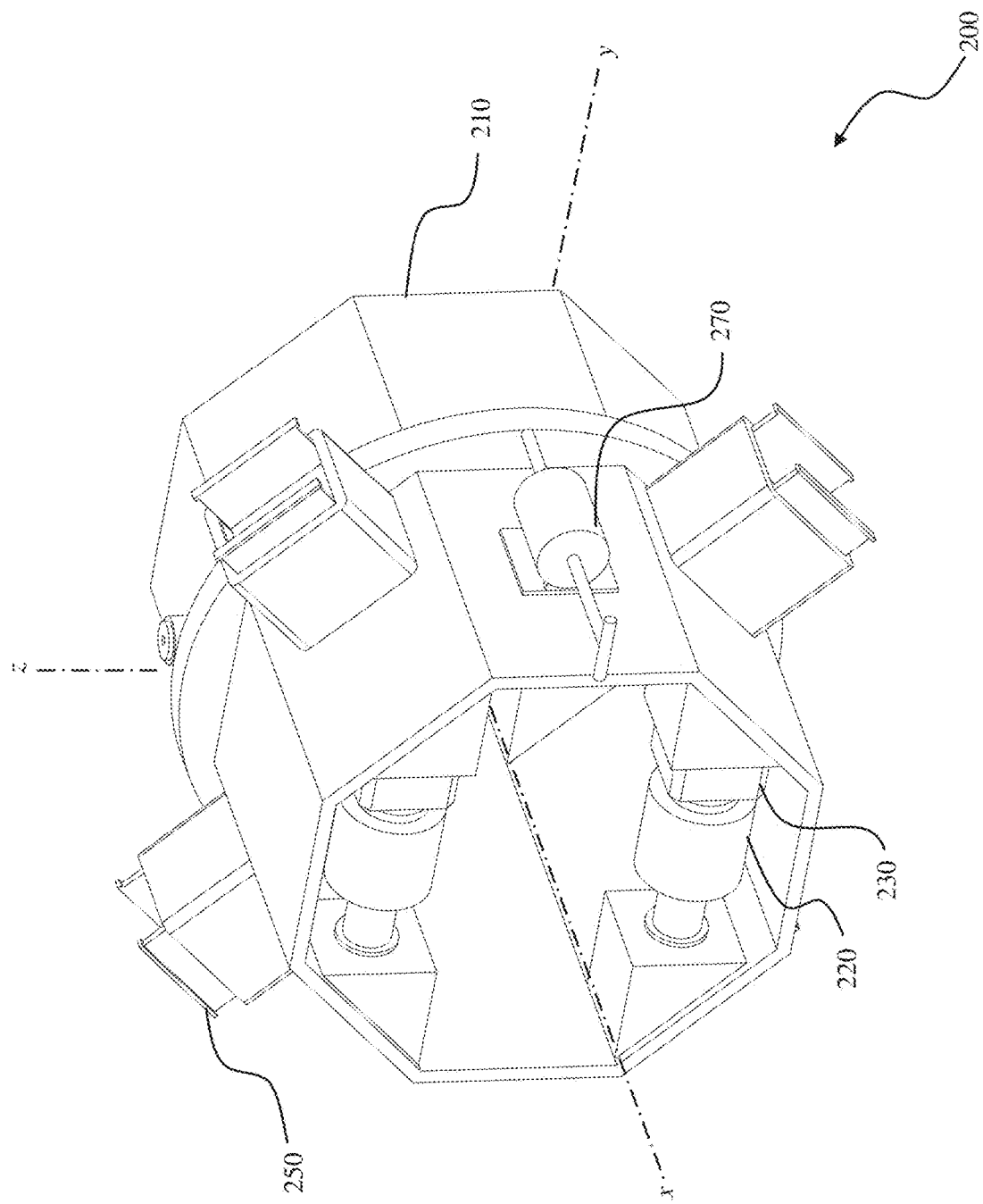
FIG. 6 is an isometric view of a trolley of the TRM embodiment of FIG. 3.

FIG. 6 depicts an embodiment of a trolley 200. The trolley 200 is capable of anchoring the TRM to a manway using shoes 250. This provides a secondary anchorage for operations and allows for movement of the TRM between compartments. The depicted embodiment shows four trolley shoes 250, however other trolley-shoe-amounts are possible. The trolley 200 may comprise one or more tool holders 270 coupled to the housing 210. The trolley 200 may be equipped with one or more imaging or other sensors. Imaging sensors such as cameras may be implemented for monitoring and guiding operations remotely. The trolley 200 comprises one or more rollers 220 or pairs of rollers 220 which are used to facilitate motion between the trolley 200 and the manipulator. Power for movement of the trolley 200 along the manipulator may be provided by motors 230. Other conveyance methods are possible.

In some embodiments the trolley shoes 250 may be operable to clamp to the edge of the manways. In some embodiments the trolley shoes 250 may comprise a high friction material to prevent or reduce slippage when the trolley 200 is anchored. In some embodiments, a constant force is applied to the trolley shoes 250 when the trolley 200 is anchored to a manway in order to provide greater support to the TRM. The force may be applied any time the trolley 200 is anchored in a manway but is particularly useful when the plinth is not anchored to a manway, i.e. during positioning of the TRM.

Figure 7:
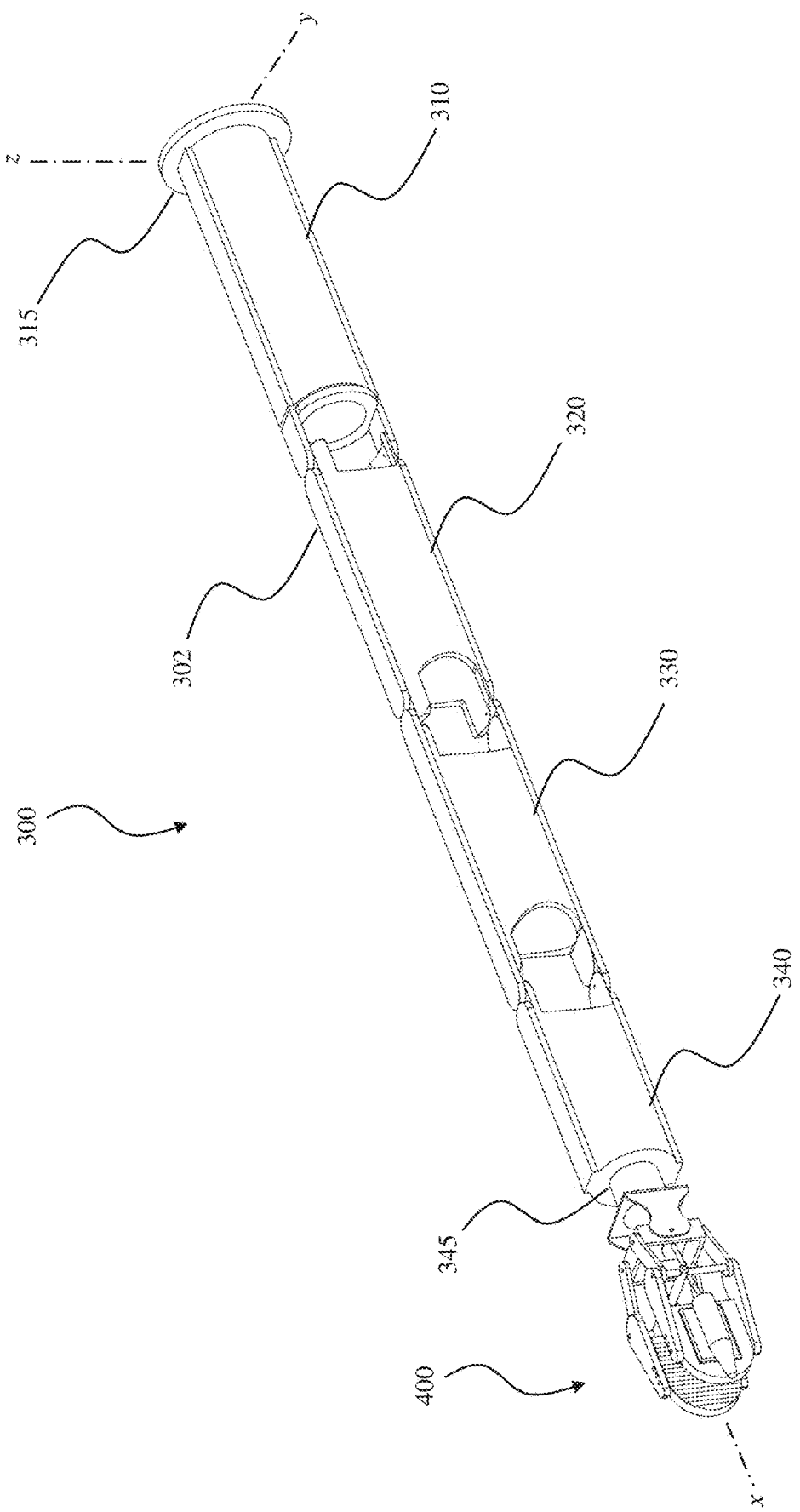
FIG. 7 is an isometric view of a manipulator of the TRM embodiment of FIG. 3.
Figure 8A:
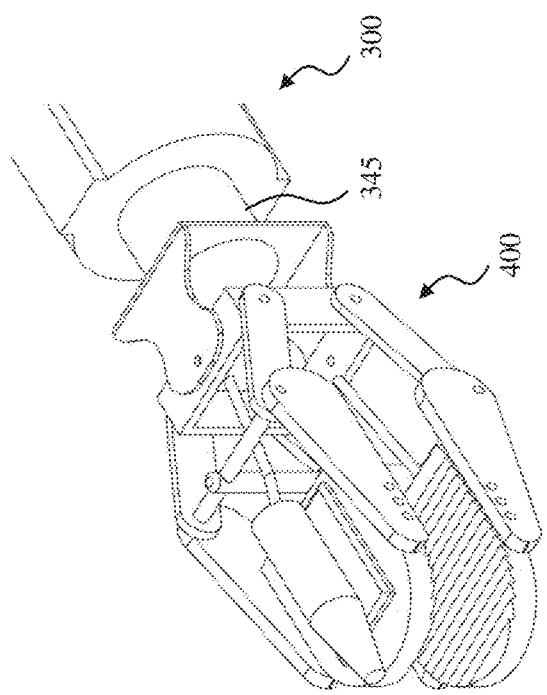
FIG. 8A depicts an isometric view of an embodiment of a gripper.
Figure 8C:
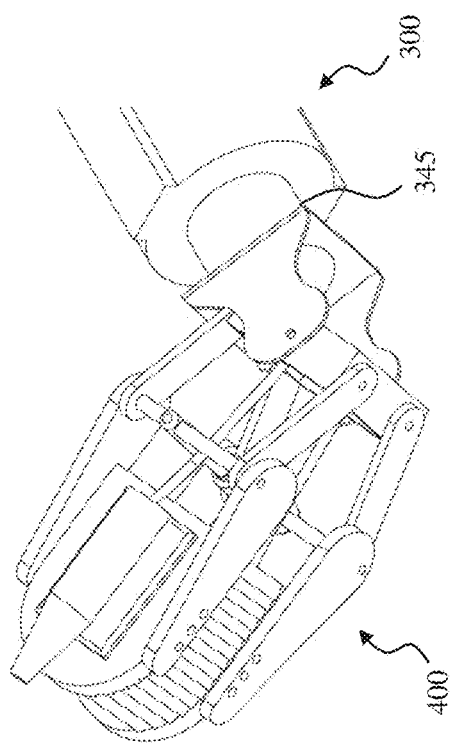
FIG. 8C depicts the gripper of FIG. 8A bent at angle about its joint.
Figure 8B:
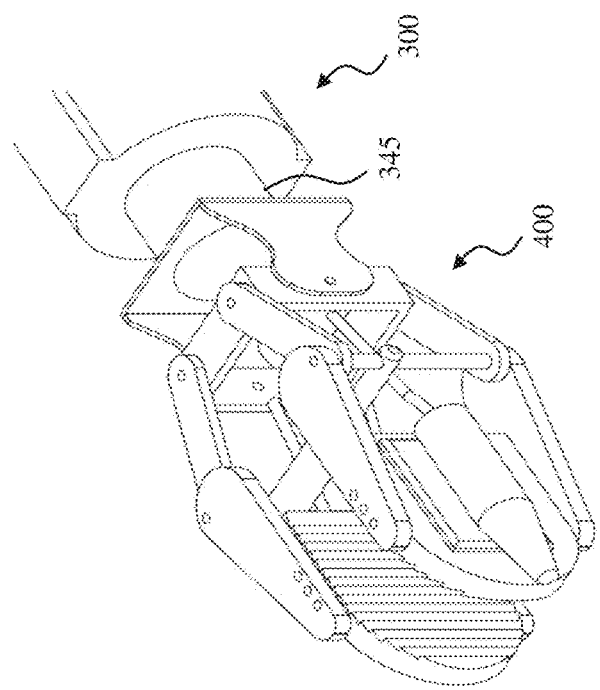
FIG. 8B depicts the gripper of FIG. 8A rotated 90° about its central axis.
Figure 8D:
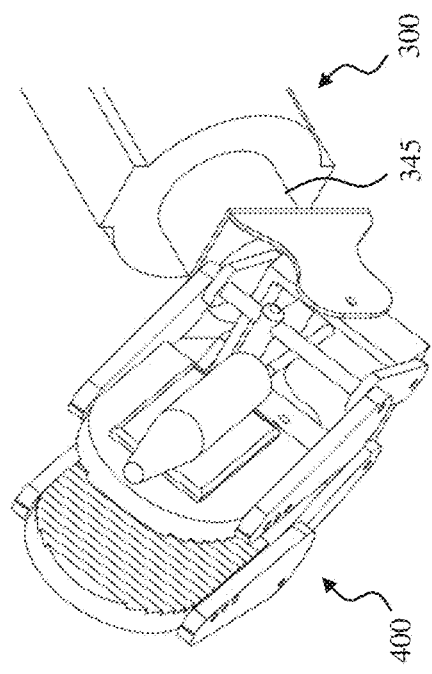
FIG. 8D depicts the gripper of FIG. 8C rotated to an angle about its central axis.

In some embodiments the trolley 200 comprises one or more rollers 220. In some embodiments the rollers 220 are mounted in pairs wherein the pairs are mounted opposite one another and run on opposite sides of the arm sections. In some embodiments one or more of the rollers 220 are motorized to cause movement along the track 302 (FIG. 7). In some embodiments one or more rollers 220 are passive (unpowered). Passive rollers are operable to keep the trolley 200 on track by providing more support and friction between the trolley 200 and the track 302. Some embodiments comprise one or more of active (powered) and passive (unpowered) rollers 220. In some embodiments the trolley 200 may further comprise one or more guides in proximity to the rollers 220 to prevent the trolley 200 from becoming misaligned or from losing contact with the tracks 302 particularly when the manipulator 300 has turned about its axis.

Manipulator

FIG. 7 depicts an embodiment of a manipulator 300. The manipulator 300 is a robotic arm that is used to perform operations in a confined or hazardous space. The manipulator 300 in the depicted embodiment is capable of motion in multiple axes thus providing a range of motion capable of reaching any area in the confined space. The multiple axes may comprise any one or more of: rotation about the plinth/manipulator interface, extension of extendable arms, yaw actuation of the joints, wrist 345 yaw, and wrist 345 rotation, among others. The number and types of axes may vary between embodiments depending upon number of arm sections, arm type(s), joint type(s), and end effector(s) 400. The manipulator 300 is coupled to the plinth and, in some embodiments, may be equipped with a slewing ring 315 at the plinth interface to facilitate rotation about the central axis x.

Arm Sections

In the depicted embodiment the arm sections are tubular; however, other shapes are possible. In the depicted embodiment each of the arm sections is generally the same length, however, each arm section may differ in length depending on the specific operational requirements and environment.

The manipulator 300 may comprise any number of arm sections as required by the particular application. In the depicted embodiment the manipulator 300 comprises four arm sections 310, 320, 330, and 340. Each arm section may comprise tracks 302 or rails operable to facilitate motion of the trolley along the manipulator 300. In the depicted embodiment each arm section comprises two tracks 302 situated directly across from each other and parallel to the x-z plane.

In some embodiments at least one of the rollers 220 and the track 302 are formed of rubber strips or other high friction material so as to prevent slippage when the trolley 200 is in motion. In some embodiments the rollers 220 are pinion gears and the track 302 is a rack wherein the pinion and rack teeth are sized to engage each other.

While the depicted embodiments show at least two rollers 220 and tracks 302 other quantities of rollers are possible. For instance, the trolley 200 may comprise two sets of two rollers 220 wherein two rollers 220 are on the top and two are on the bottom directly across from each other. The rollers 220 on each side may be spaced such that the length between them is greater than the length of a straightened joint such that at least one roller 220 will be in contact with the track 302 at all times. Other conveyance systems and methods are possible.

In some embodiments one or more of the arm sections are extendable by means such as linear actuators which may be one or more of mechanical, electro-mechanical, hydraulic, electric over hydraulic, pneumatic, magnetic, piezoelectric, and linear motor actuator. In the depicted embodiment the first arm section 310 is extendable. Extendable arm sections may telescope out and comprise two or more telescoping segments. Generally, when extendable arm sections are utilized, the trolley is positioned such that it need not traverse the extendable arm section(s) while they are extended so it is not important for the tracks to remain continuous. For instance, when the TRM is fully anchored to a manway and the arm is extended to perform operations in the compartment. However, in embodiments where tracks are used in concert with extendable arm sections which the trolley may need to traverse, the tracks may be designed such that they extend with the arm thus providing a continuous track for the trolley to traverse.

One method of maintaining continuous tracks is to combine or couple a central width of track to one portion of the extendable arm section and two outer tracks on the other extendable arm section wherein the two outer tracks fit on either side of the central width of track. When the extendable arm section is fully contracted the central width of track and the two outer tracks will form a complete track of comparable geometry to the track on non-extendable arm sections. In embodiments implementing this form of track, a low friction material may be used on one or more of the edges between the central width of track and the outer tracks to facilitate motion between them.

Another method for maintaining continuous tracks is to fix the track to the extending portion of the extendable arm section and allow it to slide in guides on the fixed portion of the extendable arm section as the arm section is extended. In some embodiments incorporating this method, a roll of extra track may be situated at the end of the fixed arm and may be fed over a pin, or other such mechanism, to keep the track level as the arm section extends.

Joints

The manipulator 300 may comprise one or more joints. In some embodiments one or more of the joints may be a chain joint. Chain joints are described in co-pending patent application entitled Systems and Methods for Chain Joint Cable Routing, Ser. No. 14/975,544 filed Dec. 18, 2015, with a priority date of Dec. 19, 2014, which is hereby incorporated by reference in its entirety.

In some embodiments one or more of the joints may be hydraulically actuated.

The joints in the depicted embodiment all actuate in the same plane, however, the joints in some embodiments may be offset to actuate in different planes or at different angles with respect to each other. The depicted joints are capable of motion in only one plane; however, other joint types with different ranges of motion, such as ball joints, may be utilized.

Cable Management

Cables may run at least one of inside and outside of the manipulator 300. The term "cable" is intended to comprise electrical wiring, hydraulic hoses, pneumatic hoses, fiber optic cable, communications cable, or any other cables, wires, or lines as well as bundles thereof. The cables may be used to transfer/transmit data pertaining to sensing and/or control in the system or any extensions attached to the system. Additionally cables may be included for materials transfer into and out of the confined space. Control cables for the end effectors may be routed through the interior of the manipulator arm 300 through a cable management tether in some embodiments.

An embodiment of a cable management system for the TRM incorporates a RolaTube® attached to the tether in proximity to the TRM. The embodiment of the cable management system may contain and support a tether containing the TRM services and material transfer lines between sections. This may reduce forces required for tether movement and prevent entanglement with internal infrastructure in the confined space.

End Effectors

The working end of the manipulator 300 may be equipped with an end effector. FIGS. 8A through 8D depict several views of a gripper 400 end effector for use on the working end of the manipulator 300. The gripper 400 is capable of grasping and deploying the various tools required for operations within the confined space. The depicted gripper 400 is capable of rotating a full 360° at wrist rotate joint 345. The depicted gripper 400 is also capable of bending 180° (wrist pitch).

A variety of other end effectors are possible. Gripper end effectors are the most universal because they are capable of gripping a wide variety of tools that may be used in different applications. In simpler or more specialized applications, the end effector may be a specific tool. In some embodiments end effectors are actuated by one or more of mechanical, electro-mechanical, hydraulic, electric over hydraulic, pneumatic, magnetic, piezoelectric, and linear motor actuator.

Range of Motion

Figure 9A:
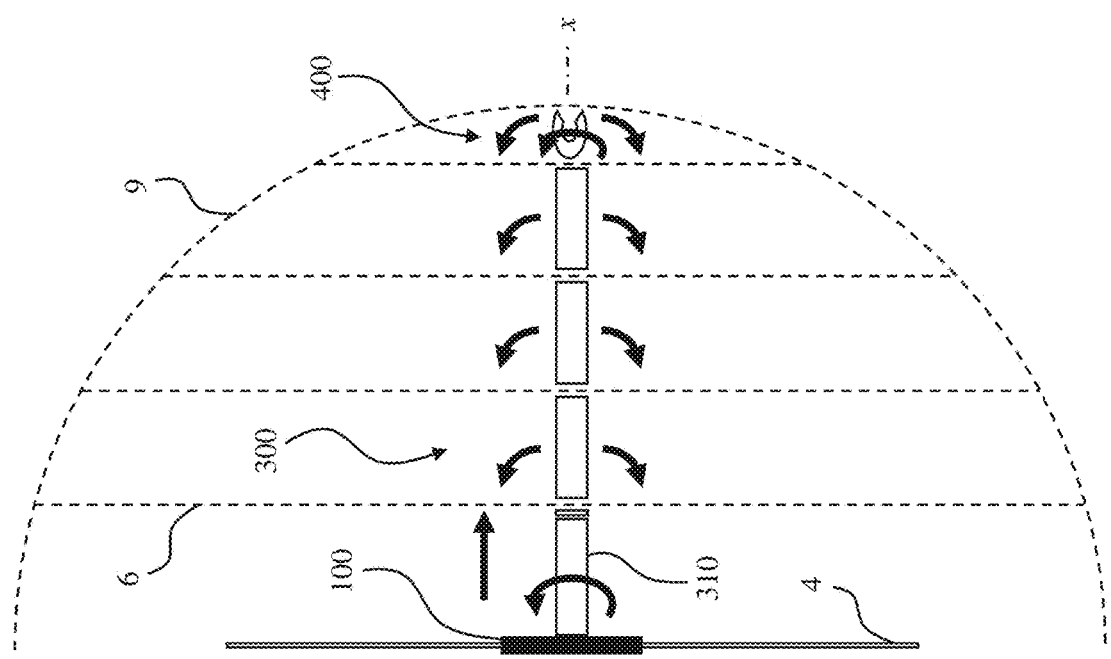
FIG. 9A is an illustration depicting the range of motion of an embodiment of a TRM.
Figure 9C:
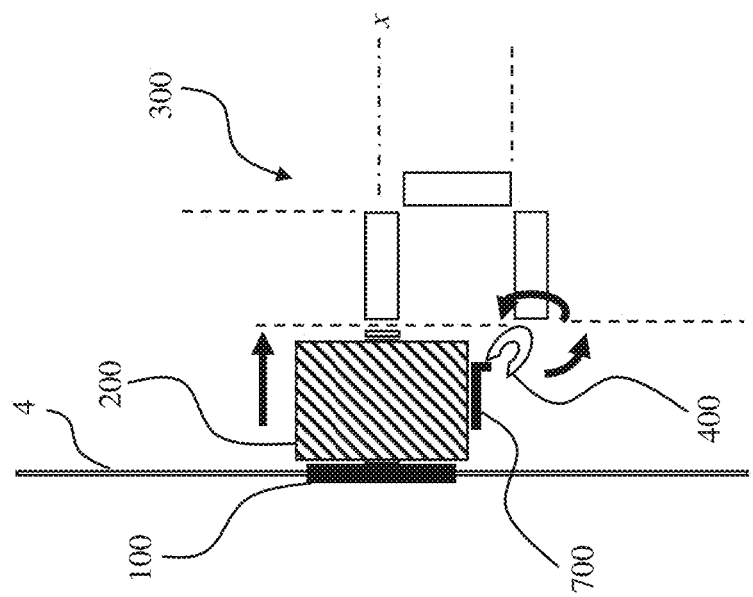
FIG. 9C is an illustration depicting a manipulator embodiment reaching a tool on a trolley.
Figure 9B:
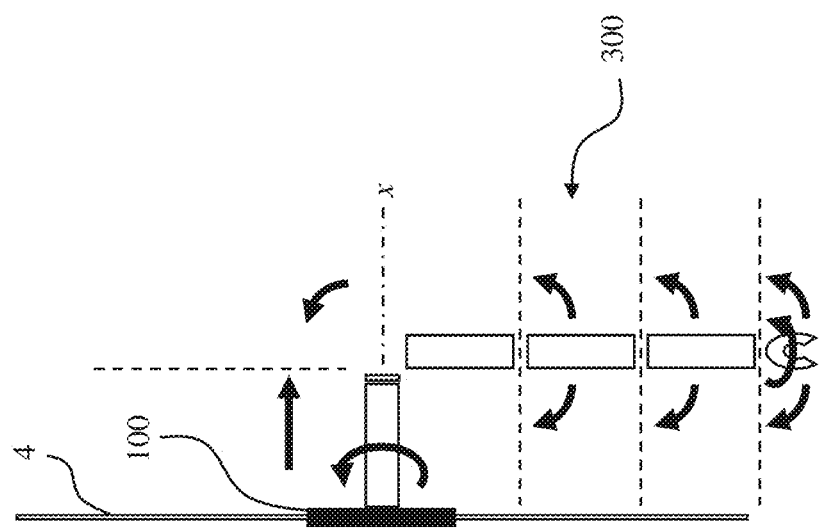
FIG. 9B is an illustration depicting the range of motion of an embodiment of a TRM.

FIGS. 9A through 9C are illustrations depicting the range of motion of the manipulator 300. FIG. 9A depicts the TRM when the plinth 100 is secured in an opening in a wall 4 and the manipulator 300 is fully straightened along the x-axis. The trolley has been omitted for clarity. The manipulator 300 has sufficient range of motion to perform operations within the confined space. The range of motion for the TRM will look the same from any angle about the x-axis when the manipulator is capable of rotation about the x-axis, as in the depicted embodiments. In the depicted embodiments the first arm section 310 is extendable; however any one or more of the other arm sections may be extendable. In some embodiments none of the arm sections are extendable. The outermost reach of the TRM is defined by the total length of the manipulator 300 when fully extended as depicted by the arc 9. The vertical lines 6 show that each joint in the manipulator 300, and the wrist joint on the end effector 400, is capable of bending 180°. The wrist joint in the depicted embodiment is also capable of rotation about its central axis.

FIG. 9B depicts the TRM when the plinth 100 is secured in an opening in a wall 4 and the manipulator 300 is bent at the first joint to 90°. The trolley has been omitted for clarity. FIG. 9C depicts the TRM when the plinth 100 is secured in an opening in a wall 4 and the manipulator 300 is reaching the trolley 200 to retrieve a tool 700 using the end effector 400. If each joint can bend each arm section to 90° in relation to each other, as in the depicted embodiment, the manipulator 300 may be capable of reaching the full extents of the compartment, including the wall 4 to which the TRM is anchored. In some embodiments one or more of the joints may be capable of bending more than 90° in at least one direction.

System Operation

The TRM is capable of moving between manways in a confined space in an inchworm-like fashion. The so-called inchworm-like fashion refers to controlled on-line motion which provides the TRM the ability to move flexibly in three-dimensional spaces. This motion involves extending and retracting the plinth and trolley shoes from one manway to the next. When the TRM is fully anchored in a manway the manipulator is used to perform operations in the confined or hazardous space. In some embodiments, the manipulator has sufficient range of motion to perform operations at every location within the confined or hazardous space.

The following figures are not necessarily to scale. Different applications and embodiments may vary the overall geometry of the TRM and/or the environment in which it is being used. Deployment and retrieval of the TRM occur in much the same way as the motion described and depicted in the following figures.

Figure 10A:
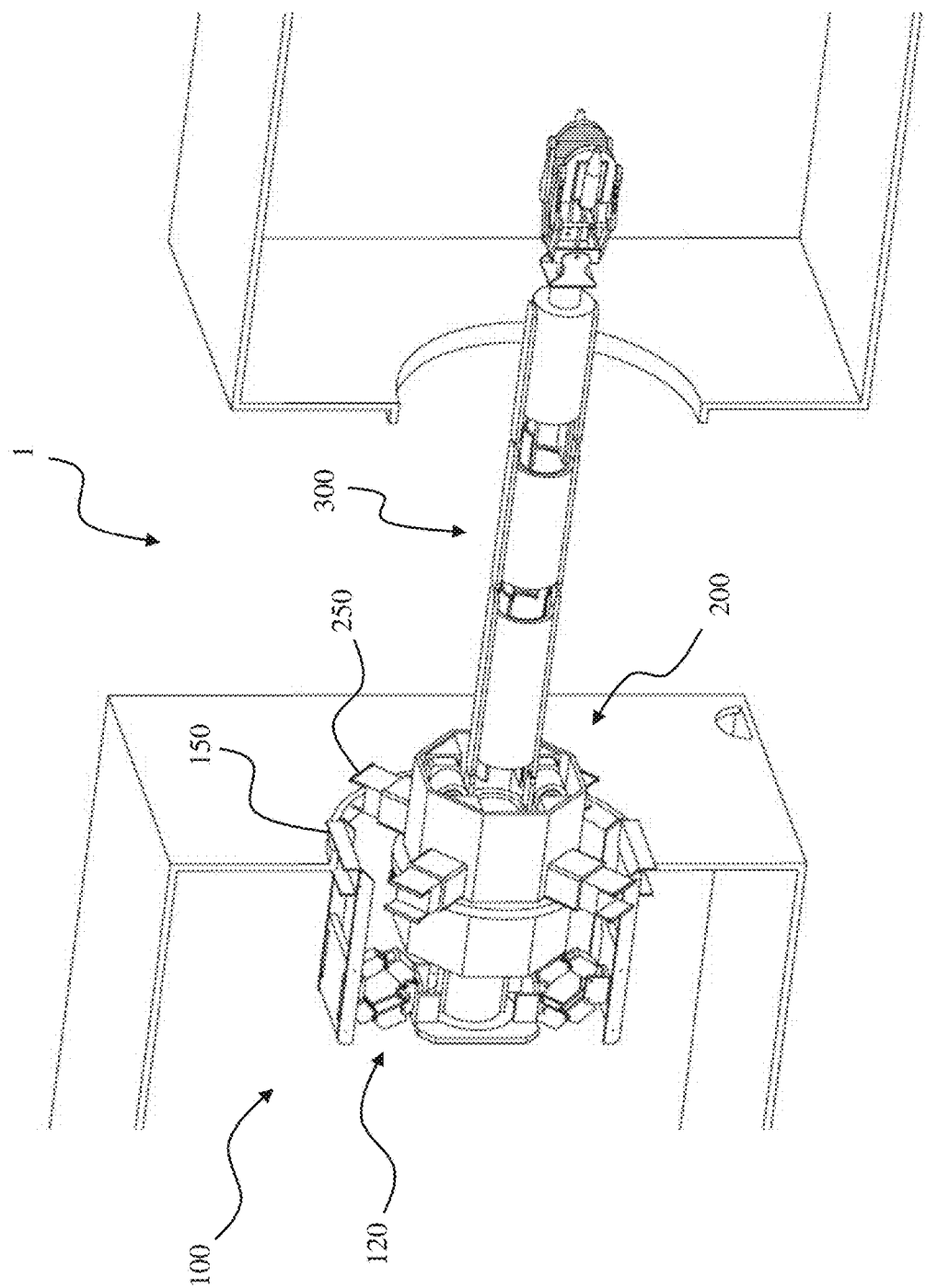
FIG. 10A is a cutaway depicting a TRM fully seated in the manway.

FIGS. 10A and 10B depict the TRM 1 fully seated in the manway. FIG. 10A is a cutaway showing the TRM 1 from an angle. FIG. 10B depicts the TRM 1 from the working end along the central axis. When the TRM 1 is fully engaged in a manway both the plinth shoes 150 and the trolley shoes 250 are extended fully, securely anchoring the TRM 1 in place in the manway.

In some embodiments all of the trolley shoes 250 are actuated together, i.e. they all actuate the same distance at the same time, thus requiring the trolley 200 to be centered in the manway to achieve optimal support. In some embodiments the trolley shoes 250 may be actuated independently or in separate groups to allow for trolley 200 offset. In embodiments where all of the trolley shoes 250 actuate at the same time, the plinth 100 is operable to adjust the position of the trolley 200 by adjusting actuators 120. While the depicted embodiments typically show the plinth 100 in a vertical orientation, the plinth 100 may be situated at any angle as is necessary to position and support the trolley 200 and as is feasible given the geometry of the manway.

Figure 11A:
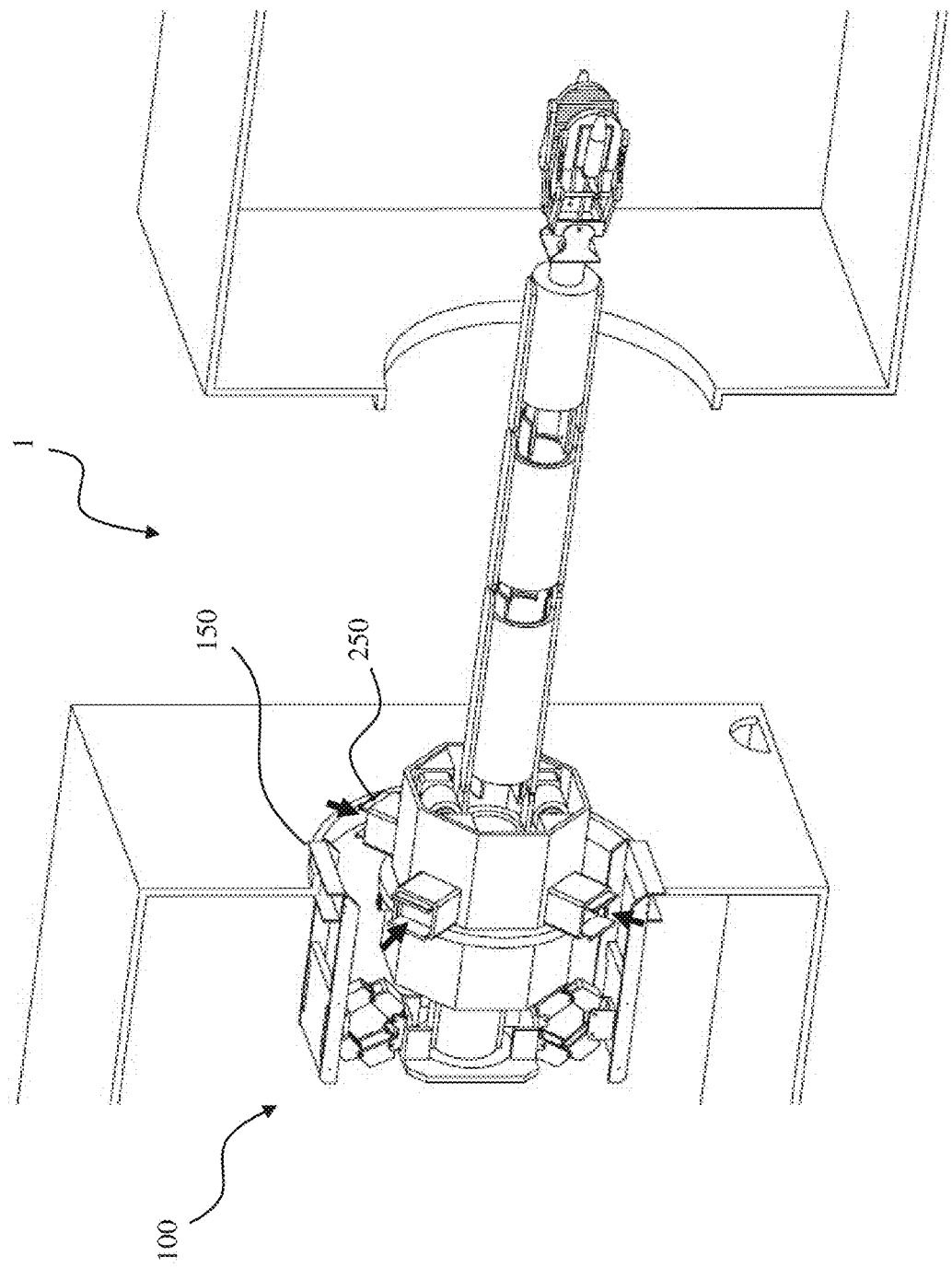
FIG. 11A is a cutaway depicting a TRM as the trolley shoes retract to prepare for movement to the next compartment.
Figure 11B:
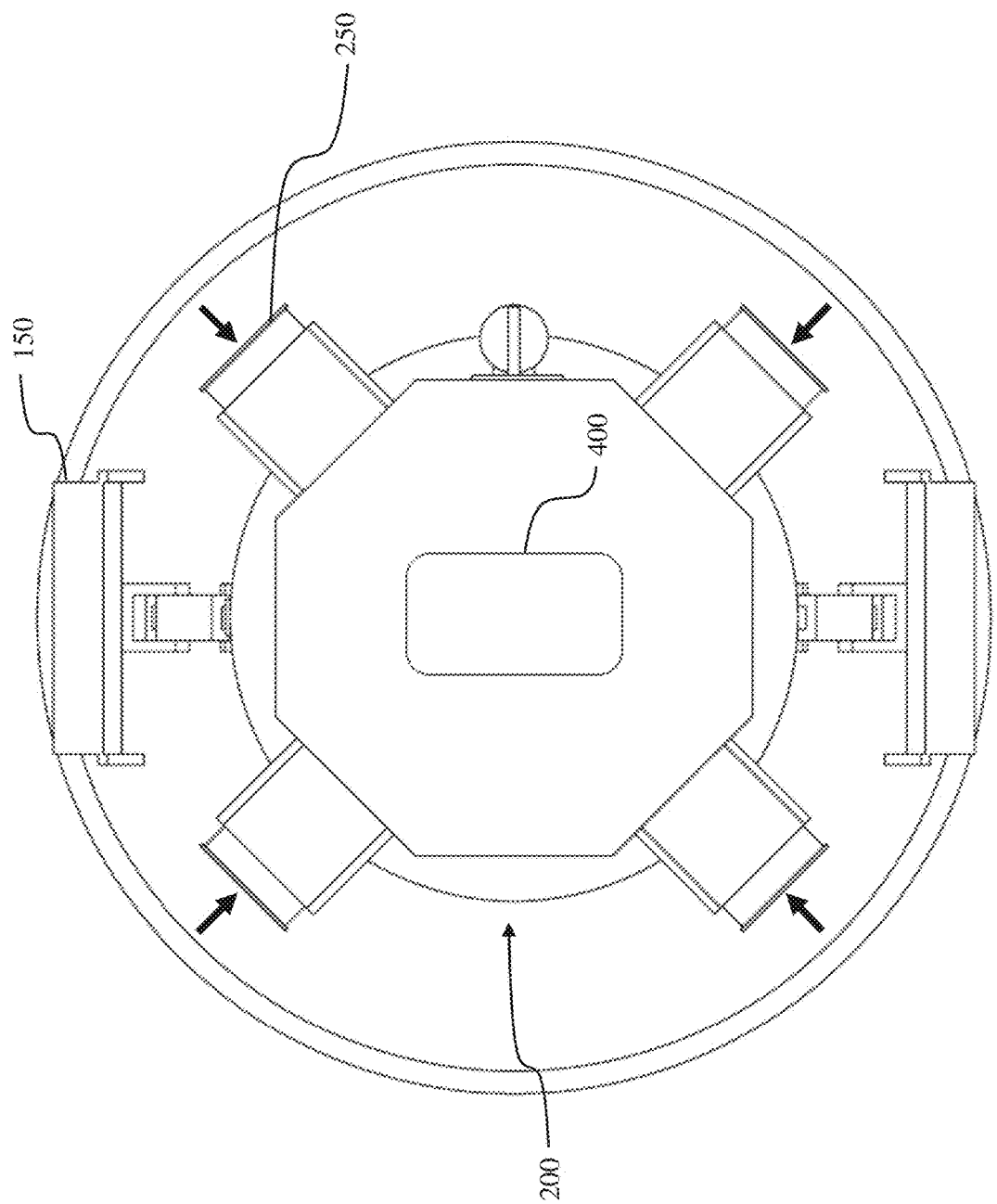
FIG. 11B depicts a TRM when the plinth is fully seated and centered in the manway and the trolley has retracted support viewed along the central axis of a TRM.

FIGS. 11A and 11B depict the TRM 1 during the first step of movement from one manway to the next. FIG. 11A is a cutaway showing the TRM 1 from an angle. FIG. 11B depicts the TRM 1 from the working end along the central axis. In the first step the trolley shoes 250 are retracted. The plinth 100 remains anchored to the manway and continues to provide support to the TRM 1. In some embodiments the plinth 100 may be weighted so as to balance the weight of the TRM 1 when the trolley 200 is moved away from the plinth 100 along the manipulator 300.

Figure 12A:
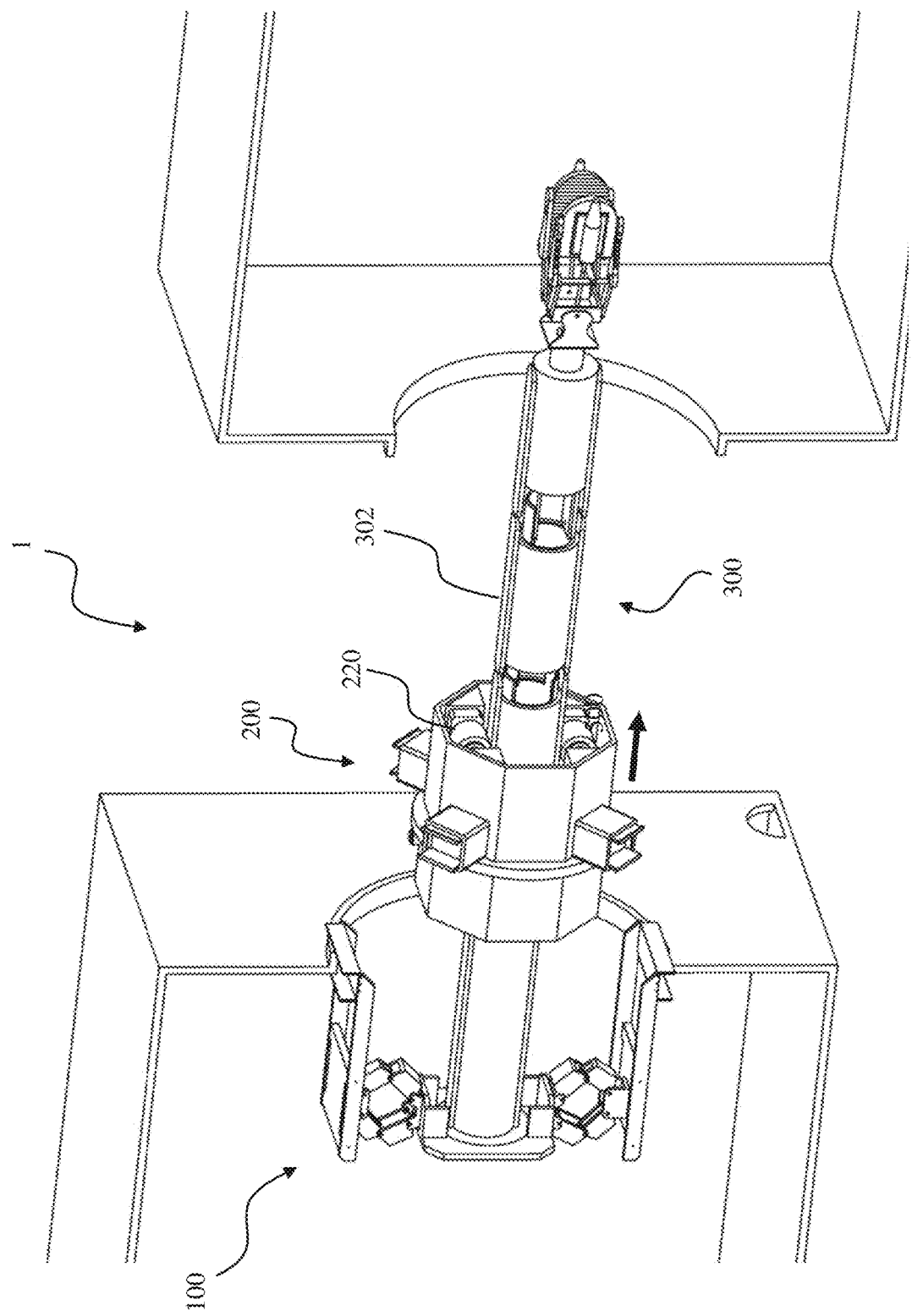
FIG. 12A depicts a trolley as it is advancing towards a next manway.
Figure 12B:
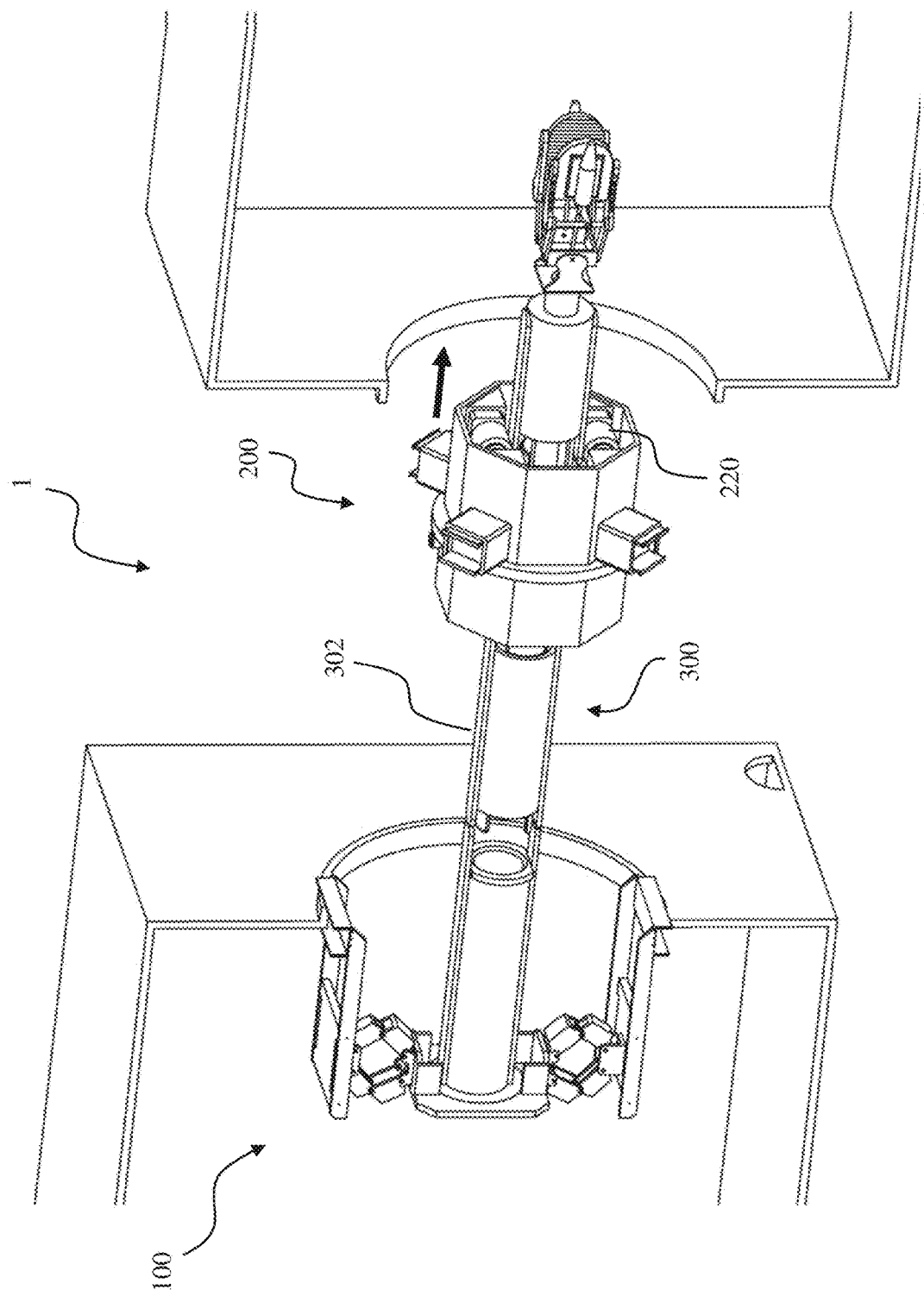
FIG. 12B depicts a trolley as it is nearing the next manway.

FIGS. 12A and 12B depict the trolley 200 as it is advancing towards a next manway. The trolley 200 comprises one or more rollers 220 that facilitate motion of the trolley 200 along the tracks 302 on the manipulator 300 when the plinth 100 is engaged in a manway and the trolley 200 is not.

Figure 13:
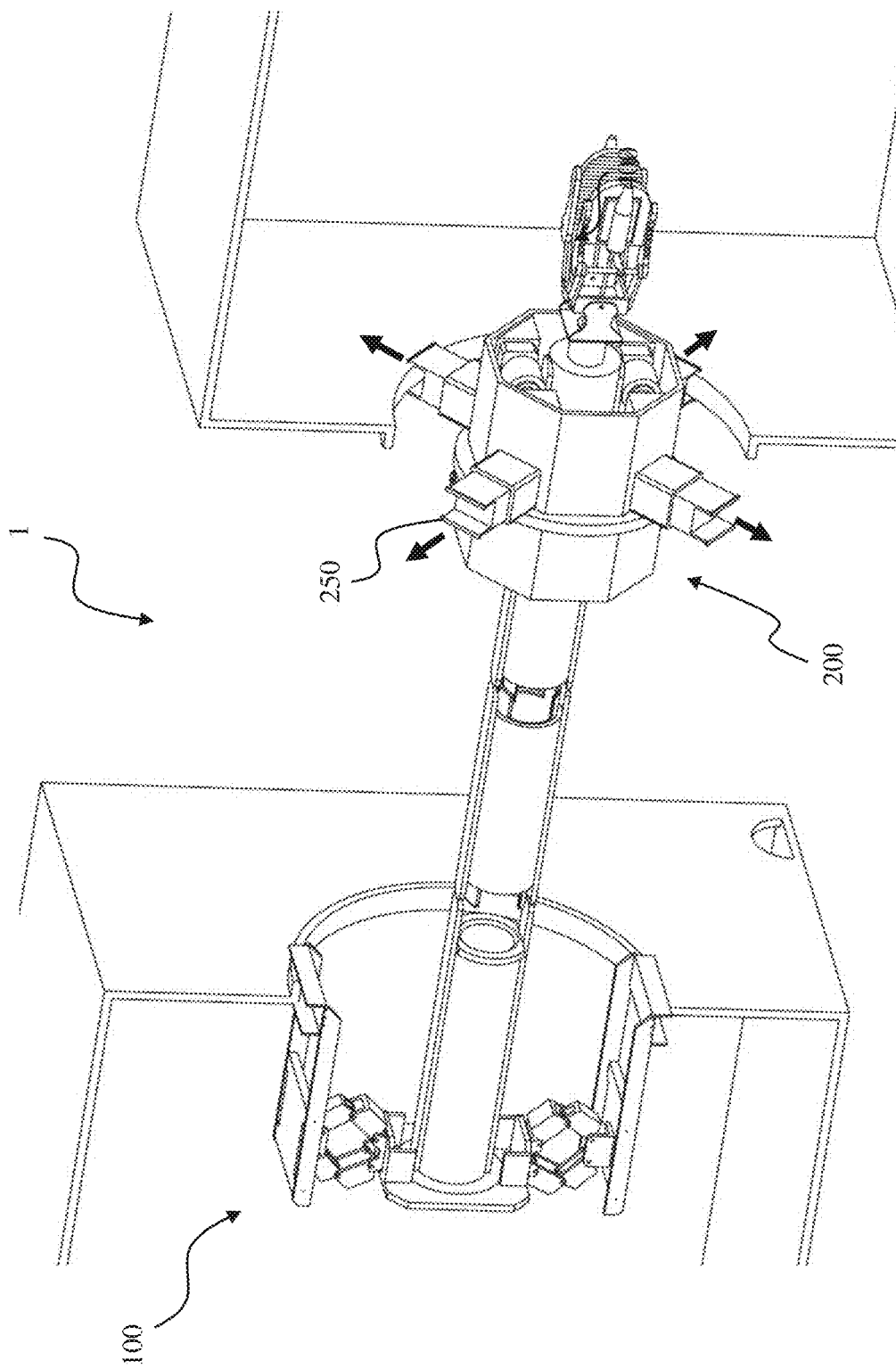
FIG. 13 depicts a trolley engaging support in the next manway.

FIG. 13 depicts the trolley shoes 250 extending to anchor the trolley 200 in the next manway. At this point in the TRM 1 positioning process the plinth 100 continues to remain anchored to the previous manway. When the trolley 200 is fully anchored in the next manway the plinth 100 may release support and retract from the previous manway.

Figure 14A:
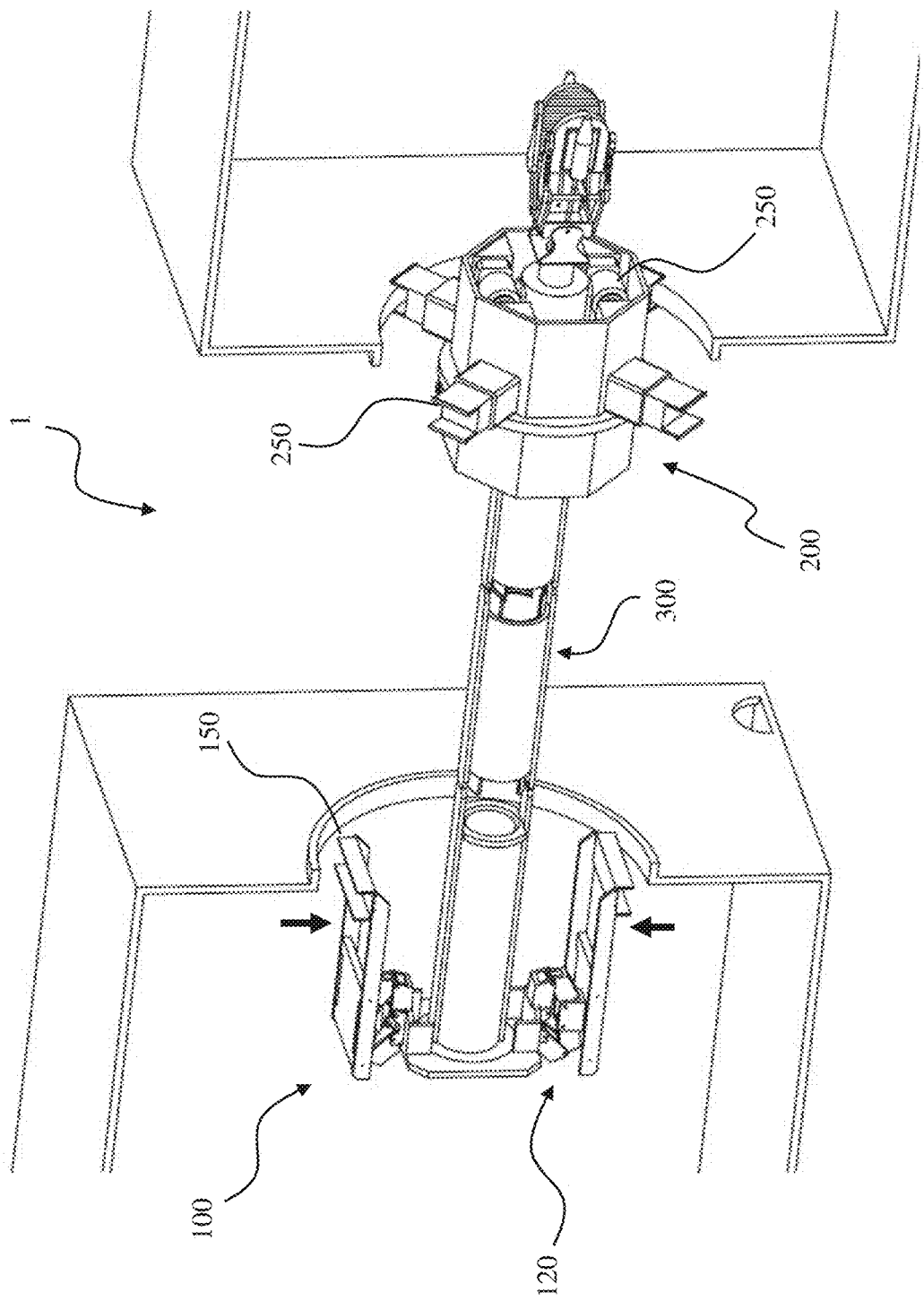
FIG. 14A depicts a plinth retracting from the previous manway.

FIGS. 14A and 14B depict the plinth 100 retracting from the previous manway. FIG. 14A is a cutaway showing the TRM 1 from an angle. FIG. 14B depicts the TRM 1 from the working end along the central axis. The plinth actuators 120 may retract concurrently or separately. When the plinth shoes 150 have fully disengaged from the manway the plinth 100 may begin motion towards the next manway.

Figure 15:
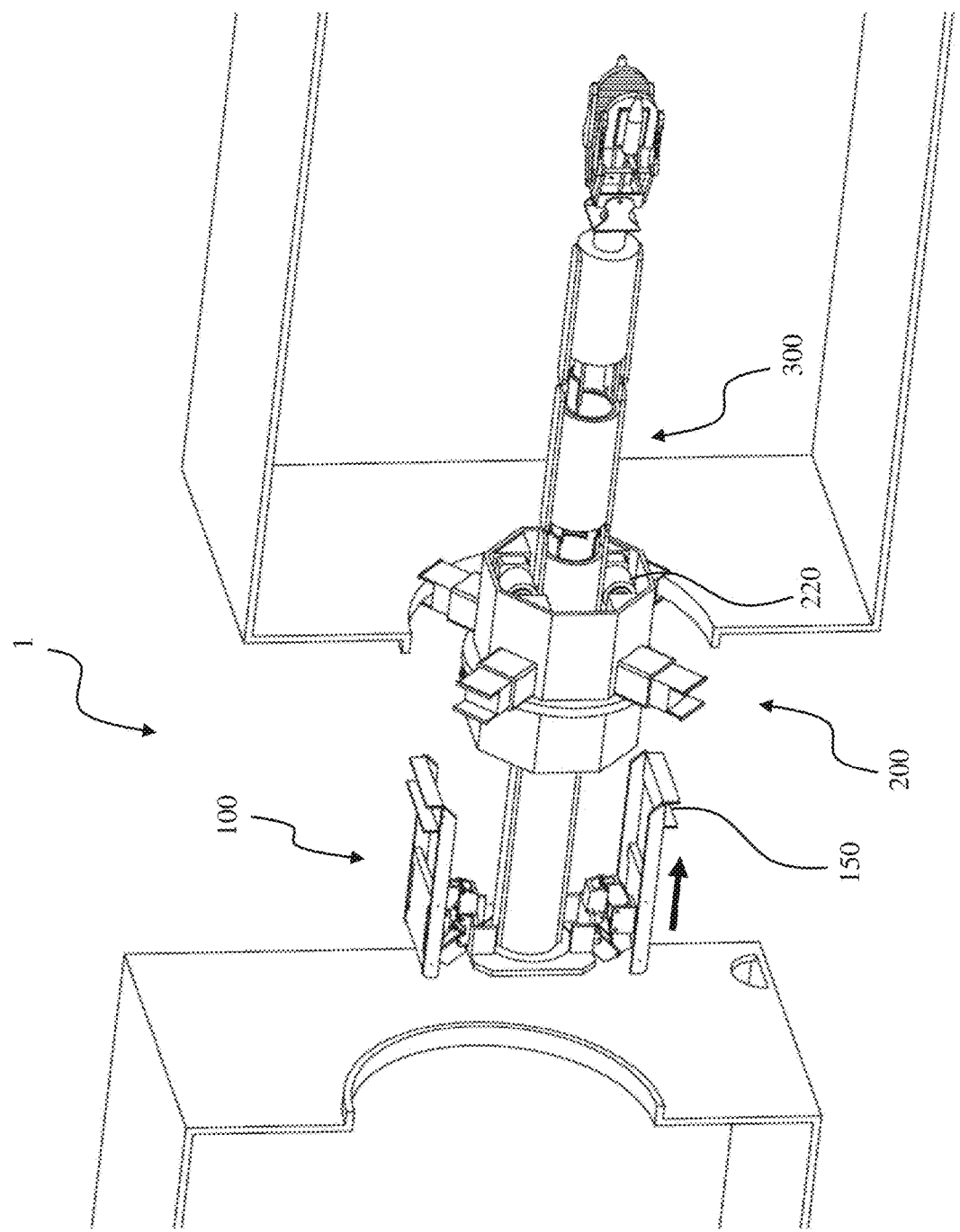
FIG. 15 depicts a plinth as it is advancing towards the next manway.

FIG. 15 depicts the plinth 100 as it is advancing towards the next manway. Advancement of the plinth 100 is carried out using the rollers 220 on the trolley 200. When the trolley 200 is fully engaged with a manway and the plinth 100 is not, activation of the rollers 220 causes the manipulator 300 to move along with the plinth 100 to which it is coupled. When the plinth 100 is positioned within the next manway the rollers 220 stop. The plinth shoes 150 may then be extended to engage with the next manway.

Figure 16:
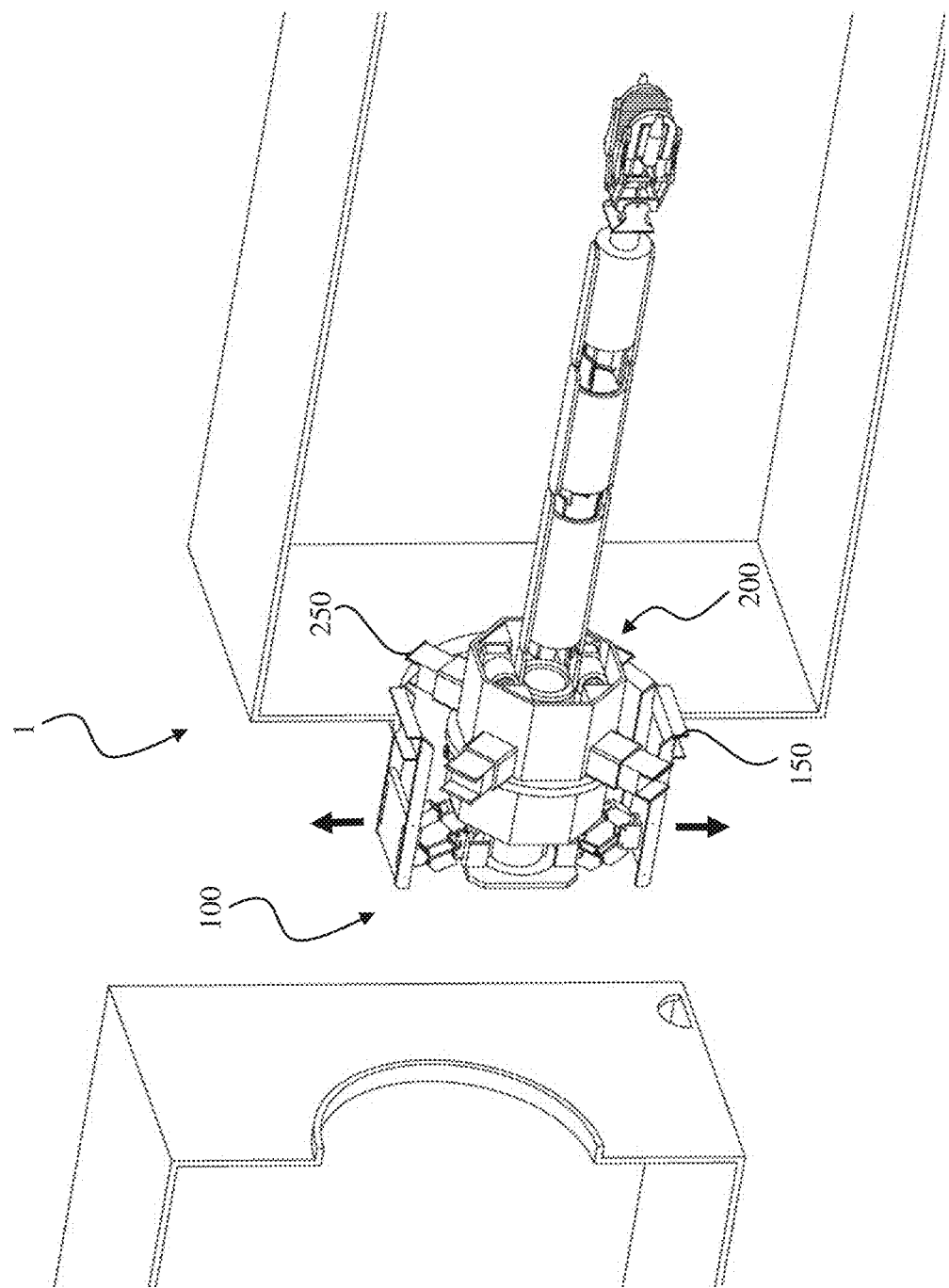
FIG. 16 depicts a TRM fully seated in the next manway.

FIG. 16 depicts the TRM 1 fully seated in the next manway. At this point in the movement process both the trolley shoes 250 and the plinth shoes 150 are fully engaged in the manway securing the plinth 100 and trolley 200 in position. The TRM 1 is prepared to carry out operations in the next compartment.

Figure 17:
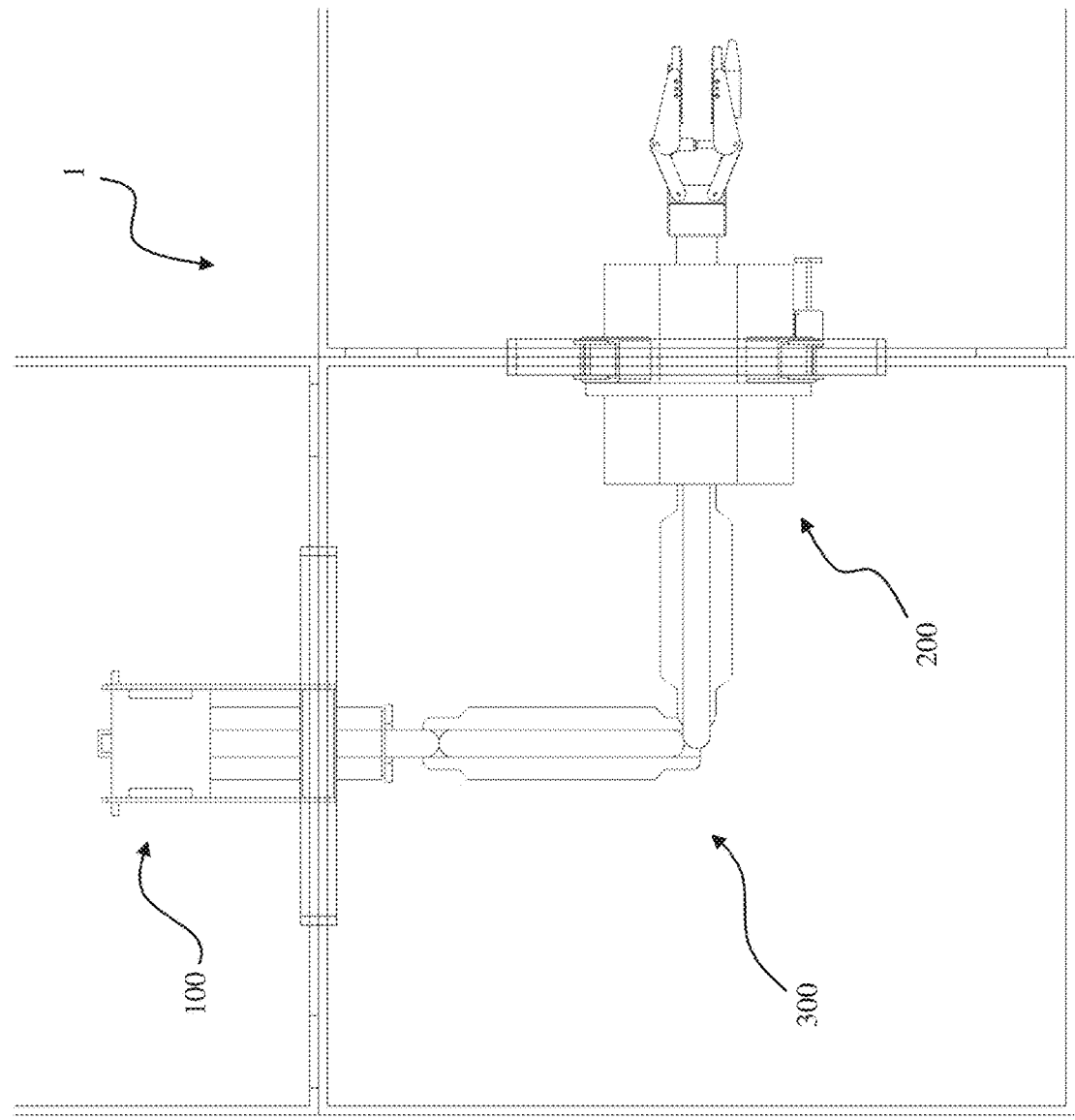
FIG. 17 depicts a TRM making a 90° turn between manways.

FIG. 17 depicts the TRM 1 when the plinth 100 is engaged in a manway and the manipulator 300 has made a 90° turn between manways. The TRM 1 is also capable of making a 90° turn in a particular compartment to change directions in the confined space or pull itself into the confined space from a deployment cart. The actuation sequence is similar to straight line movement described above, except in some embodiments the trolley 200 is moved to the last section of the manipulator 300 before it is positioned in the next manway.

Alternate Embodiment

FIGS. 18A through 28 depict an alternate embodiment of the TRM. It should be clear that while each embodiment is discussed as a separate whole from other embodiments, various aspects from any one or more embodiments may be combined to form other embodiments not explicitly disclosed herein.

Figure 18A:
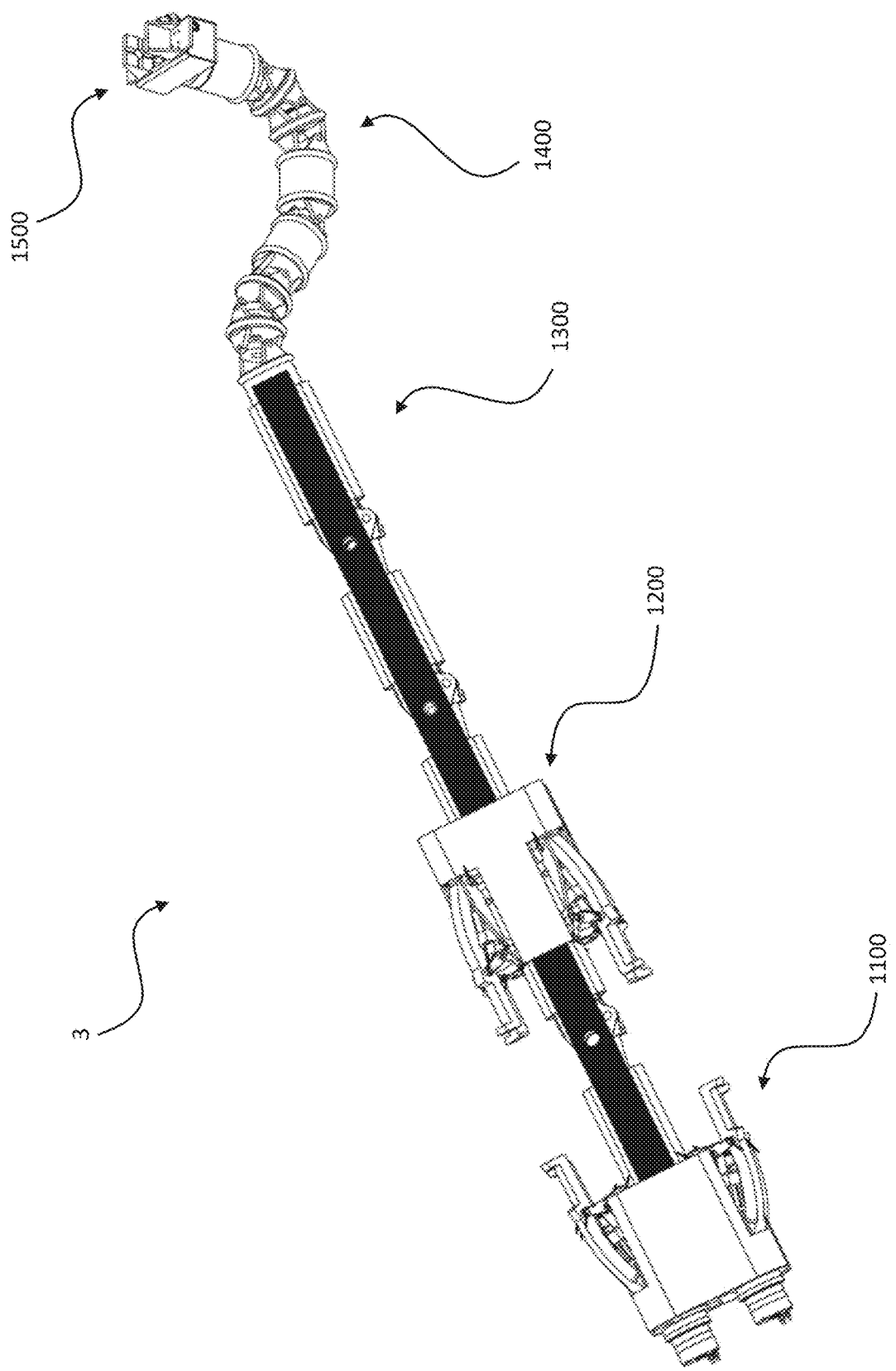
FIG. 18A depicts an isometric top view of an embodiment of a TRM.
Figure 18B:
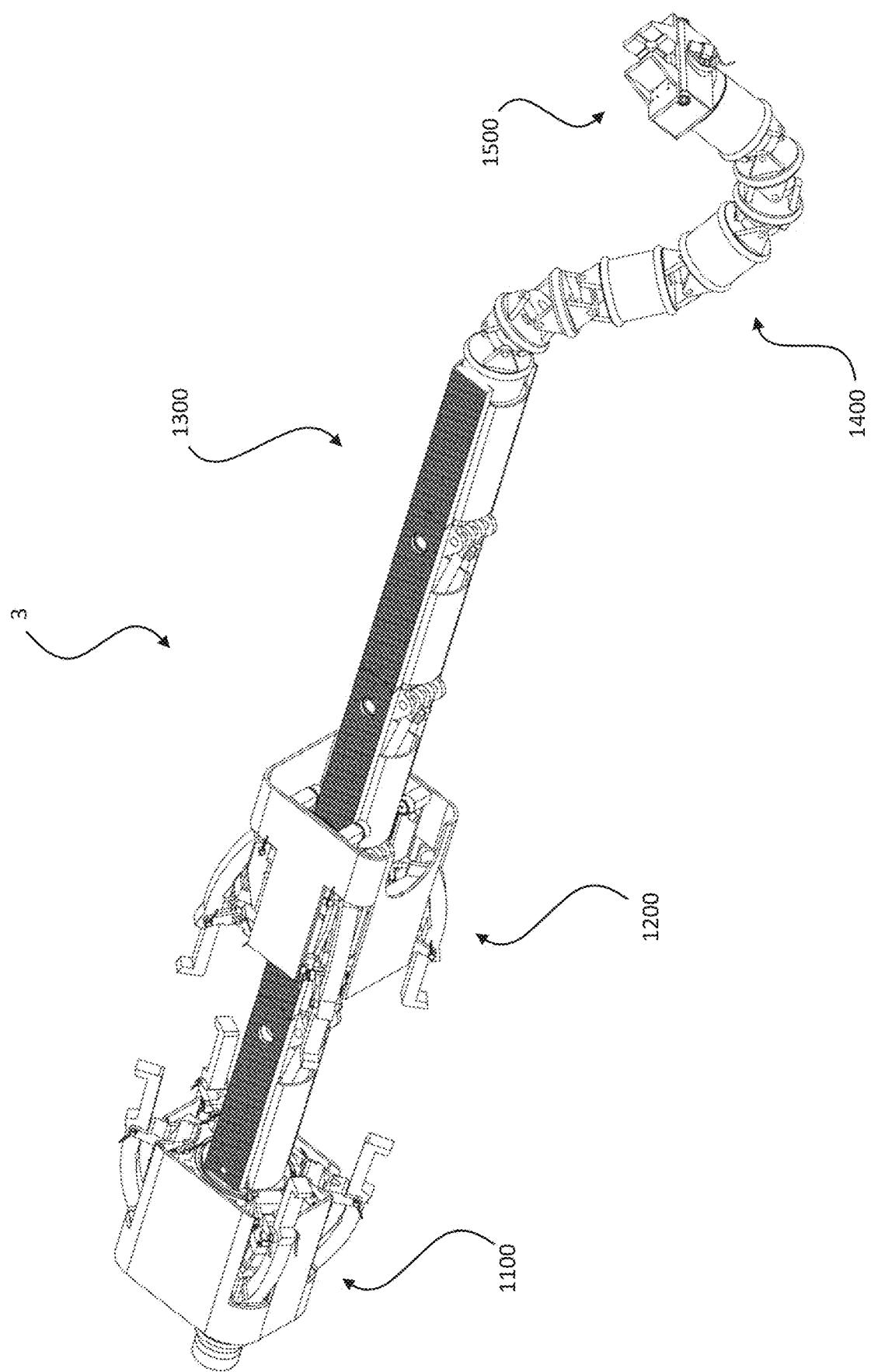
FIG. 18B depicts an isometric front view of the TRM embodiment of FIG. 18A.
Figure 19:
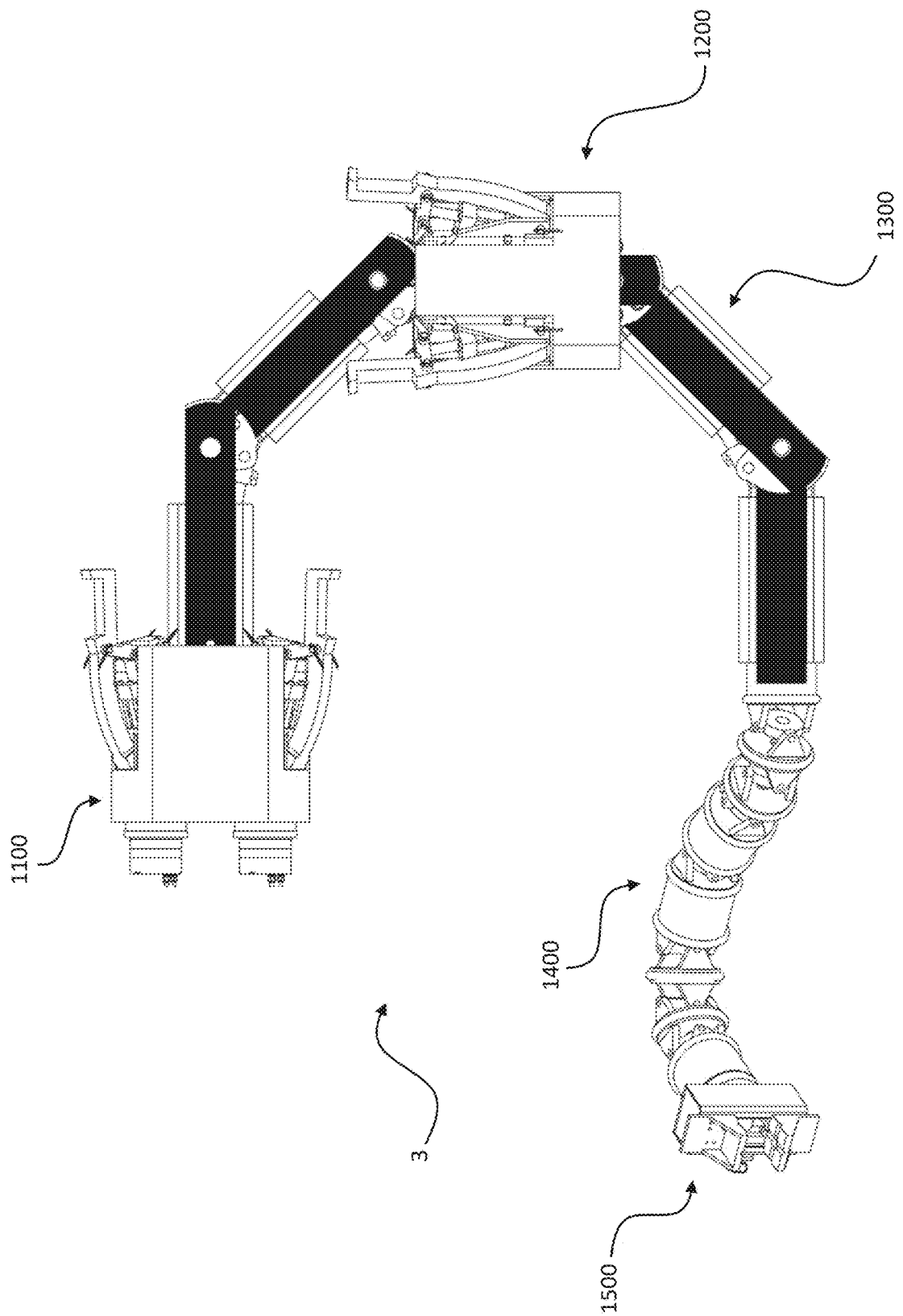
FIG. 19 depicts the top view of the TRM embodiment of FIG. 18A making a turn.

FIGS. 18A through 19 depict the TRM 3 from several different angles. FIGS. 18 through 18C are isometric views of the TRM 3 from different angles. FIG. 19 depicts a top view of the TRM 3 making a 180° turn. The TRM 3 is an embodiment similar to TRM 1 (FIG. 3). The TRM 3 comprises a plinth 1100, a trolley 1200, and a manipulator arm. The manipulator arm comprises an articulating arm 1300, a snake arm 1400, and a gripper 1500.

Plinth

Figure 20A:
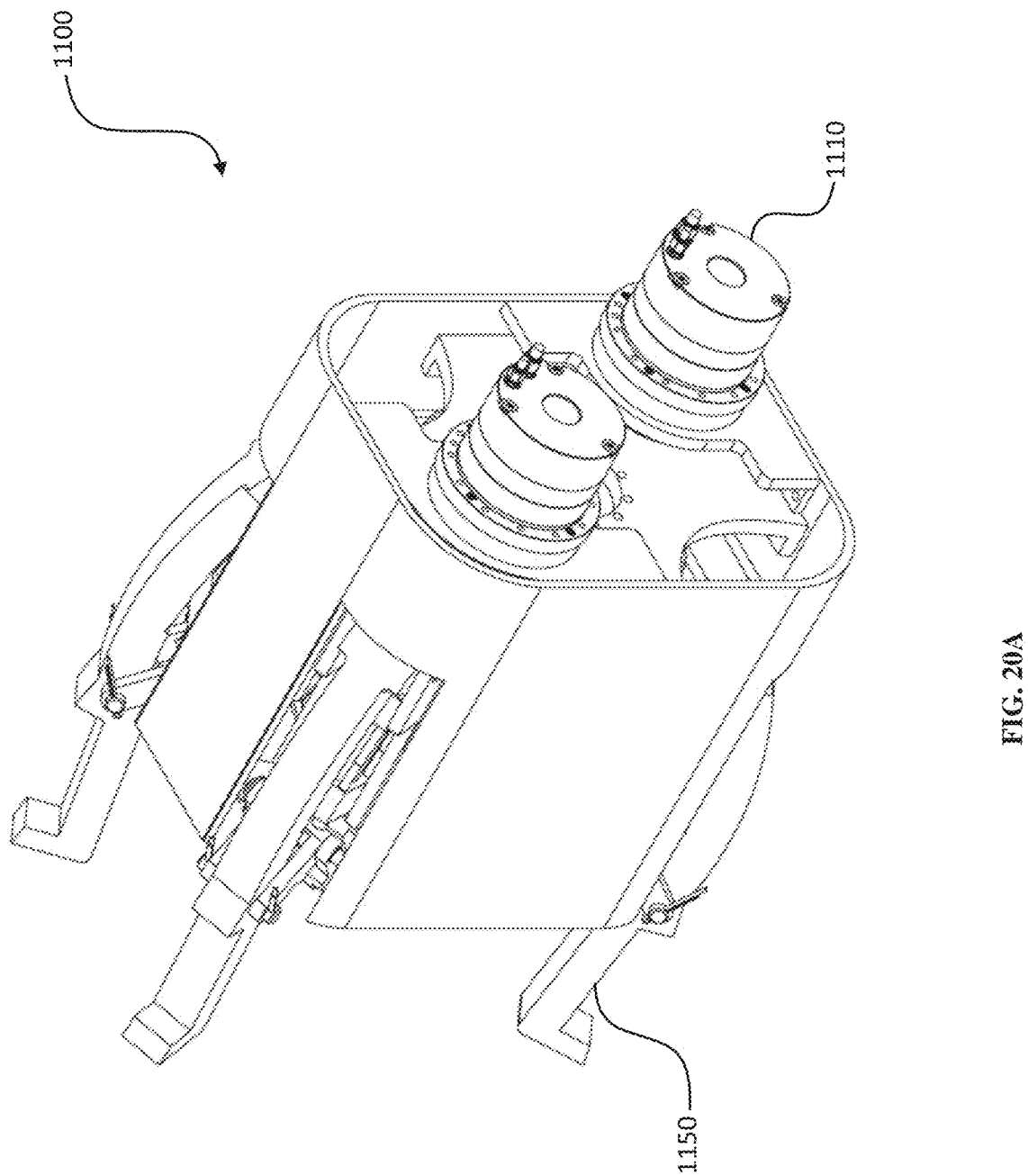
FIG. 20A depicts an isometric view of an embodiment of a plinth.
Figure 20B:
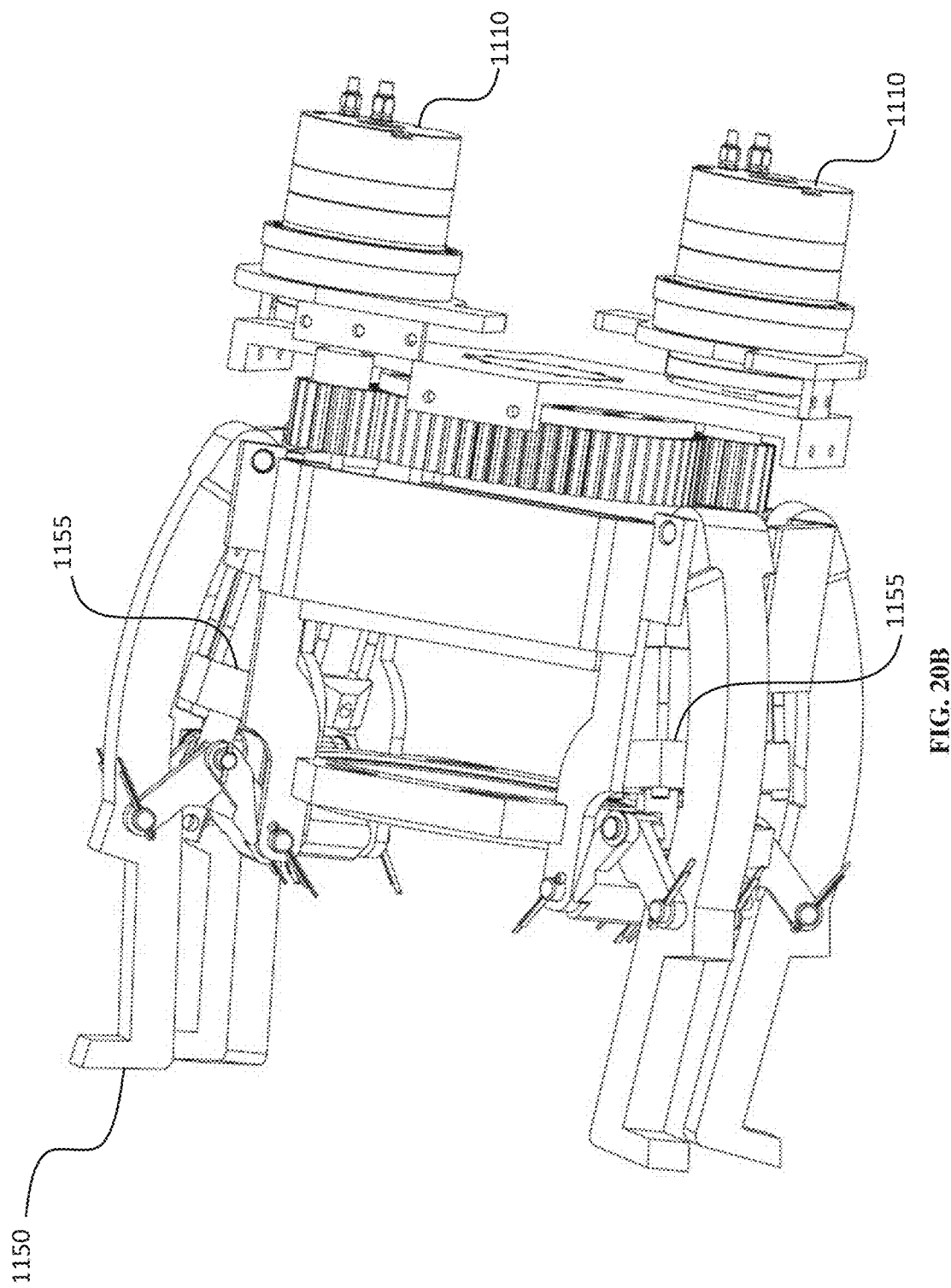
FIG. 20B depicts a side view of the plinth embodiment of FIG. 20A exposing its internal components.

FIG. 20A depicts an embodiment of the TRM 3 plinth 1100. The plinth 1100 secures the TRM 3 to openings through actuation of locking pawls 1150. The locking pawls 1150 are operable to lock onto a mounting point and resist the moment loads induced by the articulating arm. FIG. 20B shows a side view of the plinth 1100 without its enclosure exposing the hydraulic cylinders 1155 under each of the locking pawls 1150. The movement of the locking pawls 1150 is accomplished through actuation of hydraulic cylinders 1155. Prior to engagement with the opening, the hydraulic cylinder 1155 for each locking pawl 1150 is retracted. Once the plinth 1100 is properly positioned, the hydraulic cylinder 1155 is actuated, moving the linkages and causing the locking pawls 1150 to engage the opening. Cylinder pressure may be maintained to secure the TRM 3 in place.

Figure 20C:
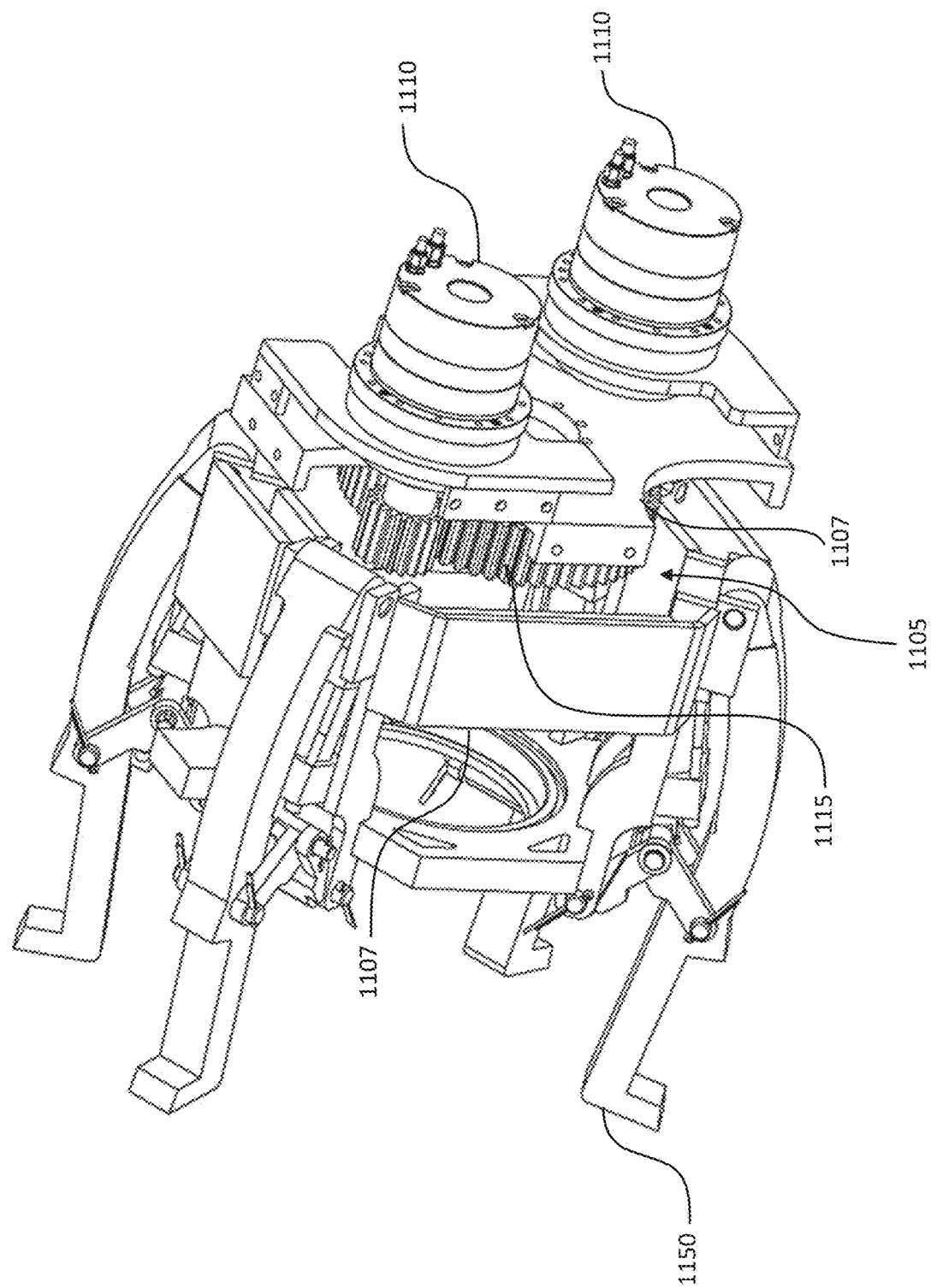
FIG. 20C depicts an isometric view of the plinth embodiment of FIG. 20A exposing its internal components.

FIG. 20C depicts the plinth 1100 without its enclosure exposing its internal components. The plinth 1100 provides 360° axial rotation of the articulating arm through the use of a slewing drive mechanism 1105, which may be electrically driven in some embodiments. The slewing drive mechanism 1105 comprises two slewing ring bearings 1107 and a ring gear 1115, in the depicted embodiment. The axial rotation of the articulating arm is facilitated by one or more drive motors 1110 with spur gears moving the ring gear 1115. The two slewing ring bearings 1107 support and allow rotation of the plinth 1100, in the depicted embodiment.

Variable speed control of the axial rotation and movement of the first section of the articulating arm may provide angular movement from zero to approximately 3° per second, in some embodiments. The distal end of the plinth 1100 is the attachment location and pass-through for the TRM services tether, in some embodiments.

Manipulator

The manipulator arm is used to perform operations in a confined or hazardous space. The manipulator arm provides a wide range of motion with an ability to move around corners to deploy and position tools in areas that are difficult to access. The manipulator arm is comprised of three major components: the articulating arm, the spatial snake arm, and the gripper.

Figure 21:
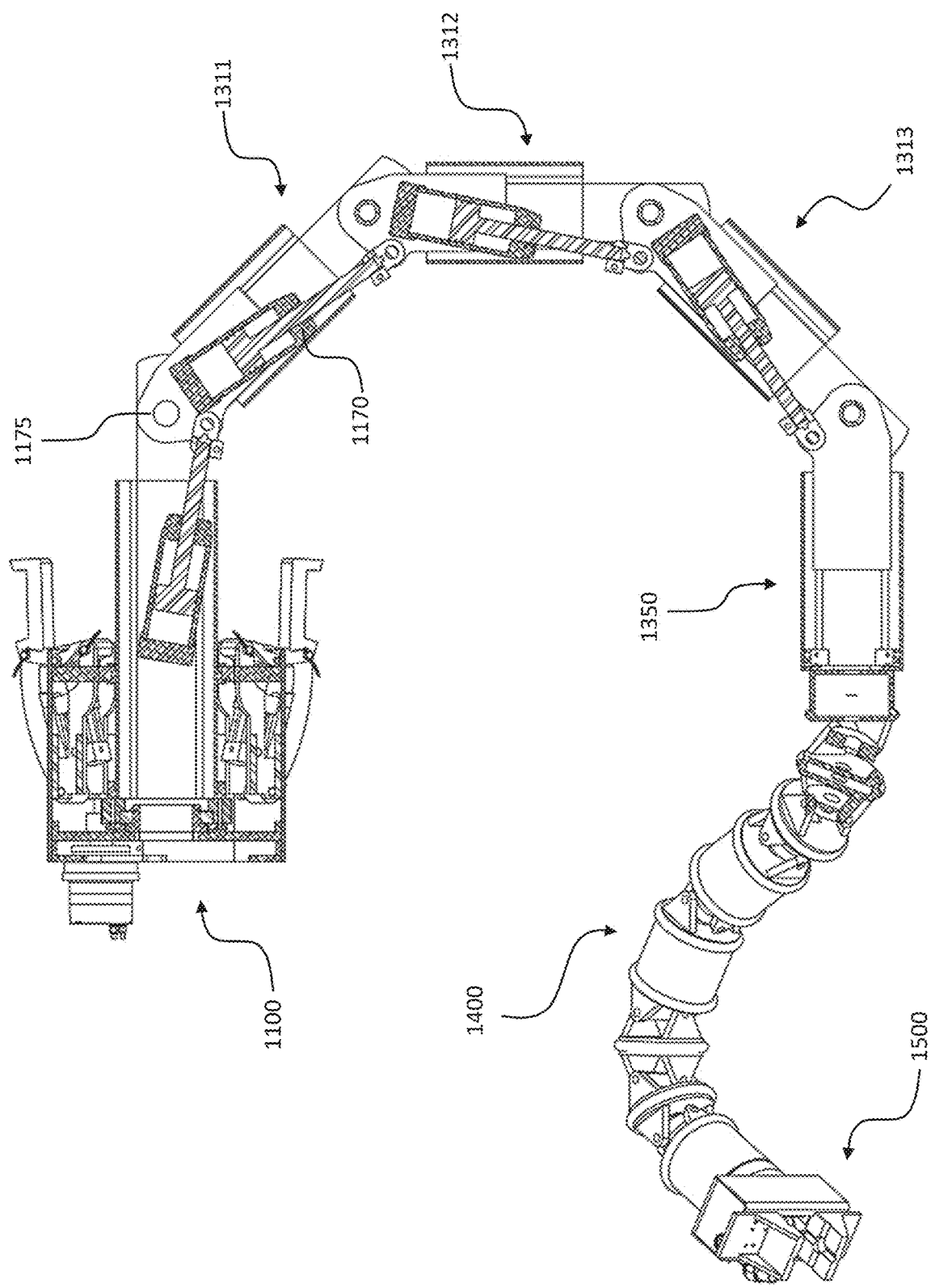
FIG. 21 depicts a section view of the plinth and manipulator arm of the TRM embodiment of FIG. 18A.

FIG. 21 depicts a section view of the plinth 1100, articulating arm 1300, snake arm 1400, and end effector 1500. The trolley has been omitted for clarity. The articulating arm 1300 is constructed of four arm sections in some embodiments. The first arm section 1311 is connected to the pivot pin 1175 and hydraulic actuator 1170 in the plinth 1100 (in some embodiments this joint may provide +90°/−20° of articulation with respect to the plinth axis). The second section 1312 and third sections 1313 are identical to the first section 1311, in some embodiments, and are successively connected to the pivot pins 1175 and hydraulic actuators 1170 in the previous sections. The fourth section 1350 may be connected to the third section 1313 in a similar fashion. In some embodiments, the second section 1312, third section 1313, and fourth section 1350 of the arm may provide +105°/−0° articulation with respect to the plinth axis (FIG. 12). Each of the sections may be equipped with position sensors to provide feedback to the control system.

Figure 22:
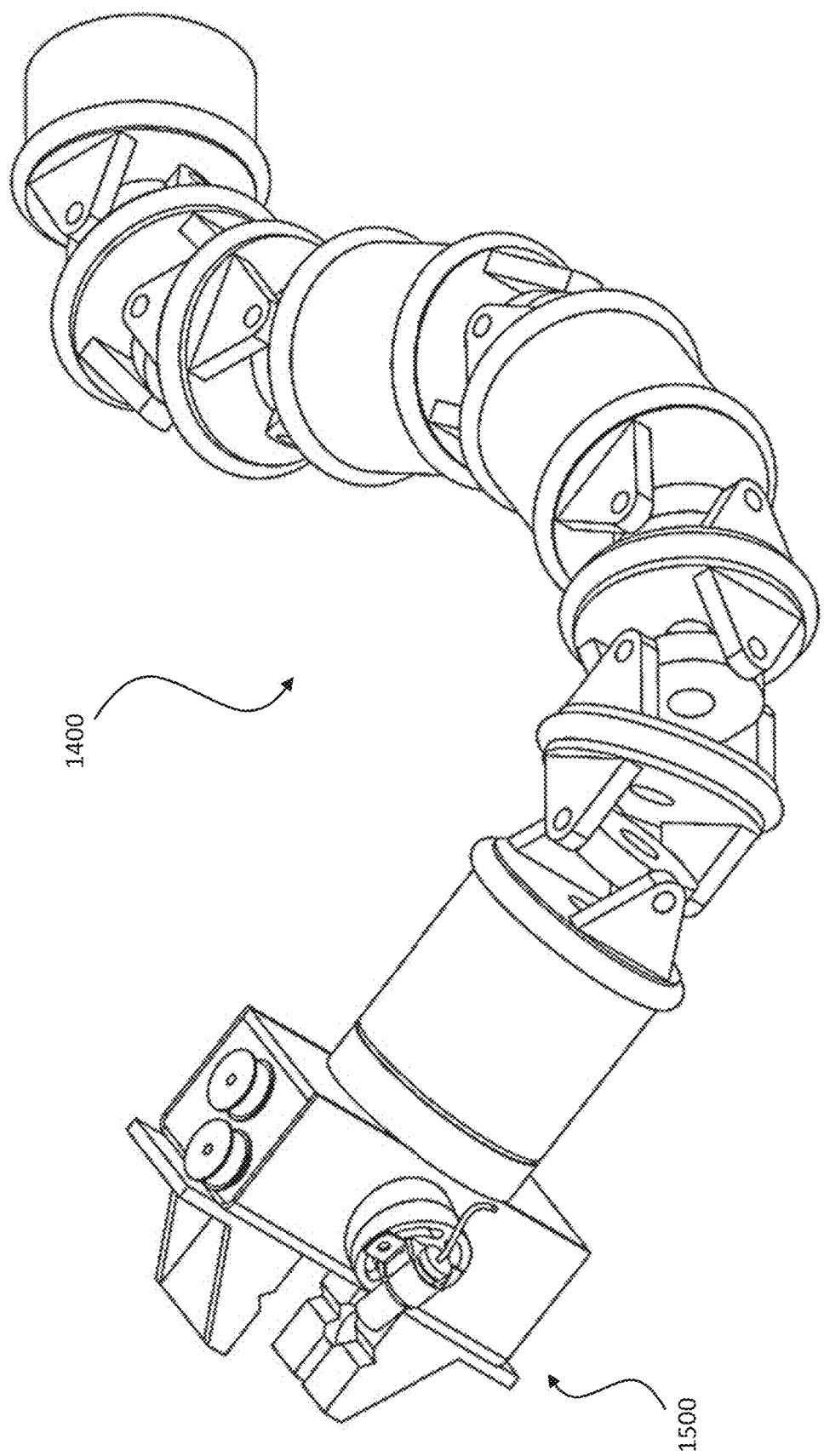
FIG. 22 depicts an isometric view of gripper and spatial snake arm embodiment.

FIG. 22 depicts an isometric view of the snake arm 1400 designed and manufactured by OC Robotics® (OCR). The snake arm 1400 is a highly flexible arm that is cable driven. It is capable of configuring itself in complex three dimensional geometries to provide access to compartment surfaces. In some embodiments, lifting capacity of the snake arm 1400 may be in excess of 40 pounds (weight of the gripper 1500 plus the payload and reactive/inertial loads). In some embodiments, control cables for the snake arm 1400 are routed through the interior of the articulated arm, through a cable management tether, and terminate in a power unit located outside of the compartment. Controls for the snake arm 1400 may be integrated into the controls for the TRM 3 in some embodiments.

Figure 23:
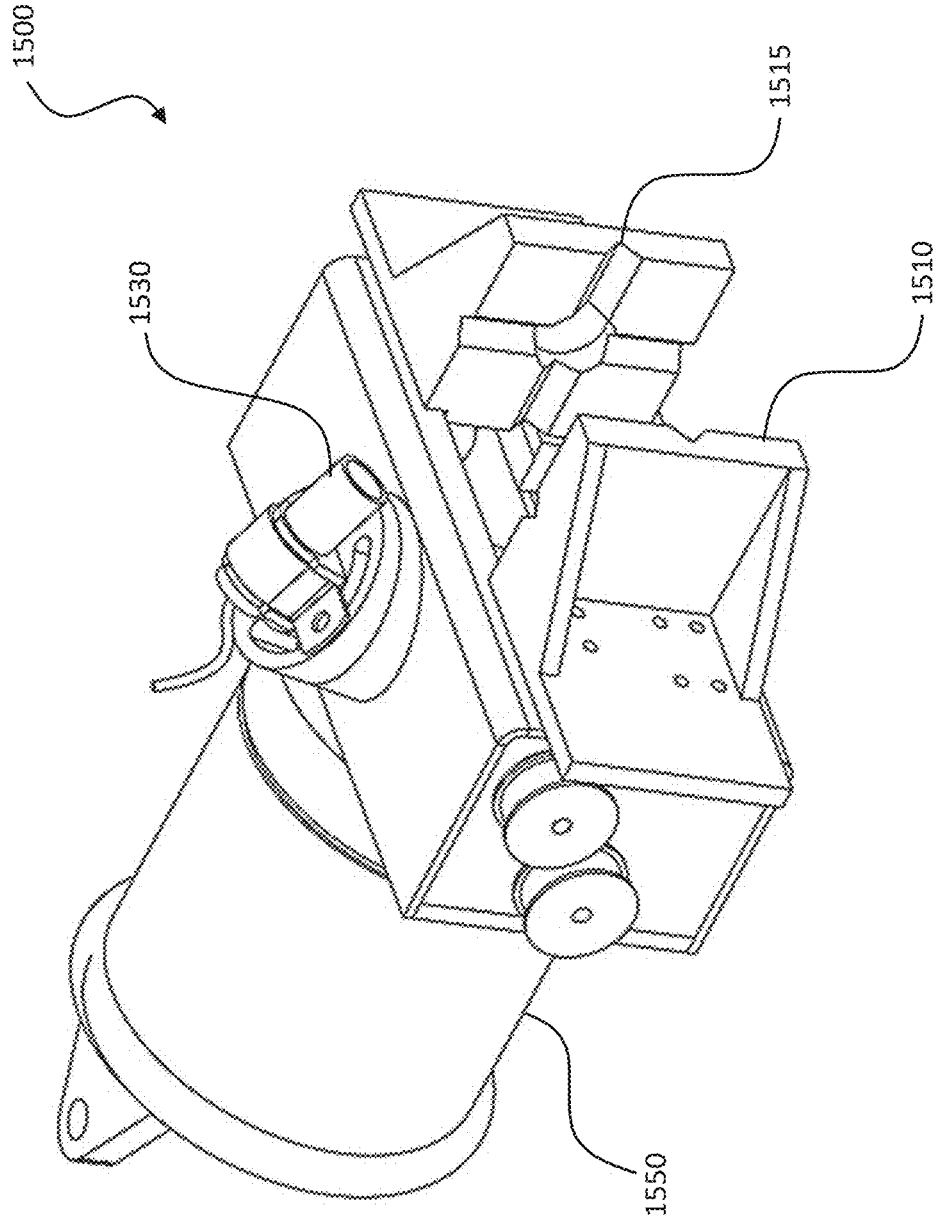
FIG. 23 depicts an isometric view of the gripper embodiment of FIG. 22.

FIG. 23 depicts an embodiment of a gripper 1500. The gripper 1500 may be mounted to the proximal end of the snake arm 1400 (depicted in FIG. 22). The gripper 1500 may comprise a wrist rotation joint 1550 allowing it to rotate 360° about its axis. In some embodiments the gripper comprises grooves 1515 to accommodate a universal handle 1565 (FIG. 24) that may be attached to one or more tools. An onboard camera 1530, mounted on the gripper 1500, may provide visual feedback to the operator during gripping operations. In some embodiments the gripper 1500 is capable of lifting up to 28 pounds and the jaws 1510 are capable of gripping items up to three inches thick. Other lifting gripping capabilities are possible.

Figure 24:
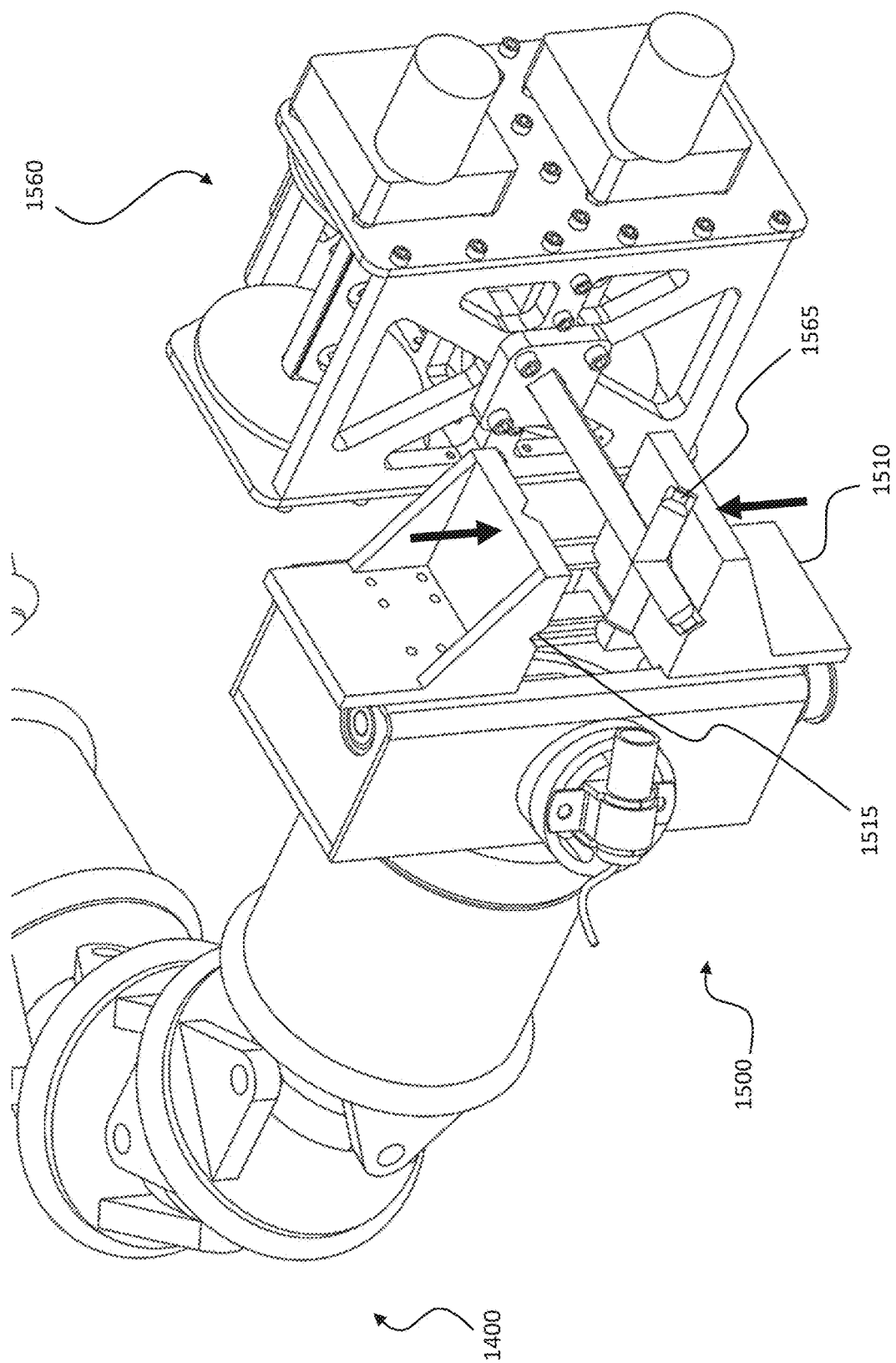
FIG. 24 depicts the gripper embodiment of FIG. 22 gripping a tool.

FIG. 24 shows an embodiment of the gripper 1500 handling a tool 1560 as attached to snake arm 1400. The jaws 1510 of the gripper 1500 are designed to grasp a universal handle 1565. The handle 1565 can be gripped in one of three positions (axially and +/−90° with respect to the arm axis). The three positions in the gripper 1500 provide positional versatility allowing access to all tank surfaces. The handle 1565 may be universally incorporated into the tools deployed by the gripper 1500.

Trolley

Figure 25A:
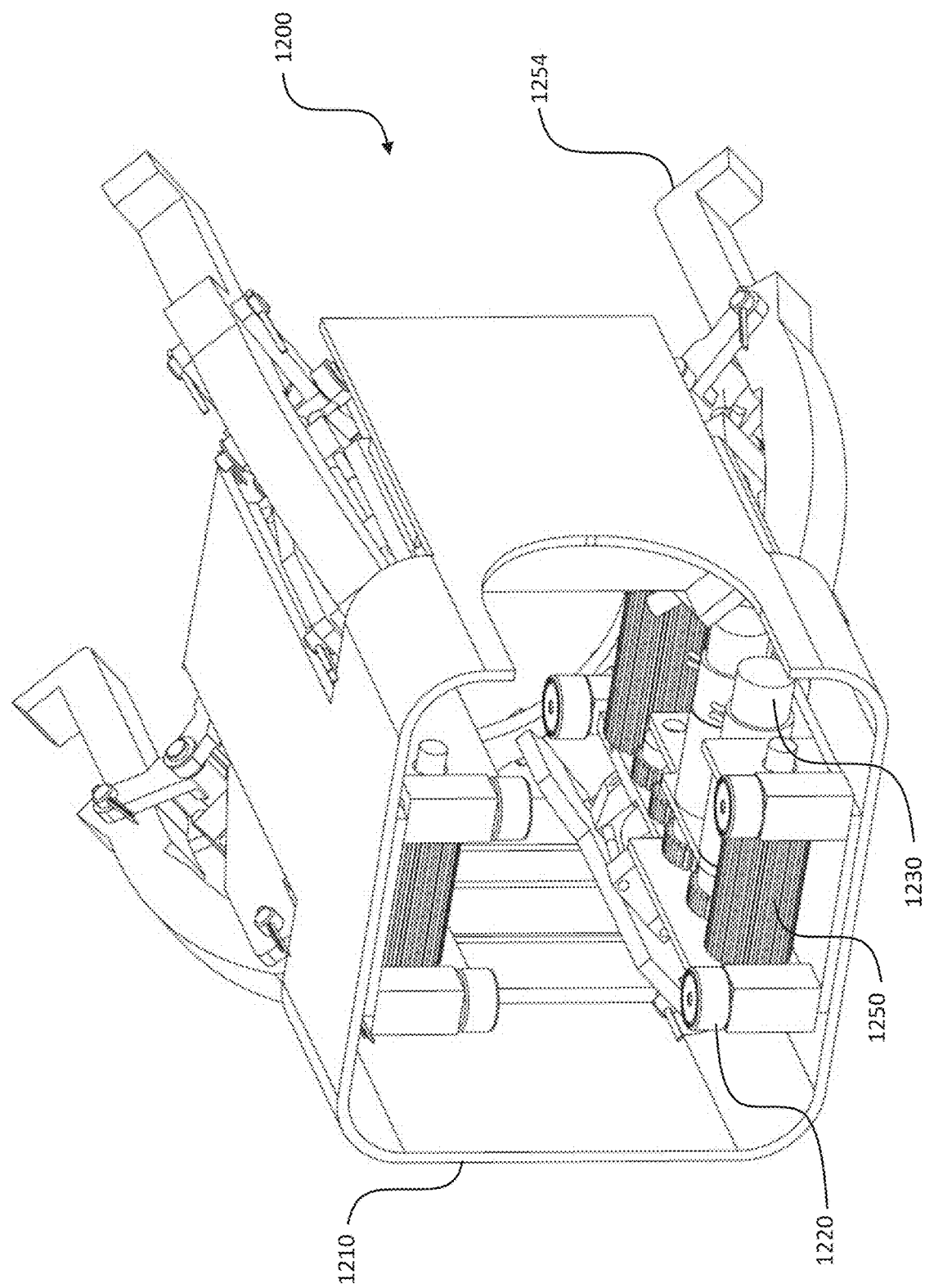
FIG. 25A depicts an isometric front view of the trolley of the TRM embodiment of FIG. 18A.
Figure 25B:
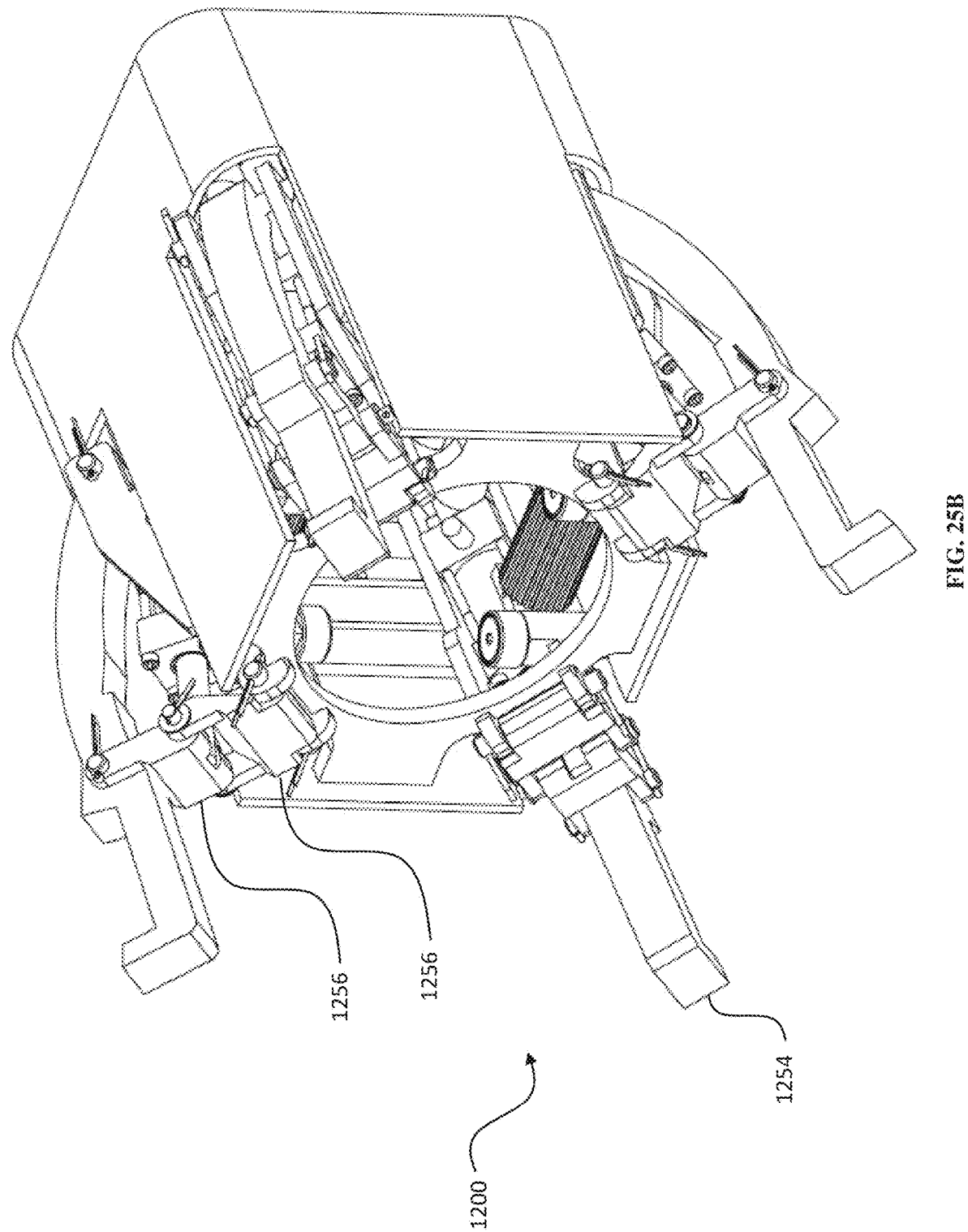
FIG. 25B depicts an isometric rear view of the trolley embodiment of FIG. 25A.

FIGS. 25A and 25B depict isometric views of the TRM 3 trolley 1200. Like the plinth 1100 (depicted in FIG. 20A and other figures), the trolley 1200 is equipped with hydraulically actuated locking pawls 1254 to secure the TRM 3 to an opening. The trolley 1200 is capable of movement along the length of the articulating arm 1300 (FIG. 19) when the plinth 1100 is secured in an opening. The length of the trolley 1200 is such that it can be parked on any one section of the articulating arm 1300 allowing geometric reconfiguration of the TRM 3 (FIG. 19). The locking mechanism design and operation on the trolley 1200 are the same as the plinth 1100. The mechanism may include a hydraulic cylinder, linkages 1256, and locking pawl 1254. The trolley 1200 also provides the longitudinal movement of the TRM 3. A pinion drive 1250 may be integrated into the trolley 1200 to provide the movement across the track sections attached to the articulating arm sections. Variable speed drive motors 1230 power the pinion drive 1250 and the trolley 1200 across the track 1330. Correct alignment of the tracks is required before the trolley 1200 can move from one articulating arm section to the next. Rollers 1220 on the trolley 1200 ensure that the tracks 1330 are properly aligned (the rollers 1220 won't pass if the tracks 1330 are not aligned).

Harmonic Driven Short Arm

Figure 26:
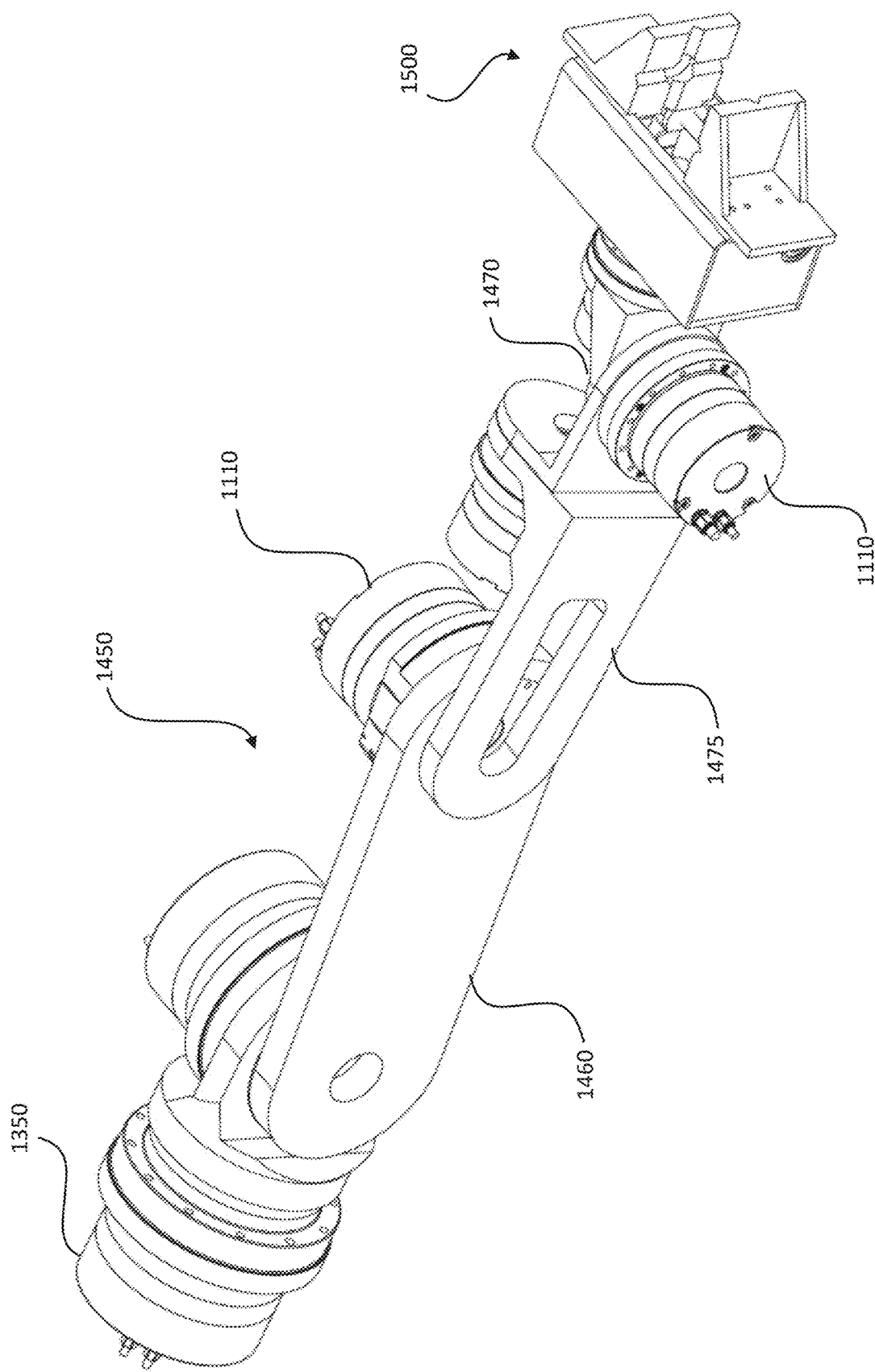
FIG. 26 depicts an isometric view of a harmonic driven short arm embodiment.

FIGS. 26 and 27 depicts a harmonic driven short arm 1450 embodiment. FIG. 26 depicts an isometric view of an embodiment of the short arm 1450. FIG. 27 shows an isometric view of the assembly of the TRM 3 utilizing the short arm 1450. The short arm 1450 is a harmonic driven arm that comprises of three sections; a first section 1460 that is coupled to the proximal end of the articulating arm 1300 (FIG. 19) via pivot, a forearm section 1470 that the gripper 1500 is secured to and a mid-section 1475 that connects the forearm 1470 to the first section 1460. The depicted short arm 1450 embodiment comprises of six harmonic drives 1110 for movement.

Deployment/Retrieval Tool

Figure 28A:
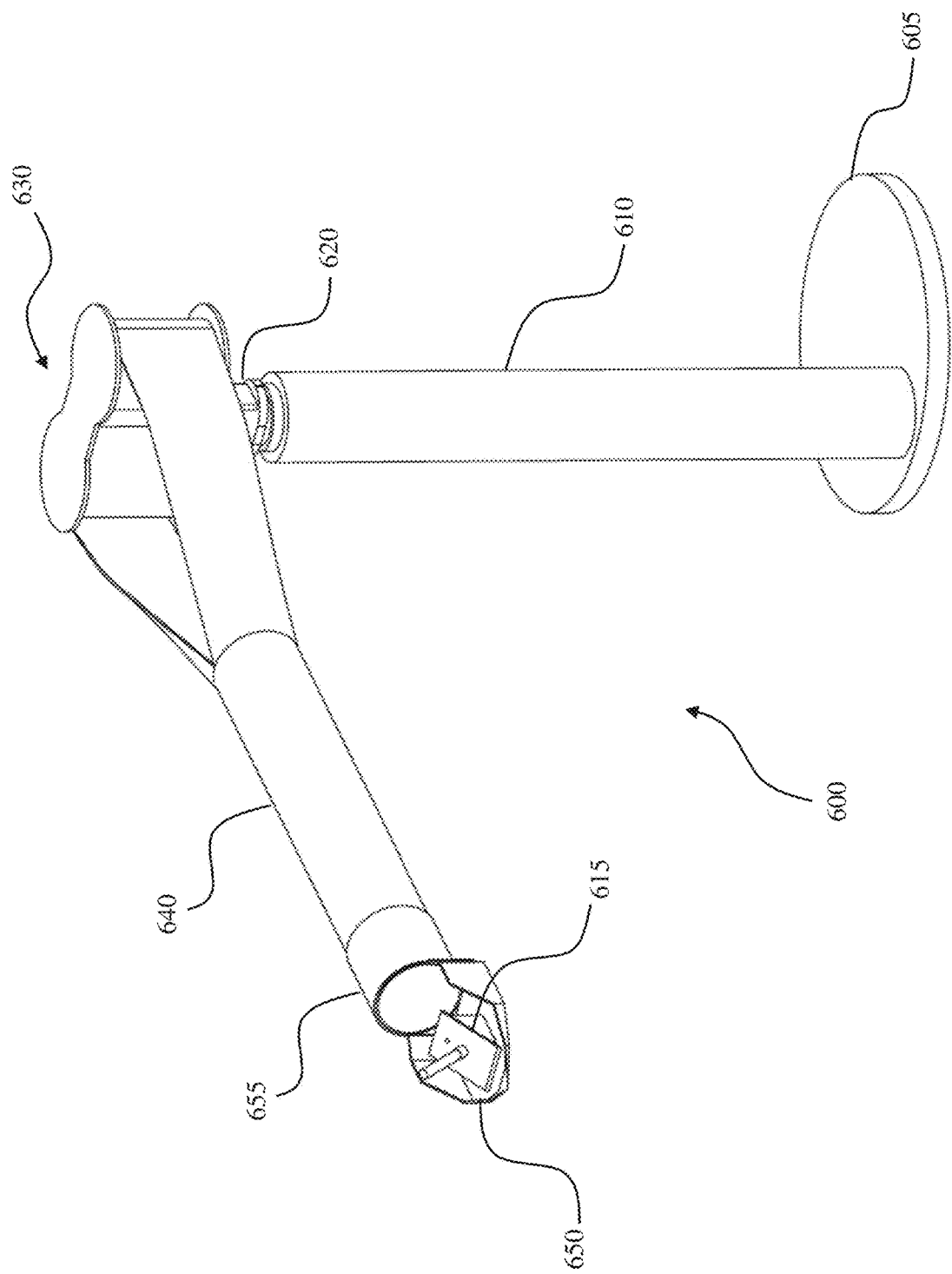
FIG. 28A is an isometric view of an embodiment of a deployment/retrieval tool (DRT).
Figure 28B:
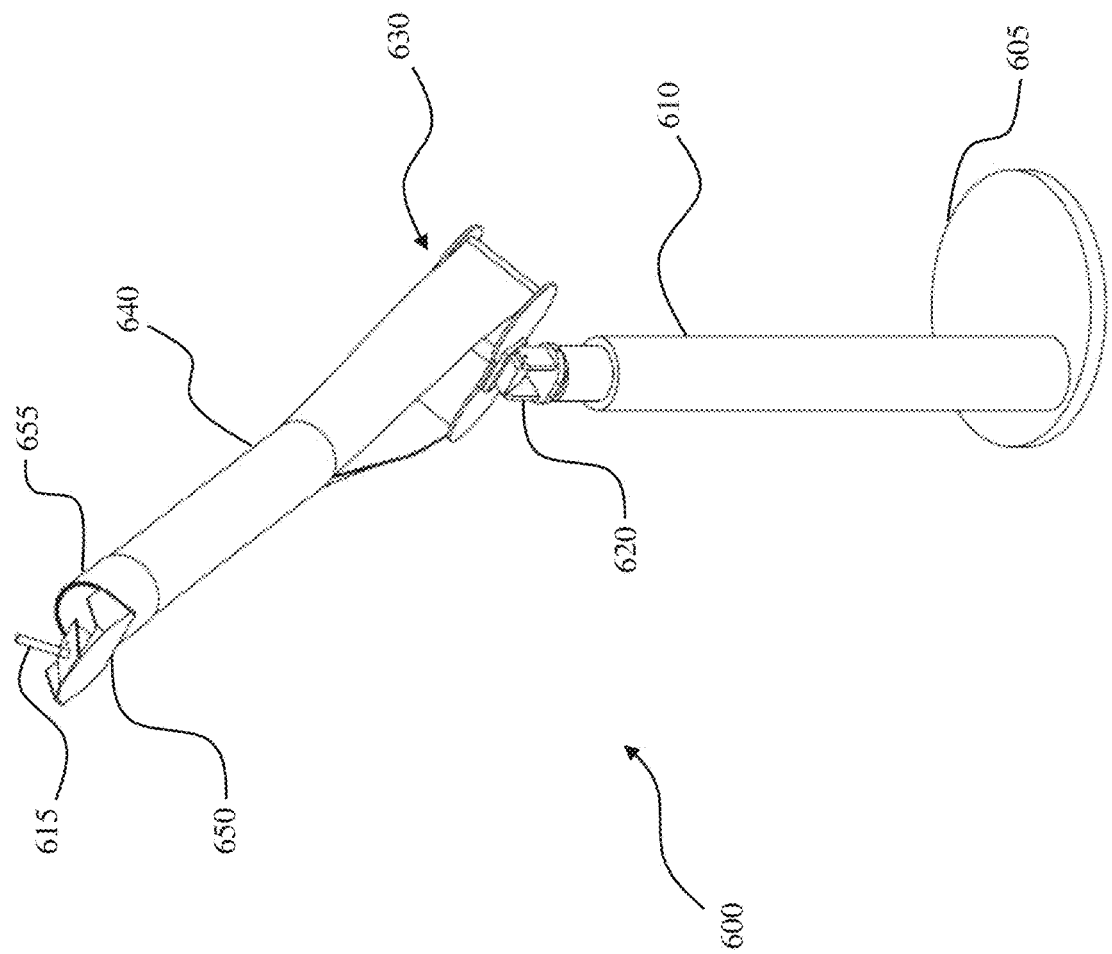
FIG. 28B is an alternate view of the DRT embodiment of FIG. 28A.

FIGS. 28A and 28B depict an embodiment of a deployment/retrieval tool (DRT) 600. The DRT 600 is a specialized tool which may be used to support TRM operations inside a confined space. The DRT 600 is operable to supply and remove tools and materials to support TRM operations.

The extendable arm of the DRT 600 is made from RolaTube® 630 material. RolaTube® is a strong composite material that has two stable configurations. The first is the coiled configuration. In this configuration the material forms a compact cylindrical roll of flat material. As the material unwinds from the roll, the flat material transitions to a tubular configuration, forming a lightweight tube with changeable length. As the DRT 600 is deployed, one RolaTube® is installed over the other forming a stiff, double-layered, tube 640. The tubes may be extended and retracted using one or motors or other drive mechanisms. In some embodiments, the tube is approximately four inches in diameter and capable of supporting in excess of fifty pounds when extended up to eight feet in length.

In some embodiments, two cylindrical rolls of RolaTube® 630 are attached to a tray 650 at the working end of the tube 640. The tray 650 may be equipped with a tapered nose to act as a lead-in for the DRT 600 to find manways and to minimize potential for snagging on internal infrastructure in a confined area. The tray 650 may also comprise a tool holder 615 used to present a tool or material to the TRM. Wires, cables, and/or hoses may be routed on the inside of the tube 640 where they will be protected from abrasion, contamination, and other forms of degradation.

The DRT 600 may rotate horizontally around pivot 620. The tray 650 may tilt about pivot 655. In some embodiments the tray may also be equipped with an actuator to change its orientation with respect to the tube. This feature may be used to prevent tools and materials from dumping from the tray during movement in the tank. In the event the opening is misaligned or if the tube sags, the tilting tray, along with an integrated camera, is used to aid in positioning the end of the DRT 600 for entry into the next manway opening.

In some embodiments, both RolaTube® coils are punched with holes to accommodate a drive roller. The ends of the two tubes are fastened together and threaded through the drive mechanism. The tubes are held flat in the drive mechanism to allow for a change in direction of the material before forming the tube. The drive roller is equipped with drive pins that engage one of the two RolaTube® tubes.

To facilitate insertion into a confined space, the head of the DRT 600 is able to tip up into an access hole as depicted in FIG. 18B. In some embodiments the raising of the DRT 600 may be facilitated by spring loaded lift-assists. The DRT 600 may also swing 90° to support two or more TRMs in the confined space. The tube 640 may be extended the distance required to deliver or retrieve material from the TRM. To support the DRT 600 the base 605 may be offset to keep the center of gravity closer to the vertical support 610 even when the tube 640 is extended. The base 605 may also be weighted, clamped down or otherwise secured, or take other shapes as necessary to support the DRT 600. In some embodiments the base 605 may be mounted to external supports such as floors or ceilings via one or more mounting points located on the base 605.

In some embodiments the vertical support 610 is capable of extension, for instance via telescoping tubes. The extension of the vertical support 610 may be motor operated or manual and may comprise one or more locking mechanisms such as pins and clamps to secure the DRT 600 structurally.

Figure 28C:
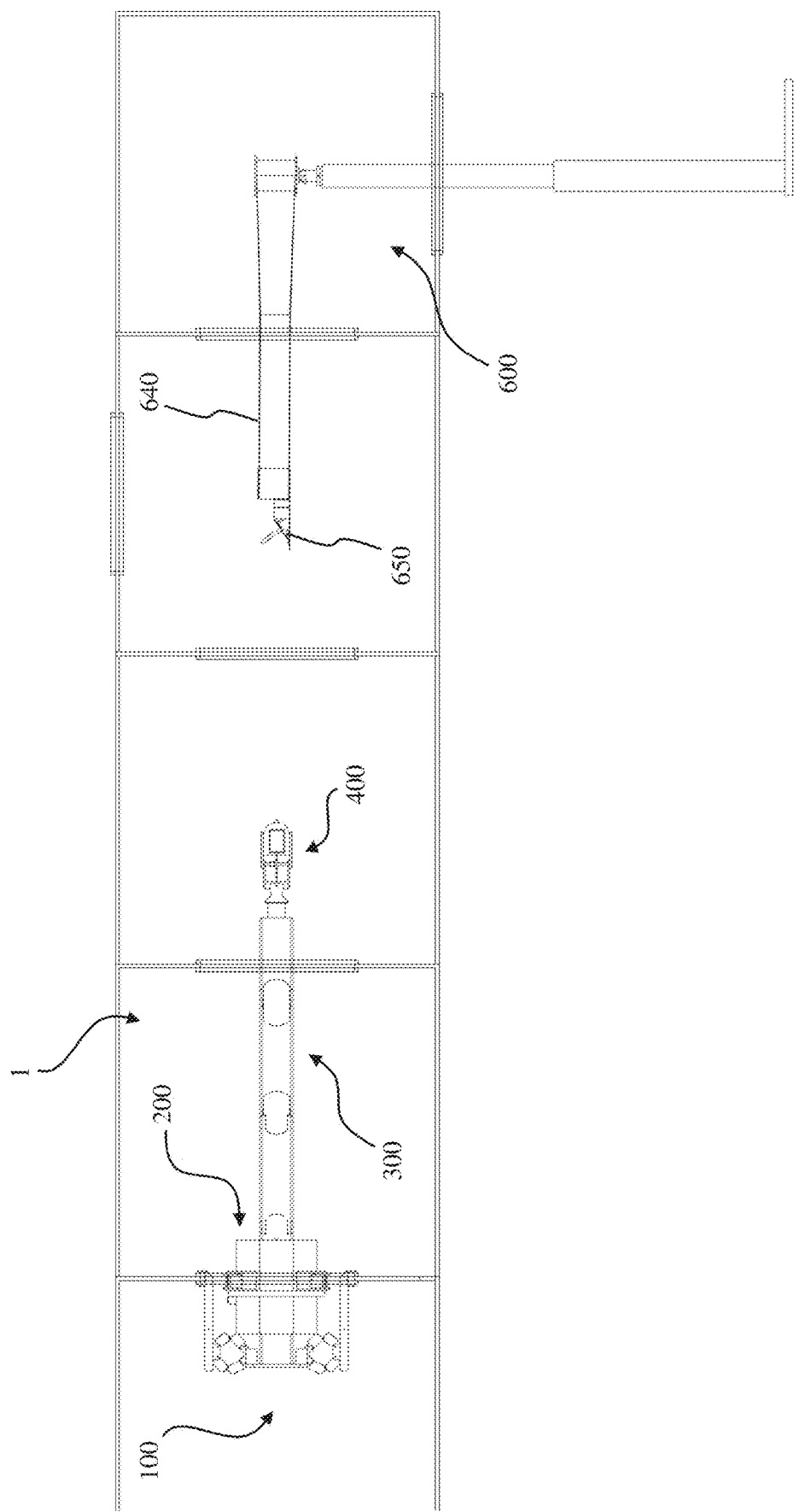
FIG. 28C depicts the TRM extending between manways and a DRT approaching the TRM.

FIG. 28C depicts the DRT 600 delivering a tool to a TRM 1. Generally, the tool that is being delivered will be oriented on the tray 650 such that the gripper 400 (FIGS. 8A-8D) or other end effector may easily grasp it. If the tool requires power or other cabling the cables will generally be run down through the center of the tube 640 and fed through from outside the compartment as the tube 640 advances toward the TRM 1. Larger equipment such as pumps, power sources, and such will generally be located outside of the compartment.

FIGS. 29A through 29D depict another embodiment of a Deployment/Retrieval Tool (DRT) 1600. It should be clear that while each embodiment is discussed as a separate whole from other embodiments that various aspects from any one or more embodiments may be combined to form other embodiments not explicitly disclosed herein.

Figure 29A:
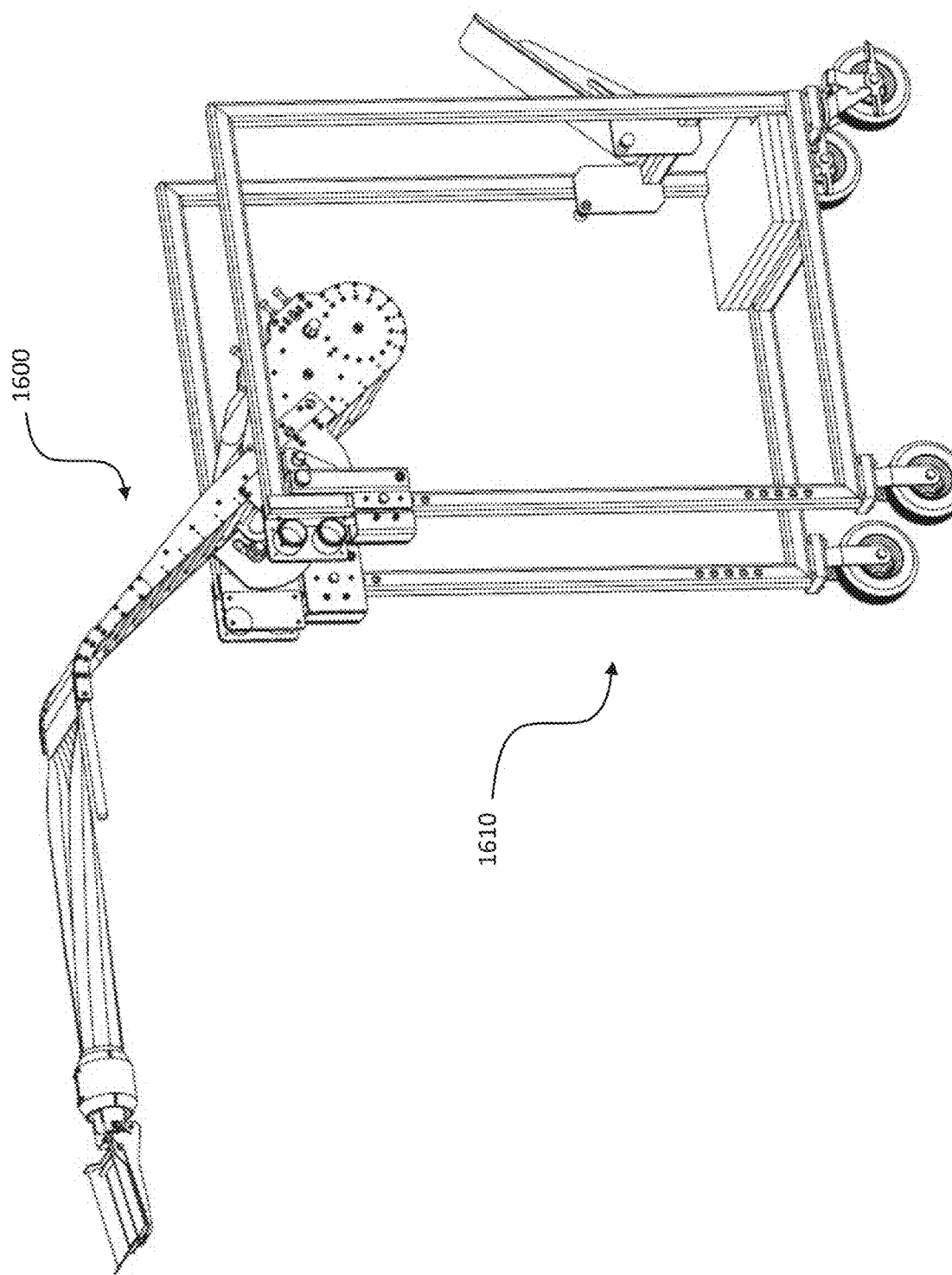
FIG. 29A depicts an embodiment of a DRT positioned on a deployment cart.

FIG. 29A depicts the DRT 1600 on a specialized deployment cart 1610. The DRT 1600 may be deployed in a similar manner as the TRM. The DRT 1600 may be controlled by a control station that may be remote to where the operations are taking place. In some embodiments the DRT 1600 and the TRM share a common control system.

Figure 29B:
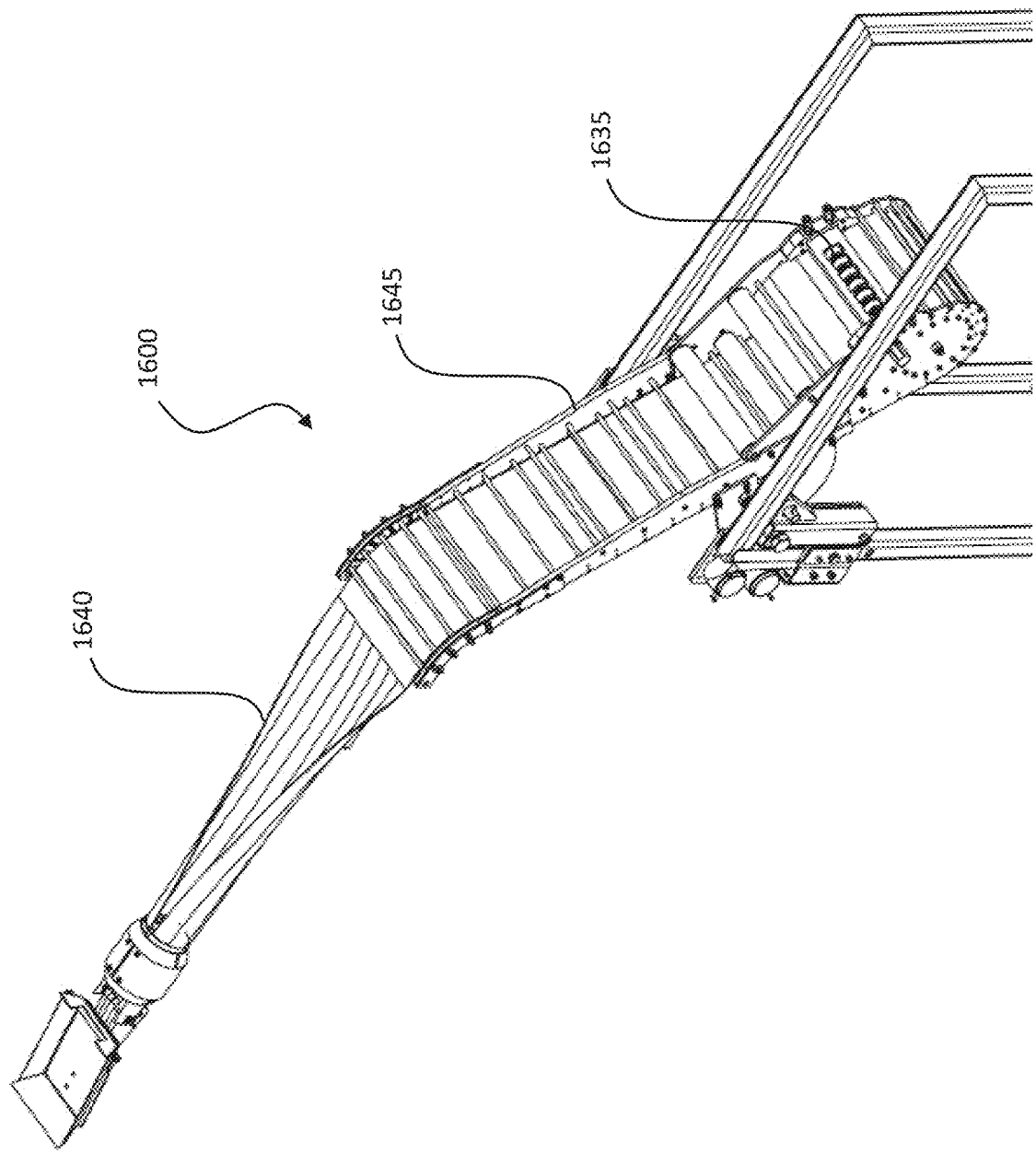
FIG. 29B depicts an isometric rear view of the DRT embodiment of FIG. 29A.

FIG. 29B depicts the DRT 1600 from above. The arm of the DRT 1600 is comprised of a single roll of RolaTube®. As the DRT 1600 is deployed, the RolaTube® unflattens and forms a horizontal tube 1640. In some embodiments the tube is approximately four inches in diameter and capable of supporting in excess of 50 pounds when extended up to eight feet. The RolaTube® coil may be punched with holes to accommodate a drive roller 1645, in some embodiments. The end of the RolaTube® may be fastened and threaded through the drive mechanism 1635. The RolaTube® may be held flat in the drive mechanism to allow for a change in direction of the material before forming the tube 1640. The drive roller 1645 may be equipped with drive pins that engage the RolaTube®. Tool services may be routed through the tube of the DRT 1600.

Figure 29C:
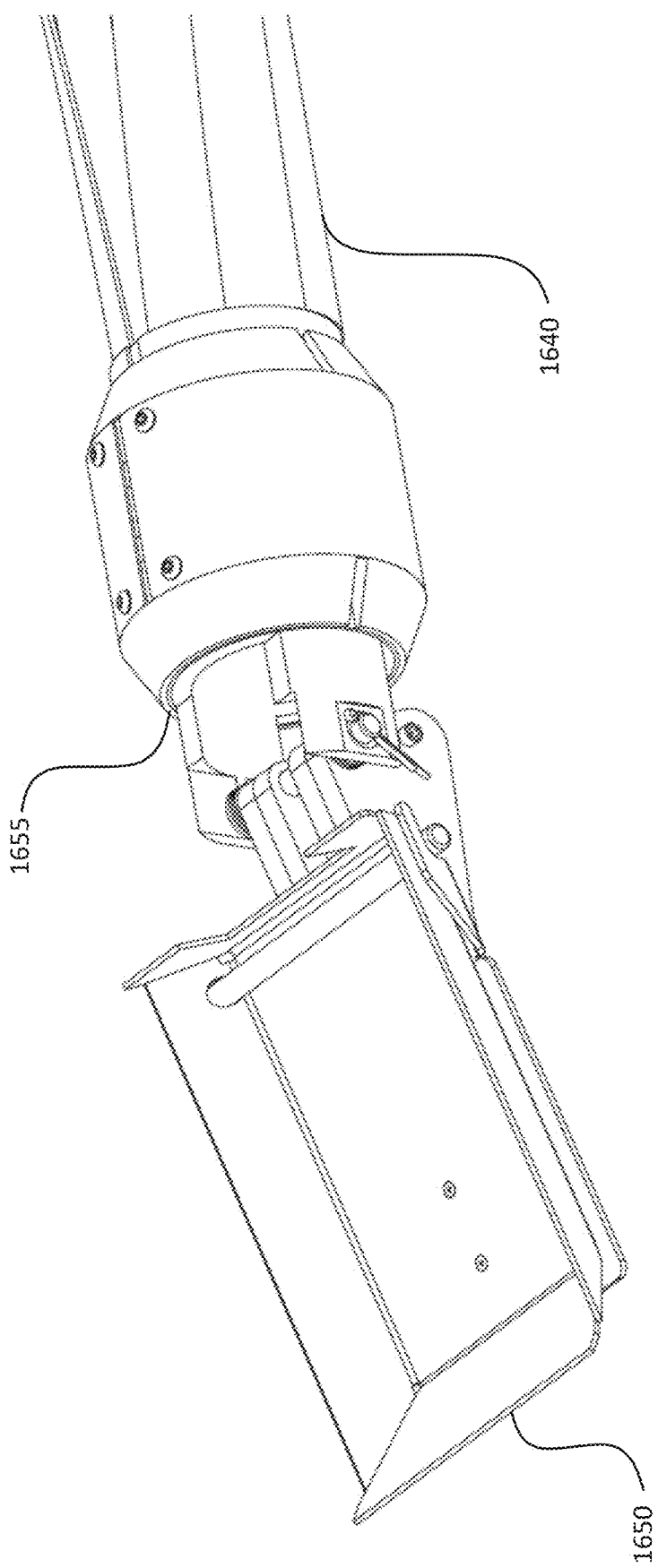
FIG. 29C depicts the tapered tray of the DRT embodiment of FIG. 29A.

FIG. 29C depicts an isometric view of an embodiment of a DRT tray 1650 coupled to the end of the DRT arm 1640. The tray 1650 is a tapered design for minimizing the potential for snagging on the tank internals. The tray 1650 is equipped with an actuator 1655 to change its orientation with respect to the tube. Other embodiments with different shapes, profiles, volumes, and attachment mechanisms, among other things, are possible.

Figure 29D:
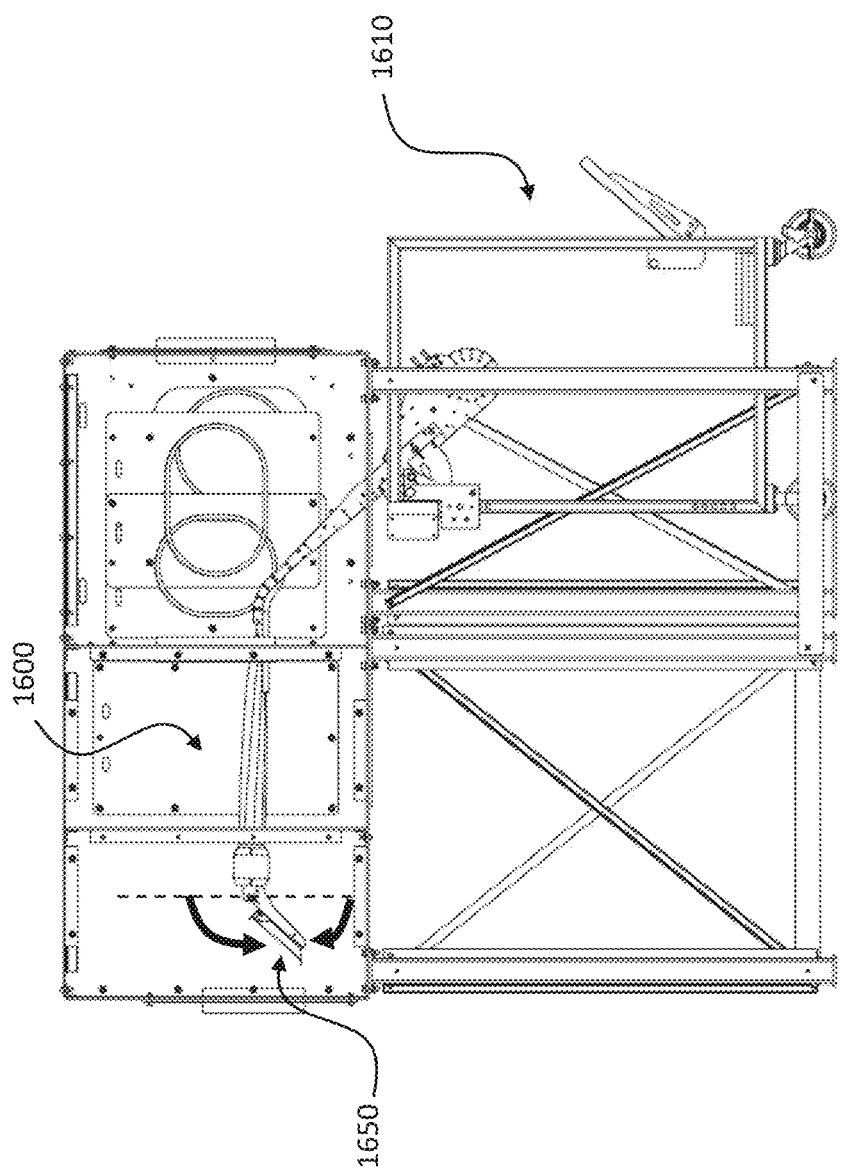
FIG. 29D depicts tray actuation of the DRT as it is positioned in tank.

FIG. 29D shows the range of tray actuation of the DRT 1600 positioned in tank. This feature is used to prevent tools and materials from dumping from the tray 1650 during movement in the tank. In an embodiment, an integrated camera may be coupled to the DRT 1600 to aid in positioning and movement of the DRT 1600. In an event the opening is misaligned or if the tube sags, the integrated camera and tilting tray 1650 may be used in positioning the DRT 1600 for entry into the next manway opening or area of operation.

The deployment of the DRT 1600 into the area of operation requires several actuations due to the different configurations of potential operating areas. First, the DRT 1600 may be mounted to a cart 1610 which allows for quick repositioning at the desired location. In some embodiments, the DRT 1600 is inverted on the cart 1610 for initial positioning. During positioning, the DRT 1600 may be raised with the use of spring loaded lift-assists so the tray 1650 enters the access opening first. Through a series of coordinated moves, the DRT 1600 may be rotated into the space. Once deployed, the DRT 1600 may be extended to supply tools and/or materials to the TRM.

Other Embodiments

In some embodiments the plinth and/or trolley shoes may be modular and/or adjustable to accommodate different manway geometries. In some embodiments the plinth shoes and/or the trolley shoes may comprise magnets. In some embodiments the shoes may be universal such as Empire Robotics VERSABALL® disclosed in Gripping and Releasing Apparatus and Method, U.S. Pat. No. 8,882,165 filed Apr. 15, 2011, with a priority date of Apr. 14, 2010, which is hereby incorporated by reference in its entirety. VERSABALL® may also be utilized as an end effector for picking up debris.

In embodiments where the TRM and/or DRT are being used to supplement operations being carried out by human personnel, the TRM and/or DRT may further comprise one or more types of communication equipment to facilitate communication between personnel inside the confined space and personnel outside of the confined space. Additionally, the DRT may be used to provide ventilation and/or lighting.

In embodiments having a large amount of debris and/or debris that is too large to be transported on the DRT tray, the DRT tray may be replaced with a hook or other mechanism which may be used to support a bucket. The bucket may be designed such that it fits through the manways and is able to be loaded whilst remaining coupled to the DRT. In some embodiments the bucket and/or DRT may be equipped with one or more sensors, for instance a weight sensor, to prevent overloading and spillage.

In some embodiments the DRT may be fitted with a conveyer belt for transferring large quantities of materials in and out of the confined space.

Toolbox

The tools deployed by the DRT and/or TRM may generally comprise off-the-shelf tools that may be modified for remote deployment. The TRM is capable of performing a multitude of different operations by deploying a variety of different tools. In some embodiments one or more tools may be mounted to the trolley such that the TRM may change tools within the confined space. In some embodiments one or more of the tools may be delivered to the TRM using the DRT. For tools that require power or other cabling the cables may be routed through or along the TRM and/or the DRT.

Larger tools may be supported by a deployment frame such that the TRM may manipulate the tools without having to support their weight during deployment. A deployment frame may be implemented for any tool requiring additional support or stability during operations.

The types of tools for carrying out the TRM operations generally fall into four main categories: inspection, preparation, refurbishment, and general purpose tools. A brief description of exemplary tools in each category, and potential modifications thereof, is provided below.

In some embodiments, one or more of the tools may replace the end effector on the TRM. In some embodiments, one or more of the tools deployed in the confined space may comprise a universal handle to optimize and genericize the grip between the tool and the TRM end effector. The handle may be incorporated into the structure of one or more of the tools or mounted thereon, preferably securely. A universal handle enables the TRM to deploy any tool without requiring the TRM to be refitted and redeployed. This system allows for shorter operating times by enabling the TRM to perform a multitude of differing functions without having the leave the confined space, or requiring operators to enter the workspace.

An embodiment of a universal handle 1565 is depicted in FIG. 24. The depicted handle 1565 is cross-shaped and fits into corresponding grooves 1515 in the gripper clamp 1510. The cross shape, or tee, enhances the grip quality by preventing the handle from slipping in any direction. In the depicted embodiment the grooves 1515 in the gripper 1500 are triangular. The triangular shape allows for larger tolerance differences between the handles 1565 and the gripper 1500 and enhances grip quality by allowing the gripper 1500 to compress more tightly against the handle 1565. The triangular grooves 1515 also facilitate positioning of the handle 1565 serving as guides during the gripping process. The use of the triangular groove 1515 and the flat edges on the handle 1565, as depicted, allows for increased surface contact between the handle 1565 and the gripper 1500 thus increasing friction and gripping strength. The handle 1565 may be gripped in three different positions allowing for versatility in the way the tool 1560 is positioned and used in the confined area. The universal handle 1565 and corresponding gripper grooves 1515 may have other geometries not depicted or described herein.

Inspection

The TRM is capable of carrying out inspection operations. Inspection may comprise sensing and sampling which may be performed separately or simultaneously by the TRM. Sensing may comprise equipping the TRM with one or more sensors such as image sensors for visual inspection, environmental sensors for determining environmental conditions such as temperature and air quality, and radiation sensors, among others. In some embodiments inspection may be carried out as a quality control step after operations have been performed. In some embodiments one or more sensors remain on the TRM and operational to monitor the system during operations.

Sampling includes taking small samples from various locations within the compartment. The samples may include swabs, wipes, or other methods of gathering materials for assessment. A swiping tool and a chloride checking tool are two such tools that may be implemented and are discussed in more detail below.

A simple swiping tool may be utilized to collect swipes of one or more interior surfaces to assess the level of contamination in the confined space. The assessments may be performed to assess the productivity of decontamination methods or to determine the radiological conditions prior to manned entries into the space. In an embodiment, a piece of filter paper may be attached to the tool and delivered to the TRM by the DRT. The TRM may pick up the swiping tool and wipe it across one or more predetermined surfaces in the confined space and place it back on the DRT tray. The swipe may be removed from the confined space for assessment. Prior to reuse the tool may be decontaminated and a new piece of filter paper may be installed.

A chloride checking may be utilized to monitor for residual chloride concentrations. Chlorides captured beneath a coating may promote corrosion and chlorides residing on the surface may cause damage during surface removal operations such as blasting and sanding as they can be driven into the substrate. An embodiment of a chloride checking tool may be based on the "Bresle Patch method" for determining chloride concentrations. The tool is capable of sealing a latex membrane (3.5 cm×3.5 cm in some embodiments) against the surface to be tested and injecting deionized water (approximately 3.0 ml in some embodiments) beneath the latex. In some embodiments the water is injected using a syringe and a small linear actuator. The water may be allowed to stand for a predetermined period of time, or may be agitated. In some embodiments the water is re-injected quickly a number of times. The water is then removed from the patch. The liquid removed is applied to the meter and the reading is recorded. Following the measurement, the wetted surfaces of the tool may be rinsed or replaced, and the tool is ready for the next measurement.

Preparation

Preparation steps are steps that prepare the compartment for refurbishment. Preparation may comprise steps such as removal and cleaning. Removal steps may include operations such as disassembly, removal of damaged parts for eventual replacement, temporary removal of barriers for better access during refurbishment, removal of debris, and removal of surface coats/finishes. Cleaning steps may include general washing, scrubbing, and vacuuming type operations to remove sediments and films.

Removal

In some applications removal steps may be standalone or may not be followed by refurbishment, such as for decommissioning operations. A number of removal operations and tools are possible depending on the particular application.

Tools such as nutrunners, shears, and saws may be utilized for general disassembly, removal of parts, and debris removal. A nutrunner may be deployed to remove fasteners in the confined area. In some embodiments the nutrunner is an off-the-shelf tool such as an electric impact wrench, adapted to allow for gripping by the TRM gripper. In some embodiments, the nutrunner may be modified to include a magnet in the socket to retain the nut removed and an ejector pin to eject the nut into the tray of the DRT after removal. In some embodiments the DRT tray is magnetized, or comprises one or more magnets, so as to secure the deposited nuts.

Shears and saws may be used to remove and/or reduce size of features in the compartment. In some embodiments the shear tool is an off-the-shelf tool such as a hydraulic mobile cutter, modified with a tee handle for gripping by the TRM gripper. In some embodiments the saw tool may be an off-the-shelf tool such as a counter-rotating saw modified for operation by the TRM gripper. Counter-rotating blades are effective in minimizing potential for kickback and reducing reaction forces on the TRM.

Surface finishes and coats may be removed using tools such as sanding tools and blast nozzles. A sanding tool may be used to scuff surfaces inside of a confined space for removal of finishes and/or to provide an adequate surface for paint adhesion. In some embodiments the sanding tool is an off-the-shelf tool such as an orbital sander, modified to facilitate gripping by the TRM. In some embodiments the sanding tool may be connected to a vacuum collection system to minimize dust generation.

A blast nozzle may be used to direct blast media onto surfaces to recover residues, remove chlorides, decontaminate surfaces, and remove finishes/coatings. In some embodiments the blast nozzle may include a separate or collocated vacuum nozzle operable to collect the spent blast media and other debris. In some embodiments a vacuum tool may be used separately from blast operations. In some embodiments one or more of the nozzle lengths may be adjusted to fit on the trolley.

In some embodiments a blast/vacuum tool may be designed with a shroud which houses a high pressure nozzle. In some embodiments the shroud may be cylindrical. In some embodiments the shroud is fitted with a valve for flow control of the high pressure water. A vacuum hose may be coupled to the shroud. To minimize spread of water and blasted materials the shroud may be positioned directly up against the surface to form a seal.

In some embodiments, the vacuum creates flow though the louvers in the shroud to capture the rebounding droplets. Grooves in the sealing ring of the shroud allow air infiltration to entrain water from tank surfaces. In the event the vacuum does not keep up with the water accumulating on the floor or surface, the water can be shut off at the valve until the vacuum catches up. An assortment of sealing rings may be used to clean and collect water along the tank edges and in the corners.

The water source and materials collections systems may be located outside of the confined space.

Cleaning

In some applications, the confined space may require cleaning before other operations may be carried out. Cleaning may comprise rinsing, vacuuming, wiping, and other operations. Some exemplary cleaning tools are a wiping tool and a residue collection nozzle.

A wiping tool may be utilized to wipe debris and residues from surfaces in a confined space. The wiping tool may comprise a clean cloth or other absorbent material that may be deployed dry or moistened with a liquid such as a solvent (deionized water in some embodiments). In some embodiments, a motorized cartridge containing a long strip of cloth may be installed in the tool. In some embodiments the cloth may be moistened just prior to placement in the DRT which moves it to the TRM. In some embodiments the cloth or other adsorbent material may be loaded on a spool. The cloth or other adsorbent material may be unwound from the tool as it becomes dirty until the entire spool is spent.

The TRM may use the wiping tool to wipe the interior surfaces until the cloth becomes either dirty or dry. The strip will be advanced to expose clean cloth, and the process will continue. In some embodiments the strip is advanced automatically when one or more sensors indicate that it is either dirty or dry. In some embodiments the strip is advanced automatically at predetermined time intervals. In some embodiments the cloth is advanced manually, for instance when an operator observes the cloth is dirty or dry via video monitoring. When all of the cloth is used up, the tool will be removed from the confined space by the DRT. The cartridge would be replaced and the tool will be ready to use again.

An alternative embodiment of the wiping tool may comprise a block of wipes in layers. When the top layer is spent, it may be peeled off from the block exposing a new layer. Spent wipes may be removed by the DRT.

A residue collection nozzle may be used to collect excess residues from surfaces in a confined space. In some embodiments, the residue collection nozzle tubing may be connected to a peristaltic pump and a HEPA filtered collection bottle located outside of the confined space. The residue collection system may be comprised of a peristaltic pump and a collection system which may be located outside of the confined area. The pump and the collection system may be connected by a flexible hose.

Refurbishment

Refurbishment may comprise any one or more of a number of operations including priming, painting, and replacing components. Relevant tools may be provided for each such as an airless coating application nozzle for coatings and drills, nutrunners, and welding apparatuses for replacing components. Tools for measuring the quality of coating applications may be included such as wet film thickness tool and dry film thickness tool.

The wet film thickness tool may be combined into a coating application tool. The wet film thickness tool may be used to immediately measure the thickness of an applied coating just after the coating has been applied and before it has dried. The tool may be equipped with one or more wet film paint thickness gage cards which may be loaded in a spring loaded cassette in proximity to the spray nozzle in some embodiments. In some embodiments a mechanism may be coupled to the tool that is capable of picking up a gage card from the cassette and positioning it for measurement. The gage card may be pressed into the wet paint, removed, and placed in front of the camera for review by the system operator or observer. The spent gage card may be stored in a second cassette for spent gage cards or otherwise removed after use.

A dry film thickness tool may be used to verify coating thicknesses on tank walls when the coatings are dry. It may perform in a similar manner to the wet film thickness tool.

General Purpose

The TRM may include other general purpose tools depending upon its application. Some exemplary general purpose tools include a drill and a plug installation tool.

In some embodiments, one or more plugs may be necessary to prevent leakage to other compartments/areas or to the environment. Plugs may be one or more of cam-action, inflatable, and/or magnetic. In some embodiments plugs may be fitted with stiff springs that compress a rubber cylinder causing it to be larger in diameter and shorter in height. These plugs may be installed by applying pressure to cause the spring to elongate, thus reducing the diameter and lengthening the plug, then relaxing the pressure once the plug is placed such that the plug's diameter expands to fill the space, fixing it in place.

In some embodiments, cam-action and inflatable plugs will typically be used in situations where the hole to be plugged is fabricated from nonferrous (non-magnetic) materials. Magnetic plugs may be used in situations where the hole to be plugged is fabricated from ferrous (magnetic) materials. The closure force may be provided by a rare earth magnet forming the head of the plug. A compliant gasket will provide the seal to prevent passage of accumulated liquids. Any plugs installed in the confined spaces should at least be leak proof. In some embodiments the plugs may need to be pressure rated.

In some embodiments any one or more of the tools may be equipped with a lamp and/or onboard camera to aid in correct placement of the tool. In some embodiments the light may be adjustable in intensity and/or color. In some embodiments the camera housing may provide continuous airflow over the lens to ensure clear viewing during the operations. Any one or more of the tools may be equipped with other specific sensors to increase tool functionality and accuracy as well as to increase operator awareness and ease of control. The light(s), camera(s), and/or any other sensors may be coupled to any one or more of the tool, gripper, DRT tray, or anywhere else in the system where such an addition would be useful in control, operations, safety, and/or data gathering.

Sensing and Control

The TRM may be controlled remotely and/or on-site. In some embodiments, the TRM is manually operated by one or more workers on-site. In some embodiments, the TRM includes a computerized control system. Monitoring and control operations may be performed on site, at a remote location, and/or may be mobile. Mobile monitoring and control may be implemented using one or more mobile devices such as smart phones, laptops, and tablets, or a conventional desk computer work station.

In some embodiments the TRM may comprise one or more sensors. The one or more sensors may comprise one or more of contact sensors, non-contact sensors, capacitive sensors, inductive sensors, 3D imagers, cameras, thermal imagers, thermometers, pressure sensors, accelerometers, inertial measurement units (IMU), rotary encoders, radiation detectors, LIDAR, and strain sensors, among others. In some embodiments, one or more sensors may be used to monitor strain, torque, and pressure at one or more locations in the system as a safety mechanism to prevent catastrophic failures.

In some embodiments the TRM may comprise one or more imaging sensors. The one or more imaging sensors may comprise one or more of 3D imaging, 2D range sensor, camera, thermal imager, and radiation detector, among others. One or more imaging sensors may be used to provide inspection and monitoring capabilities for remote operators. Signals from one or more imaging sensors may be recorded for later review or as operational records. In some embodiments, one or more sensors may be used to determine the position of the deployed tools during operations.

In some embodiments a preliminary inspection is performed prior to engaging in other operations. Preliminary inspections may yield data that may be used to pre-program the TRM to perform operations automatically. In some embodiments, operators may program an otherwise predetermined set of data into the TRM to perform operations automatically. In some embodiments, the compartment(s) may be inspected after operations for quality control or other purposes. In some embodiments controls for the end effectors and/or tools may be integrated into the controls for the TRM.

Control System Embodiment

An embodiment of the control system may incorporate a programmable controller to provide system control. The controller provides for a flexible means of manipulation of the TRM, DRT, and tools allowing for a best-fit control solution for the equipment. The control system may comprise one or more remote control stations to provide custom operator interfaces. The one or more interfaces may comprise one or more of displays, touchscreens (HMI), joysticks, buttons, toggles, switches, and voice input for equipment control. The equipment that may be controlled by the control system includes the TRM, DRT, plinth, trolley, tools, and hydraulic power units (HPUs).

Closed-Circuit Television System

In an embodiment, closed-circuit television (CCTV) camera systems may be provided for operational visual feedback to aid in system control and operation. The CCTV camera system may be operator controlled from a control station. This method of control allows the operator to select and manage desired camera views for operations, while controlling the cameras with associated control features such as the pan, tilt, zoom (PTZ), focus, and lights. In addition, the CCTV camera system may provide recording capabilities, allowing for the collection of operational records.

In an embodiment, proper visual coverage of operations may be made possible by a CCTV camera system through adequate camera coverage, determined by camera quantity and location. This visual coverage accounts for all required operations, and provides visual collision avoidance during equipment operation and refurbishment activities. Audio feedback to the operators may be provided from the HPU and inside the space. Microphones can be placed near the HPU and on TRM.

Safety Provisions

In an embodiment, the control system may include an emergency stop system that removes all motive power from the equipment once tripped. It should be noted that this emergency stop system does not remove power from the controller and monitoring equipment, but rather allows for operational feedback during the emergency stop condition. However, after an emergency stop, the system may need to be reset by the operator in order to be functional. Although the equipment may stop or shut down, the computer controller is not generally de-energized, which allows for alerts and troubleshooting to occur. The control system design provides electrical disconnect switches at electrical service input points to allow for proper equipment isolation. The control system meets electrical standards to ensure equipment safety, and allows the electrical, hydraulic, and mechanical components to fail to a safe state upon the loss of services.

Modes of Operation

In an embodiment, the control system may comprise a flexible and robust control interface. The interface may comprise two or more modes of control providing appropriate control for the various normal and potential off normal operations of the equipment. The primary design constraint that provides the ability for the control system to potentially perform various high level functions is the integrated position feedback on the manipulator axes. With the information of the manipulator configuration, the control system has the ability to perform inverse kinematic and kinematic calculations. Two basic modes of operation for the control system are Joint Control mode, and Inverse Kinematic Control (IK) mode.

In an embodiment, the Joint Control mode provides an open-loop control for singular axis. The operator selects the desired axis to control on the control interface. Control for the selected axis may be provided by a variable joystick on the control station. This mode of control can be used during most to all recovery operations, calibration operations, and all off-normal operations where the Inverse Kinematic Control hinders the operator ability to perform a task. The open loop Joint Control Mode allows the removal of the arm if the operator is informed of a position sensor fail.

In an embodiment, the closed-loop Inverse Kinematic Control mode provides simultaneous X/Y/Z control of the tool/end effecter to the operator. The Inverse Kinematic Control may be offered to the operator by the joystick(s) input on the control station. The Inverse Kinematic Control allows the operator to control the orientation of the tool relative to the tank floor, and allows the operator to control the position of the tool (Cartesian coordinate frames) inside the space while maintaining the tool orientation.

The TRM, DRT, and tools may be manually or automatically operated. In some embodiments some functions are automatic and some are manual. The TRM and DRT offer variable speed control for each joint, with an overall adjustable maximum speed.

Hydraulic Power Unit Control

In some embodiments the TRM control system comprises a hydraulic power unit (HPU). The HPU may be controlled automatically by the control system during normal operations. The control system may automatically activate the hydraulic services upon a hydraulic service demand, and automatically control the HPU cooling system per hydraulic fluid temperature. The HPU may include basic manual controls, in addition to the automatic controls, for flexible control during off normal on-off-auto operations. Local manual control for the HPU is provided to allow for recovery in case of a control system failure.

Equipment Power-Up

In an embodiment, the initial service connection and power-up of the local electrical service disconnect may occur during the installation and setup of the local equipment. Upon the application of electrical services, the control system powers up in an equipment motive safe state. With the electrical services provided, the start-up of the equipment control may require operator initiation, or emergency stop system reset and alarm reset at the operator interface. Operator initiation of the system may ensure that personnel are aware of the equipment status and state prior to control.

Equipment Shutdown

The control system may allow for the equipment to be shut down in a motive-safe state by the triggering of the emergency stop circuit. The design of the control system ensures the equipment fails in a safe state upon the removal of motive power by emergency stop circuit or removal of electrical services. This non-powered fail-safe design allows for a hard equipment shutdown, such as an electrical disconnect and isolation. The coupling of this non powered fail safe design with the equipment power-up design provides for robust equipment startup and shutdown operations.

System Alarms and Annunciation

Alarms for the control system may require operator acknowledgement and manual reset. In some embodiments, alarms may remain active and non-resettable while the existing alarm condition is active. The control system alarm state may be visually displayed on the human-machine interface, and status of the system alarms provided. The alarms may be one or more of visual, haptic, and auditory.

Interlocks

The control system may provide equipment interlocks as necessary (when considering desired control options and equipment feedback) to improve equipment health and operations. The control system interlocks may be segregated into three primary levels:

Equipment Enable Interlock—An interlock for healthy operations for all operations (e.g., emergency stop).

Equipment Normal Operations Interlock—An interlock for normal operations, but is potentially not required for off normal operations (e.g., hydraulic level low).

Equipment Operation Specific Interlock—An interlock for a specific sub operation (e.g., during initial deployment operations the locking pawls on the plinth are maintained in the locked position until the locking pawls on the trolley are confirmed to be locked on the next manway opening).

Recovery

In an embodiment, the control system may provide an off normal operations mode for recovery operations. Equipment recovery through the HMI may be the primary mode of equipment recovery if possible. If the equipment cannot be recovered through the HMI (e.g., if the programmable controller failed), the operator may then move to a hydraulic or manual mechanical means for recovery.

Control Management Login

In an embodiment, control systems of normal operations may require a login and password, or one or more other forms of secure authorization, to enable operations. The provision of this login is to prevent equipment operations in this mode, as this mode provides a level of equipment control that may bypass interlocks and be cumbersome to operate.

Human Factors

In an embodiment, human factor considerations may be incorporated into the control system design. These human factor considerations may be included into the control station design, layout and interface development; into the designed local control interface and location; and into the software development and functionality.

Tank Refurbishment Process Embodiment

In general, the process steps for remote operations may be similar in content and sequence to the manual operations for tank refurbishment. In some instances, the configuration of the tank or interferences inside the tank may prevent the remote equipment from adequately or completely performing a task. When this is encountered, a manned entry into the tank to finish a process may be required; however human involvement in the refurbishment process remains significantly reduced.

In an embodiment, inspection and quality assurance may be performed using one of an inspection camera, light, swipe tool, and other tools and sensors as required. Inspection and quality assurance steps may be performed at any point in the process, before or after any, or every, process step, as often as is necessary to assure quality and safety standards are being met.

Cutting Operations

In an embodiment, some operating environments may comprise interferences or configurations where passage of the TRS equipment would be difficult (increasing complexity of the system) or impossible. Interferences may include features mounted in the path of the TRS equipment and configurations causing a drastic change of the equipment path. Removal of the interferences is not possible in some cases. To address these difficulties, additional surface penetrations may be planned for deployment of the TRS. Surface penetrations refer to holes drilled in any surface of the environment including walls, floors, and ceilings. Which surface, or surfaces, may require penetrations is based on the particular environment and the nature and position of the interferences located therein.

TRS Installation

In an embodiment, the installation of the support equipment for many of the TRS processes (grit blasting, vacuum, residue collection equipment, paint pumps, pressure washers, etc.) may be installed with other equipment in a preliminary step.

Remove Residue/Decontaminate

In an embodiment, the DRT delivers tools to the TRM as required for the specified operation. In the residue removal and decontamination phase a waterblast/cleaning tool may be applied to the interior surfaces of the space to remove chlorides and contamination. A residue collection tool may be used to collect puddles of water and other excess residue. A wiping tool may be deployed to dry the surfaces. In some embodiments the residue removal and decontamination phase may be followed by an inspection and quality assurance phase. Inspection and quality assurance may be performed using one of an inspection camera, light, swipe tool, and other tools and sensors as required.

Space Preparation

In an embodiment, the TRS may perform preparations in the space comprising the removal of zincs (sacrificial anodes used in the marine industry), removal of airbells (and associated piping), removal of other fixtures, installing pipe plugs and diffuser wraps, follow-on decontamination and radiation surveys, and inspections.

In an embodiment, to remove zincs and other bolted fixtures the DRT may deliver the nutrunner tool to the TRM. The TRM may remove the nuts and then place the fixtures in the tray of the DRT for removal. To remove some fixtures the TRM may need to utilize a shear tool to cut associated piping.

The areas beneath the fixtures may be surveyed for contamination using a swipe tool and decontaminated using a wiping tool, if necessary. To prevent the accumulation of grit and debris in open pipes, holes, and drains, the DRT may deliver plugs and/or diffuser wraps (AKA slap wraps) to the TRM for installation.

Pre-Blast Preparation

In some embodiments, before the coating can be removed from the space, the interior surfaces may require preparation. First, any fixtures that won't be getting stripped of their coating and repainted (comprising pipes, hangers and other items in some embodiments) must be protected. Blast protection (slap wraps) is delivered to and installed by the TRM. Second, the chloride concentration may be measured. The DRT may deliver the chloride checking tool to the TRM for measurement of the chloride concentration. If chlorides are present in unacceptable levels, actions must be taken to reduce the chloride levels to prevent chlorides from being driven into the surfaces during the coating removal process and affecting the quality of the new coating. Decontamination by wiping or water blast cleaning can be performed by the TRM.

Coating Removal

In an embodiment, grit blasting or other forms of blasting may be used to remove the coating from the interior tank surfaces. A grit blast cleaning tool may be delivered to the TRM by the DRT. The TRM may use the tool to remove the coating from the surface and then, using a vacuum, remove the grit from the floor of the tank.

In an embodiment, following coating removal, the space may be inspected for flash rust and other defects that prevent the application of a coating. The DRT and TRM can deploy grit blast cleaning equipment and spot blast the local areas to prepare them for coating. The TRM and DRT can then remove any blast protection that may have been installed earlier in the process. To ensure that paint adheres to previously painted surfaces that had not been blasted the surfaces may be sanded using a sanding tool. The surfaces may then be cleaned using a wiping tool.

Primer Coat

In an embodiment, the coating process for the space surfaces may start with the application of the primer coat in some embodiments. The primer coat, stripe coat, and the top coat may be the same type of paint (different colors) in some embodiments. Application of all coats of paint may be performed remotely using the same or similar equipment (spray equipment in some embodiments). Application of the paint may be performed by the TRM. To begin, the TRM typically moves to the end of the section that requires painting. The paint tool may be held by a gripper on the TRM and the paint is applied. Onboard cameras may be used to monitor the painting process. In certain embodiments, the TRM may move backwards so it does not move through the wet paint.

In an embodiment, a paint tool may be equipped with wet film thickness gage cards. When the surfaces are painted, the tool may prepare a card to measure the wet film thickness. To measure wet film thickness the TRM may move the tool to the painted surface and presses the gage card into the paint and immediately pull back from the surface. The gage card may then be positioned in front of a camera where an operator can determine the paint thickness by viewing the edge of the gage card. After the gage card is read, it may be deposited in a cassette or other depository for spent gage cards. If it is determined that the paint thickness is not adequate, then more paint can be applied and the wet film thickness can be measured again. If it is found that wet film thickness is adequate, the TRM moves to the next section of the tank requiring paint. When the coating is dry, a dry film thickness tool may be used to test the coat thickness in a similar fashion as the wet film thickness tool. If the thickness is found to be inadequate or flaws in the paint are identified, the locations are noted. Touchup of the coating may be performed as the TRM moves into the tank in preparation for application of the next coat.

Stripe Coat

In an embodiment, a stripe coat may be applied using the same equipment as the primer, though only the edges susceptible to thinning (edges, fastener heads, etc.) during the drying process are recoated in this step. Wet film thickness measurements may be taken during the painting process, and dry film thickness measurements may be taken once the coat is dry. Inspection and repairs may be performed in the same or similar manner as done for the primer coat. The application and inspection of the top coat may be performed the same or similarly to the primer coat.

Last Pass

In an embodiment, the last pass may comprise tasks such as performing surveys, reinstalling fixtures, installing pipe insulators, removing diffuser wraps and pipe plugs. These tasks may involve manned entries in some embodiments; however the DRT and the TRM may be used to perform supporting tasks to minimize the number of personnel required to enter the tank (DRT could deliver and remove tools and/or materials) and the amount of time personnel may need to be present in the space.

In some embodiments, when the project is complete, the TRS equipment may be removed from space, decontaminated or cleaned, and packaged for storage or relocation.

The process is not limited to the above steps or the order of the above steps. Steps may be added, removed, or rearranged as needed for varying operating environments and requirements. Additional tools, or tool variations, may be used in alternate process embodiments.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the systems, methods, processes, and/or apparatuses disclosed herein in a preferred embodiment thereof, it should be apparent that the systems, methods, processes, and/or apparatuses may be modified in arrangement and detail without departing from such principles. Claim is made to all modifications and variation coming within the spirit and scope of the following claims.

The embodiments in which an exclusive property or privilege is claimed are defined as follows:

1. A robotic system for carrying out operations in a confined space, comprising:
   a manipulator arm;
   a plinth, wherein the plinth is coupled the manipulator arm and includes a plinth anchor configured to engage a first mounting area in the confined space;
   a trolley, wherein the trolley is configured to move relative to the manipulator arm and includes a trolley anchor configured to engage the first mounting area;
   wherein the manipulator arm includes a track, and the trolley includes a roller, and wherein the track and the roller are configured to mate to facilitate movement between the trolley and the manipulator arm; and
   a control system configured to:
      release the trolley anchor from the first mounting area;
      move the trolley relative to a length of the manipulator arm;
      move the trolley anchor into engagement with a second mounting area in the confined space different from the first mounting area;

release the plinth anchor from the first mounting area;
reposition the plinth to the second mounting area by moving the manipulator arm lengthwise relative to the engaged trolley; and
move the plinth anchor into engagement with the second mounting area.

2. The system of claim 1, wherein at least one of the trolley anchor and the plinth anchor includes at least one of an extendable and retractable pole, an extendable and retractable rod, an extendable and retractable shoe, a magnet, or a locking pawl.

3. The system of claim 1, wherein the manipulator arm defines lengthwise direction, wherein at least one of the trolley anchor or the plinth anchor includes an extendable and retractable member, the member configured to extend and retract radially relative to the lengthwise direction.

4. The system of claim 3, wherein the member includes a contact point configured to provide sufficient friction and/or pressure against the first mounting area to secure the respective trolley and/or plinth.

5. The system of claim 4, wherein a portion of the member that comes in contact with the first mounting area includes at least one of large surface area and material having high coefficient of friction.

6. The system of claim 1, wherein at least one of the trolley anchor or the plinth anchor includes two or more extendable and retractable poles.

7. The system of claim 6, wherein the manipulator arm defines a central axis, wherein the poles are configured to extend and retract radially relative to the central axis.

8. The system of claim 1, wherein the manipulator arm defines a central axis, wherein the manipulator arm is configured to bend in at least one plane at one or more joints and/or to rotate about its central axis.

9. The system of claim 1, wherein the plinth is fixedly coupled to the manipulator arm.

10. The system of claim 1, wherein the plinth is fixedly coupled to an end of the manipulator arm.

11. The system of claim 1, wherein the manipulator arm defines a central axis, wherein the trolley is configured to move along the central axis of the manipulator arm.

12. The system of claim 1, further comprising an end effector configured to couple with one or more tools.

13. The system of claim 1, wherein the manipulator arm passes through the trolley.

14. A method for maneuvering a robotic system between mounting areas in a confined space, comprising:
releasing a trolley anchor from a first mounting area;
moving a trolley associated with the trolley anchor relative to a length of a manipulator arm, wherein the manipulator arm includes a track, and the trolley includes a roller, and wherein the track and the roller are configured to mate to facilitate the movement between the trolley and the manipulator arm
moving the trolley anchor into engagement with a second mounting area in the confined space different from the first mounting area;
releasing a plinth anchor from the first mounting area;
repositioning a plinth associated with the plinth anchor to the second mounting area by moving the manipulator arm lengthwise relative to the engaged trolley, wherein the plinth is coupled to the manipulator arm and
moving the plinth anchor into engagement with the second mounting area.

15. The method of claim 14, further comprising hydraulically operating the trolley anchor and/or the plinth anchor.

16. The method of claim 14, wherein releasing and moving the trolley anchor and/or the plinth anchor includes extending and retracting the trolley anchor and/or the plinth anchor radially with respect to the length of the manipulator arm.

17. A robotic system for carrying out operations in a confined space, comprising:
a manipulator arm having a length defining a lengthwise direction;
a first point and a second point being defined along the lengthwise direction, wherein the second point is spaced from the first point in the lengthwise direction;
a plinth, wherein the plinth is fixedly coupled to the manipulator arm and includes a plinth anchor configured to engage and release a first mounting area in the confined space, the plinth anchor configured to secure the plinth and the manipulator arm with respect to the first mounting area when engaged, wherein the first mounting area is disposed radially about the first point; and
a trolley including a trolley anchor configured to engage and release the first mounting area disposed radially about the first point, the trolley anchor configured to secure the trolley with respect to the first mounting area when engaged,
wherein the manipulator arm includes a track, and the trolley includes a roller, wherein the track and the roller are configured to mate to facilitate movement between the trolley and the manipulator arm,
wherein the trolley is configured to move relative to the length of the manipulator arm as the secured manipulator arm remains stationary, and the manipulator arm is configured to move lengthwise relative to the trolley as the secured trolley remains stationary, thereby facilitating movement of the plinth anchor and the trolley anchor from the first mounting area to a second mounting area in the confined space different from the first mounting area, wherein the second mounting area is disposed radially about the second point.

18. The robotic system of claim 17, wherein the plinth anchor includes two or more plinth anchors and the trolley anchor includes two or more trolley anchors.

19. The robotic system of claim 18, wherein the plinth anchors are extendable and retractable in different radial directions with respect to the lengthwise direction, and wherein the trolley anchors are extendable and retractable in different radial directions with respect to the lengthwise direction.

* * * * *